(12) United States Patent
Park et al.

(10) Patent No.: US 12,069,678 B2
(45) Date of Patent: Aug. 20, 2024

(54) METHOD FOR PERFORMING UPLINK TRANSMISSION IN WIRELESS COMMUNICATION SYSTEMS, AND DEVICE FOR SAME

(71) Applicant: LG ELECTRONICS INC., Seoul (KR)

(72) Inventors: Jonghyun Park, Seoul (KR); Jiwon Kang, Seoul (KR); Seongwon Go, Seoul (KR); Haewook Park, Seoul (KR)

(73) Assignee: LG Electronics Inc., Seoul (KR)

( * ) Notice: Subject to any disclaimer, the term of this patent is extended or adjusted under 35 U.S.C. 154(b) by 404 days.

(21) Appl. No.: 17/427,722

(22) PCT Filed: Feb. 7, 2020

(86) PCT No.: PCT/KR2020/001782
§ 371 (c)(1),
(2) Date: Aug. 2, 2021

(87) PCT Pub. No.: WO2020/162716
PCT Pub. Date: Aug. 13, 2020

(65) Prior Publication Data
US 2022/0116979 A1    Apr. 14, 2022

Related U.S. Application Data

(60) Provisional application No. 62/808,825, filed on Feb. 21, 2019, provisional application No. 62/802,710, filed on Feb. 7, 2019.

(51) Int. Cl.
*H04W 72/23* (2023.01)
*H04L 5/00* (2006.01)

(52) U.S. Cl.
CPC ........... *H04W 72/23* (2023.01); *H04L 5/0048* (2013.01); *H04L 5/0053* (2013.01)

(58) Field of Classification Search
CPC ......... H04W 72/1263; H04W 72/1268; H04W 72/1273; H04W 72/21; H04W 72/23;
(Continued)

(56) References Cited

U.S. PATENT DOCUMENTS

| 10,893,431 | B2 * | 1/2021 | Liou | H04W 16/28 |
| 11,375,527 | B1 * | 6/2022 | Eyuboglu | H04B 7/15528 |

(Continued)

FOREIGN PATENT DOCUMENTS

WO    WO2016163805    10/2016

OTHER PUBLICATIONS

3GPP, "5G; NR; Physical layer procedures for data (3GPP TS 38.214 version 15.3.0 Release 15)," ETSI TS 138 214 V15.3.0, Oct. 2018, 99 pages.

(Continued)

*Primary Examiner* — Jean A Gelin
(74) *Attorney, Agent, or Firm* — Fish & Richardson P.C.

(57) ABSTRACT

Disclosed in the present invention are a method for performing uplink transmission in a wireless communication system and a device for same. Specifically, a method, by which a user equipment (UE) transmits a sounding reference signal (SRS) in a wireless communication system, may include: a step for receiving setting information related to the transmission of the SRS; and a step for transmitting the uplink control channel on the basis of the setting information, wherein the setting information includes settings indicating at least one of i) a transmission unit or ii) a beam related to the transmission of the SRS. The transmission unit and the beam may be determined on the basis of i) an uplink (Continued)

reference signal transmitted by the UE or ii) a downlink reference signal received by the UE.

18 Claims, 26 Drawing Sheets

(58) Field of Classification Search
CPC .... H04W 72/46; H04L 5/0025; H04L 5/0051; H04L 5/0048; H04L 5/0053; H04L 5/0094; H04B 7/0404; H04B 7/0691; H04B 7/088
See application file for complete search history.

(56) References Cited

U.S. PATENT DOCUMENTS

| | | | |
|---|---|---|---|
| 2018/0234959 A1* | 8/2018 | Ahn | H04W 72/20 |
| 2019/0075014 A1* | 3/2019 | Zhou | H04W 74/0833 |
| 2019/0075524 A1* | 3/2019 | Zhou | H04W 72/046 |
| 2019/0182821 A1* | 6/2019 | You | H04W 16/28 |
| 2019/0190582 A1* | 6/2019 | Guo | H04L 1/0061 |
| 2019/0261338 A1* | 8/2019 | Akkarakaran | H04W 72/21 |
| 2019/0281588 A1* | 9/2019 | Zhang | H04B 7/0617 |
| 2019/0327717 A1* | 10/2019 | Li | H04L 5/0048 |
| 2020/0389885 A1* | 12/2020 | Tomeba | H04W 72/21 |
| 2021/0022128 A1* | 1/2021 | Chen | H04W 16/28 |
| 2023/0102698 A1* | 3/2023 | Cao | H04B 7/0404 370/329 |
| 2023/0102968 A1* | 3/2023 | Weber | A01M 23/36 43/77 |

OTHER PUBLICATIONS

3GPP, "5G; NR; Radio Resource Control (RRC); Protocol specification (3GPP TS 38.331 version 15.4.0 Release 15)," ETSI TS 138 331 V15.4.0, Apr. 2019, 471 pages.
LG Electronics, "Feature lead summary of Enhancements on Multi-beam Operations," R1-1813944, Presented at 3GPP TSG RAN WG1 Meeting #95, Spokane, USA, Nov. 12-16, 2018, 25 pages.
LG Electronics, "Updated feature lead summary of Enhancements on Multi-beam Operations," R1-1901430, Presented at 3GPP TSG RAN WG1 Ad-Hoc Meeting 1901, Taipei, Taiwan, Jan. 21-25, 2019, 33 pages.
PCT International Search Report in International Appln. No. PCT/KR2020/001782, dated May 28, 2020, 7 pages.

* cited by examiner

[FIG. 1]
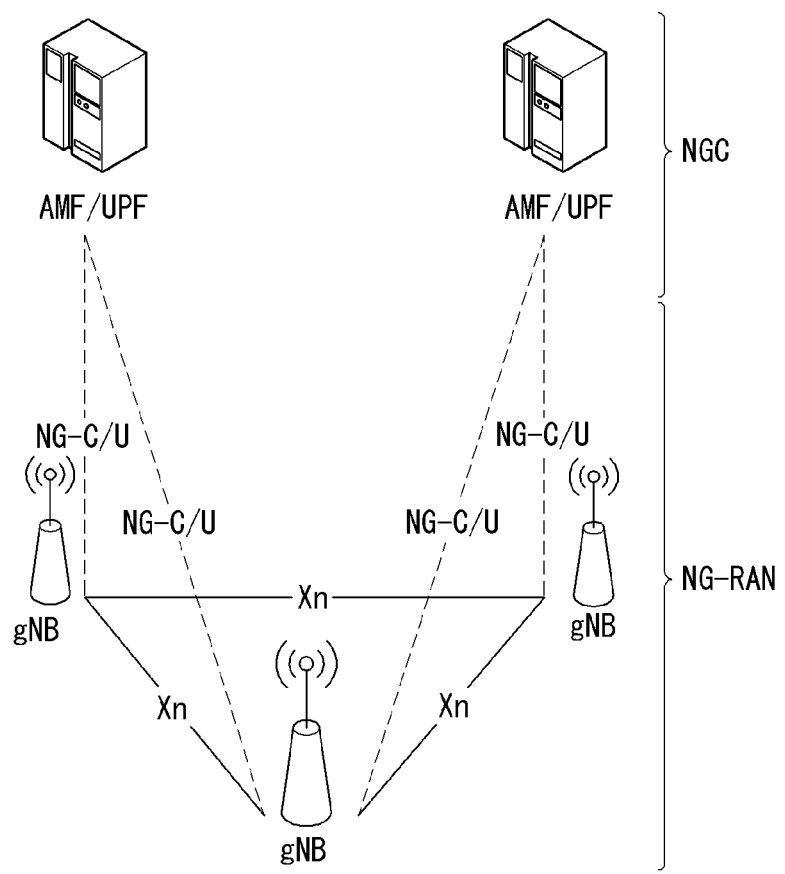

[FIG. 2]
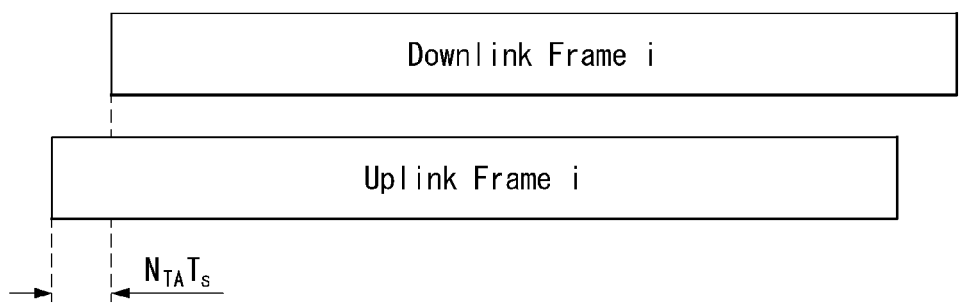

[FIG. 3]
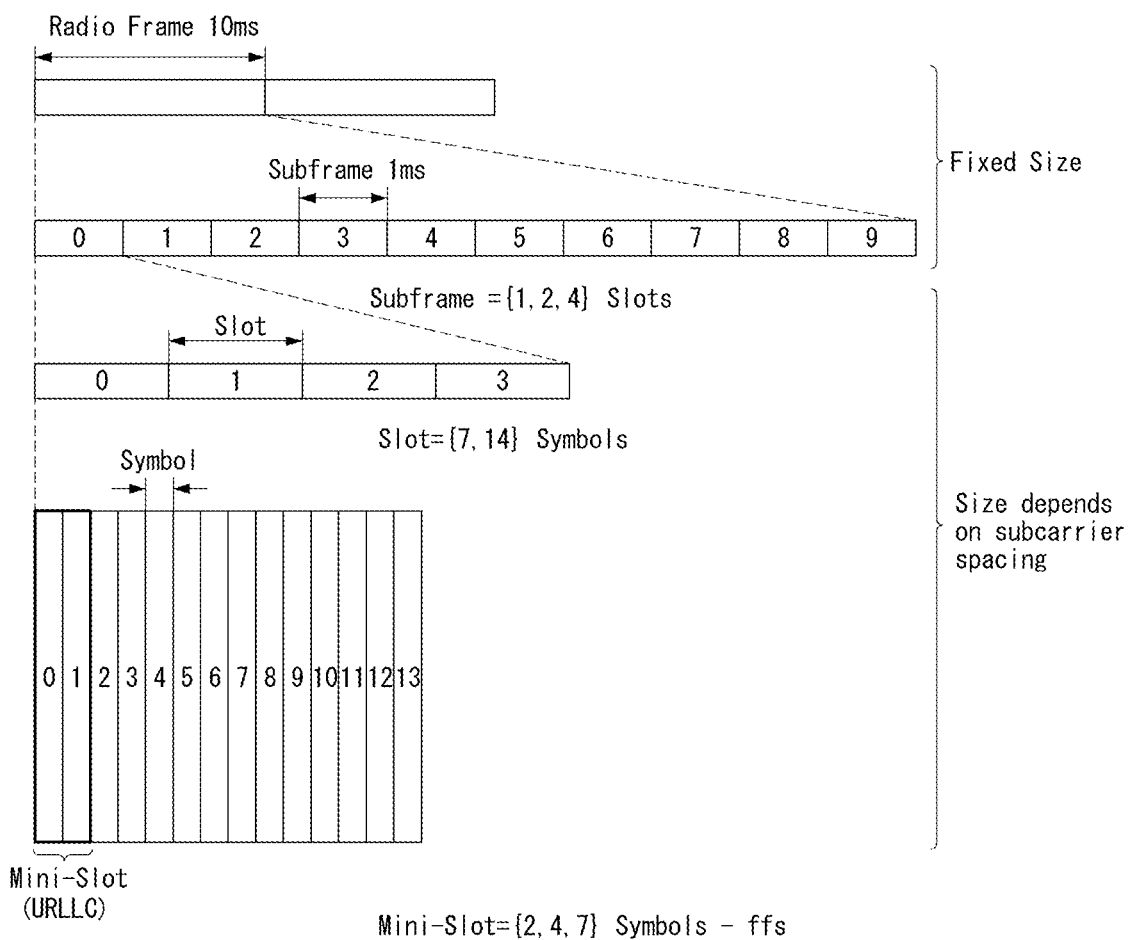

[FIG. 4]
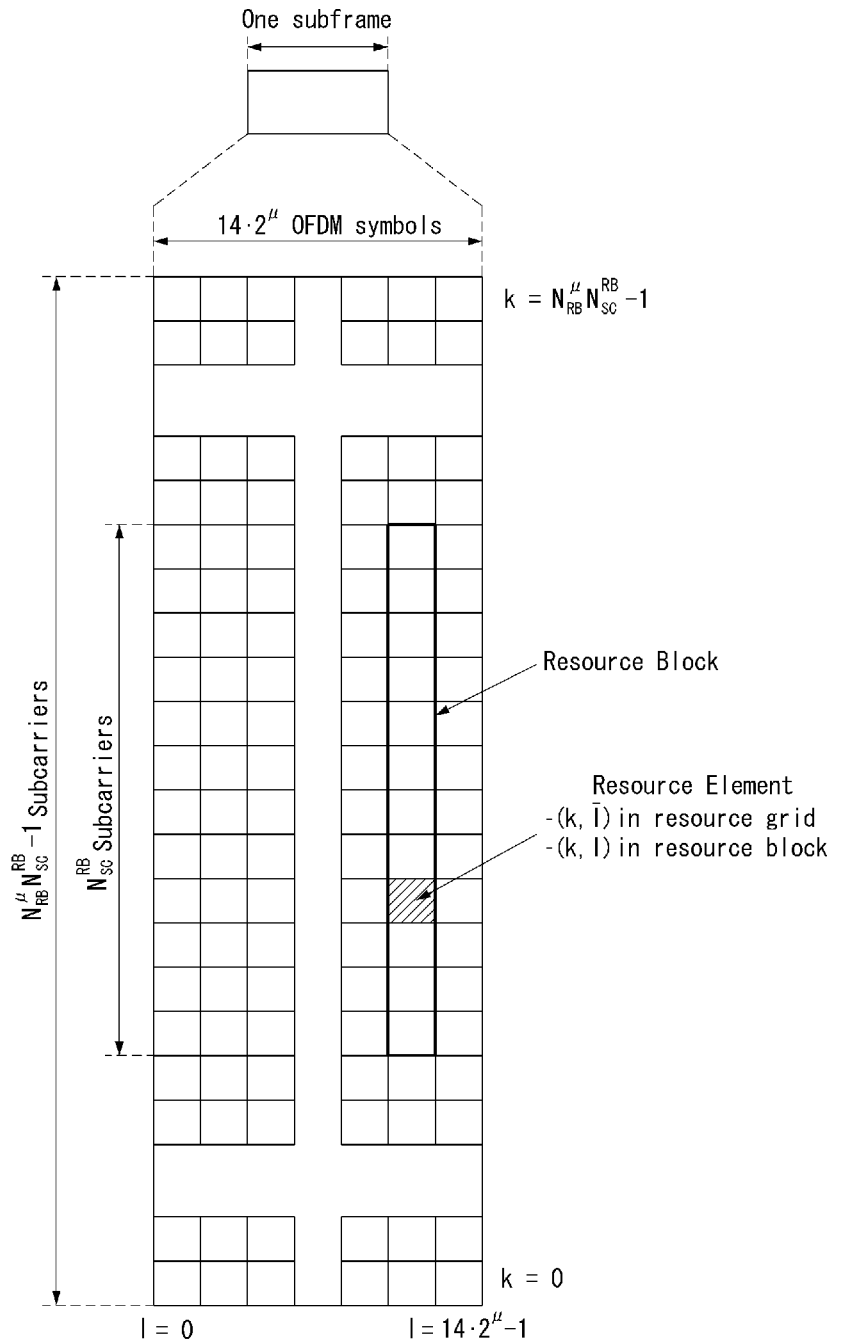

[FIG. 5]
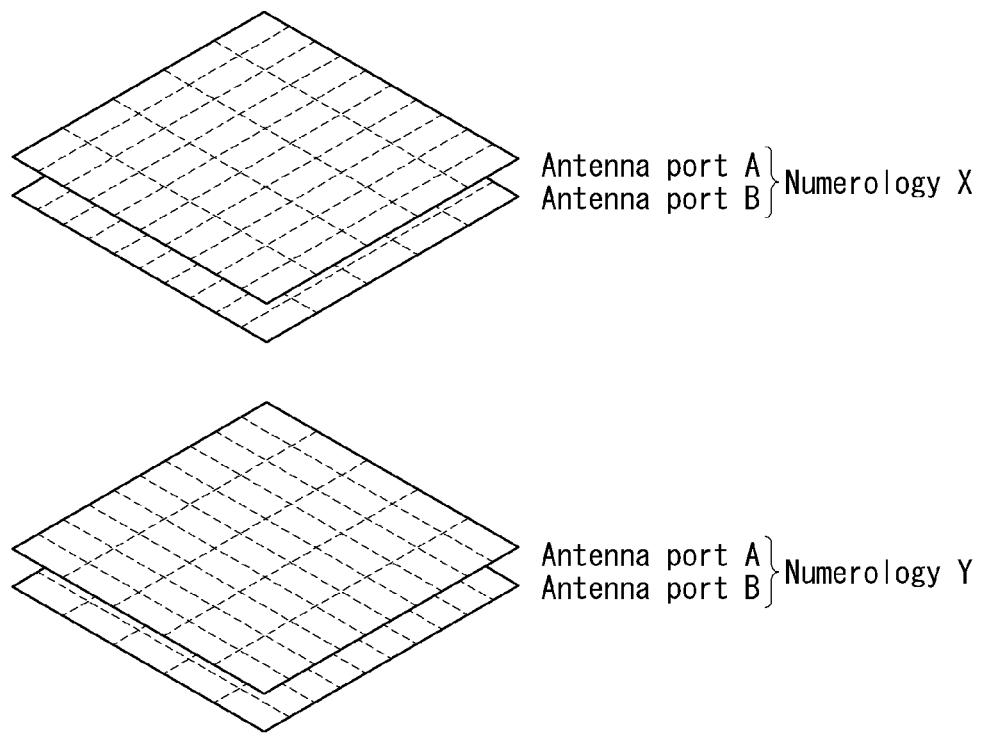

[FIG. 6]
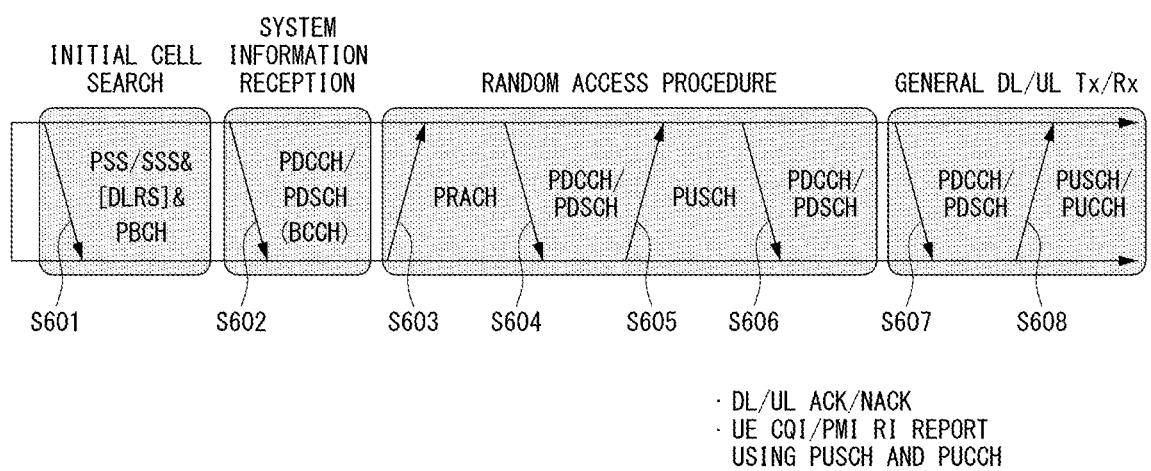

[FIG. 7]
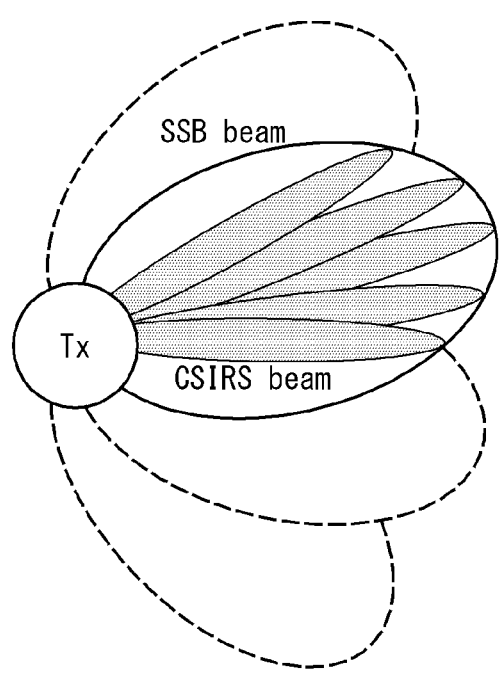

[FIG. 8]
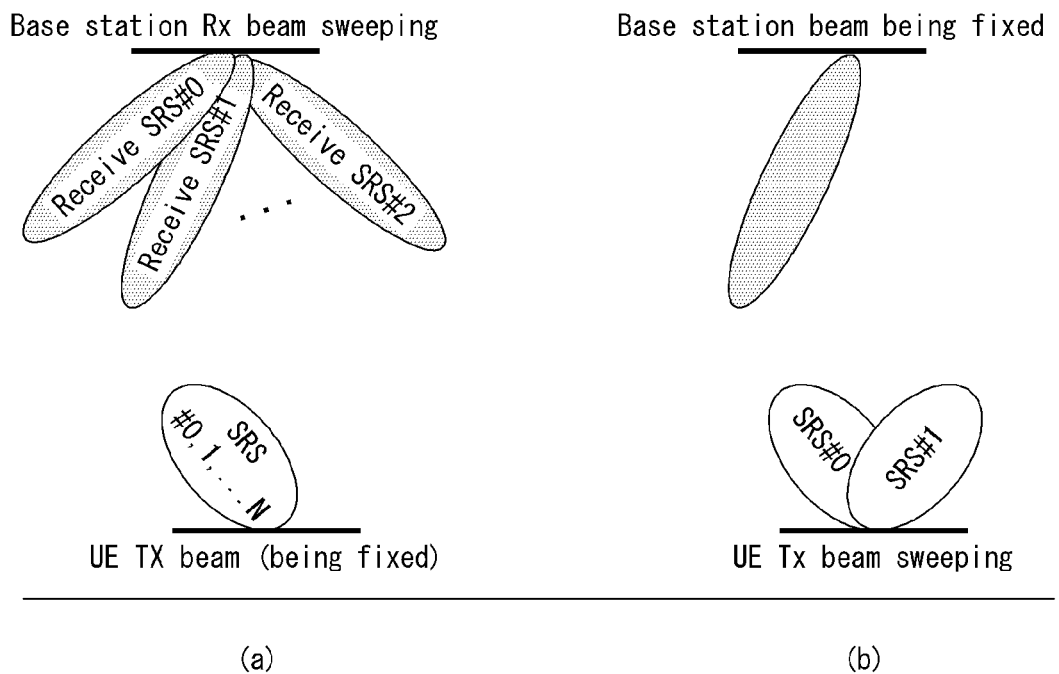

[FIG. 9]
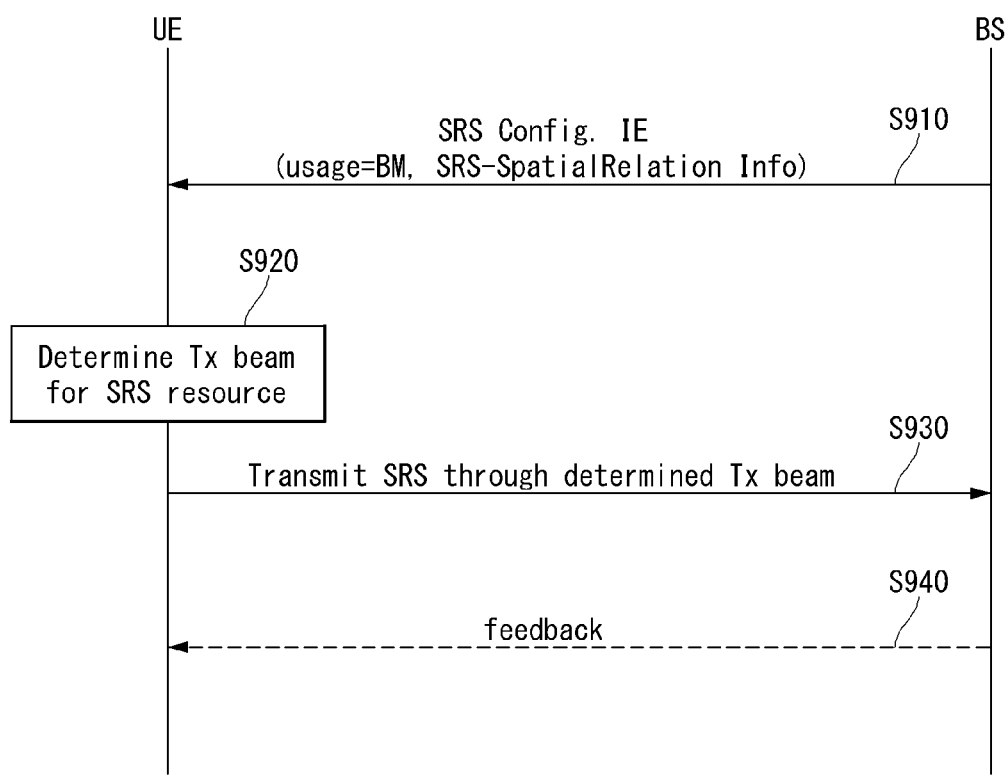

[FIG. 10]
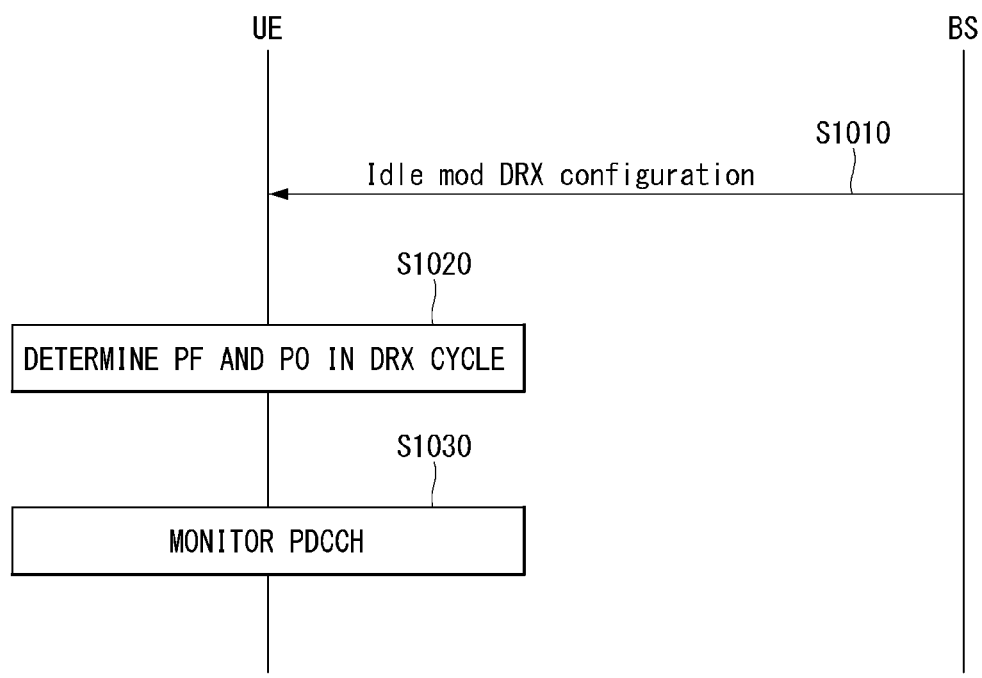

【FIG. 11】
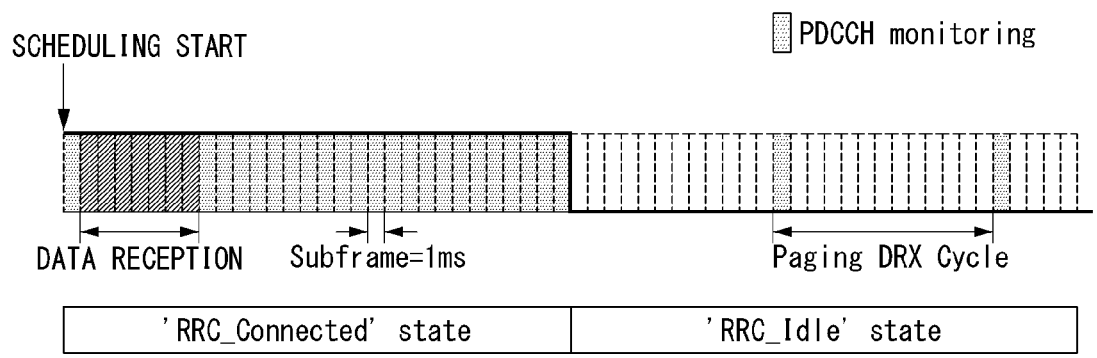

[FIG. 12]
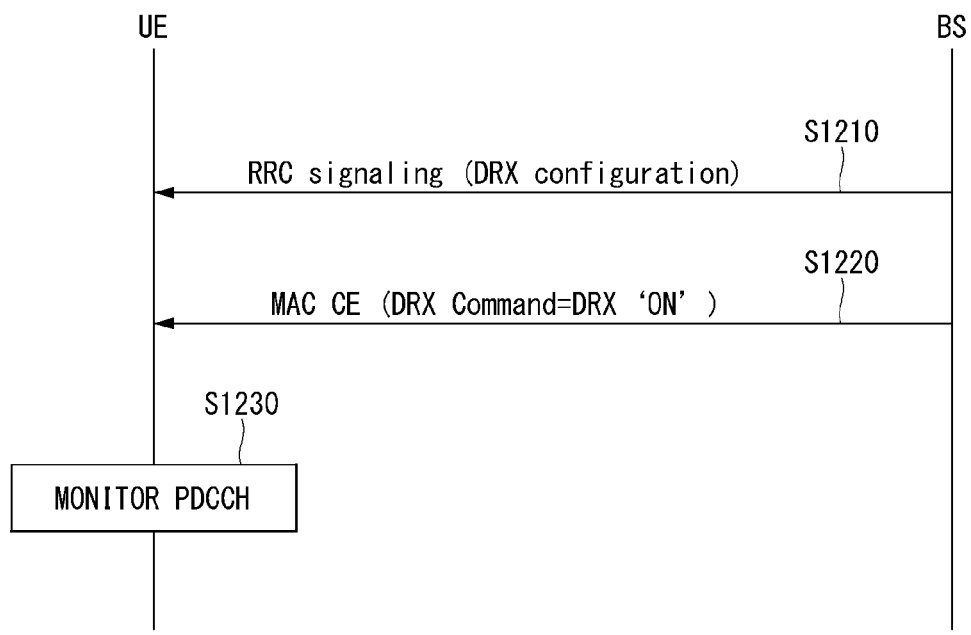

[FIG. 13]
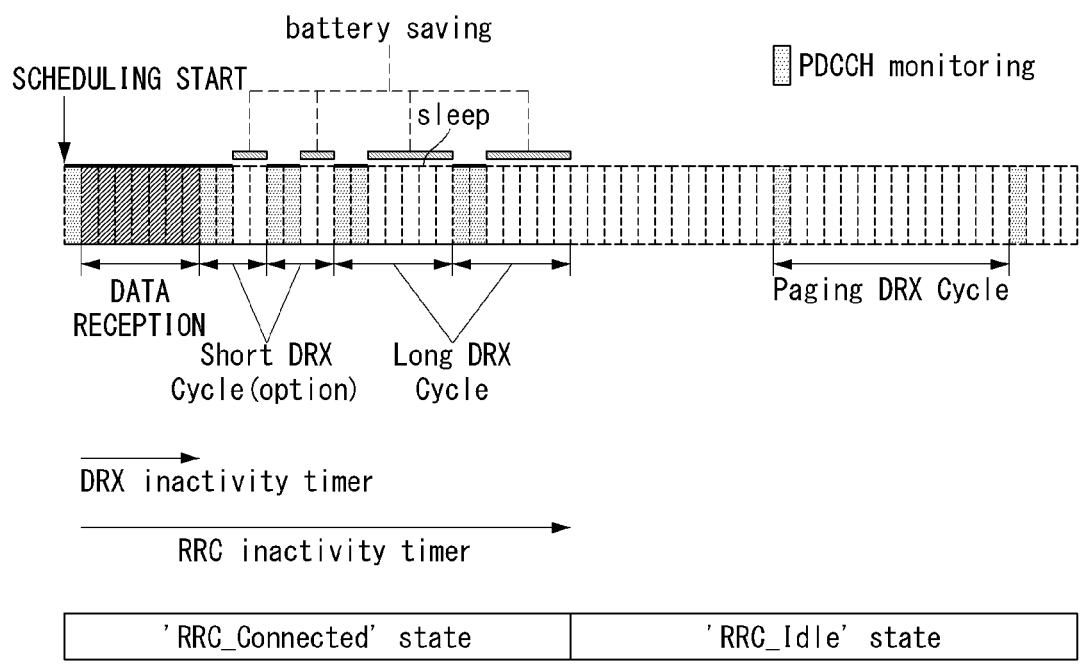

[FIG. 14]
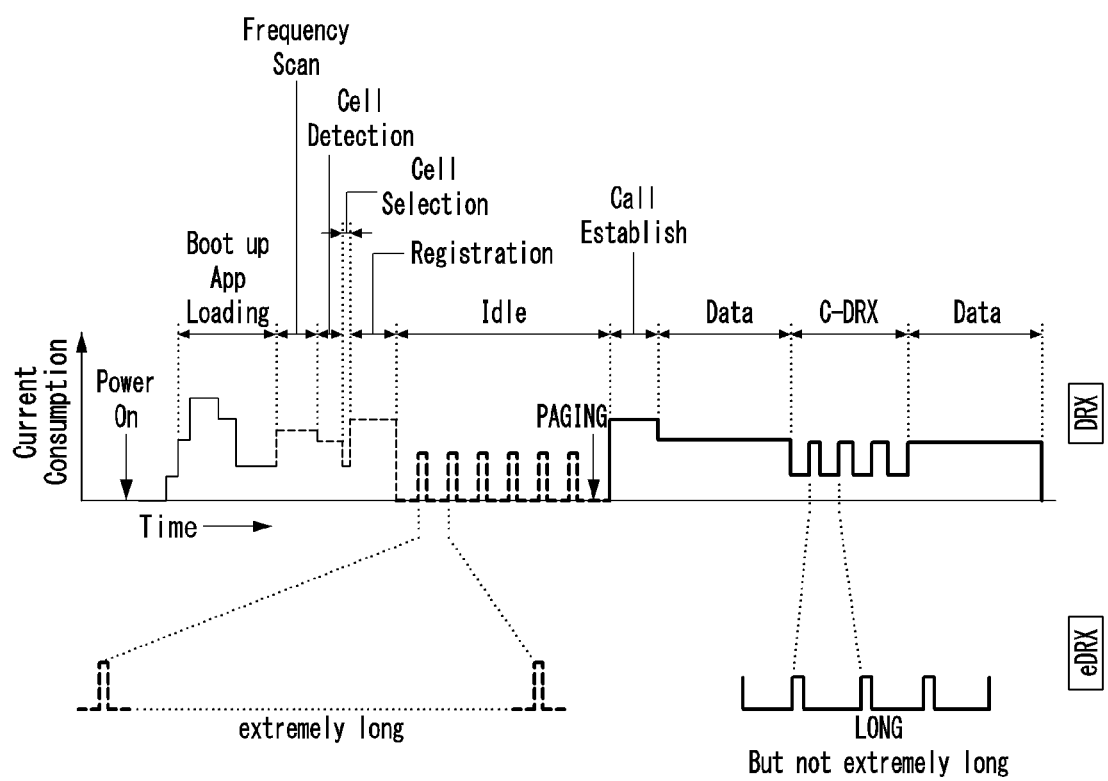

[FIG. 15]
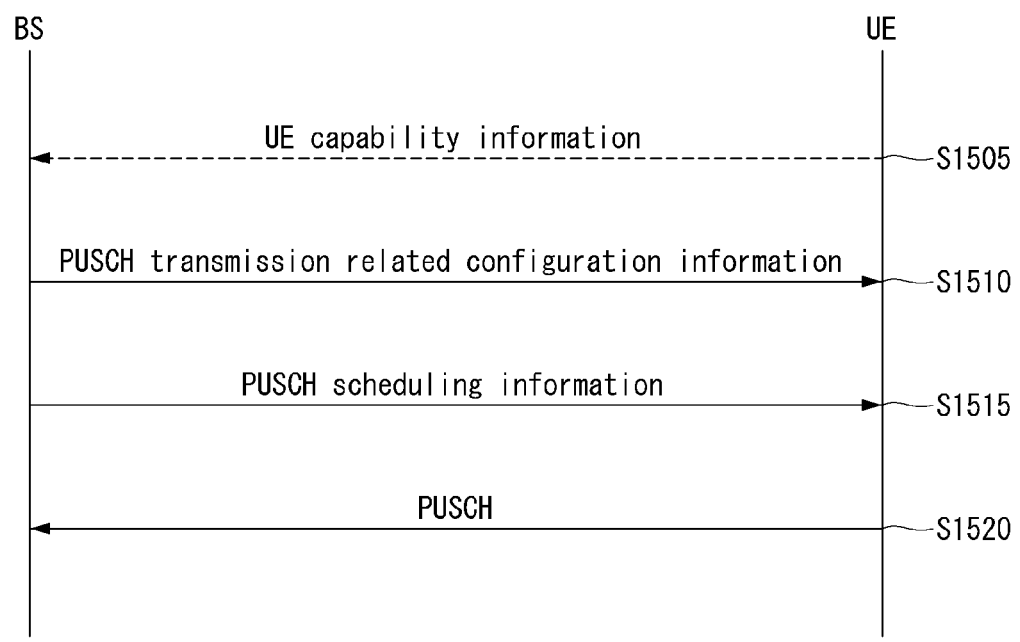

[FIG. 16]
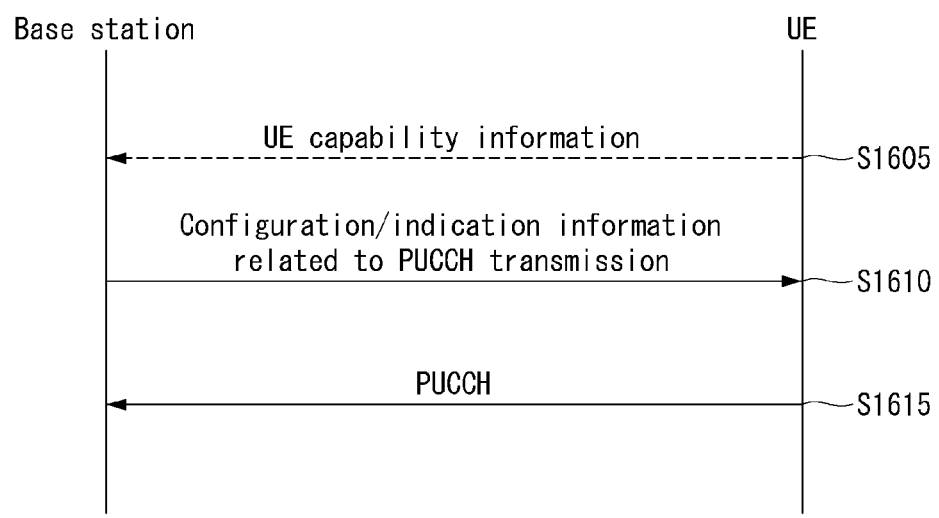

[FIG. 17]
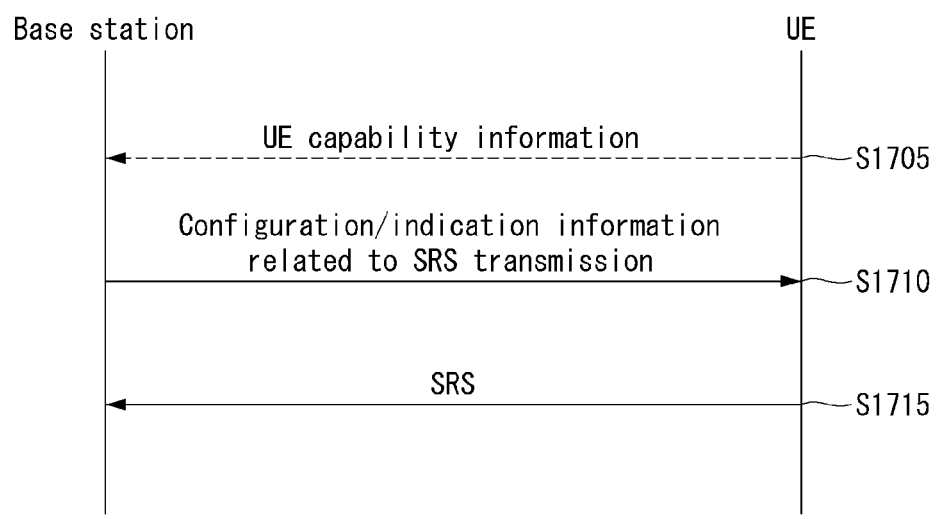

[FIG. 18]
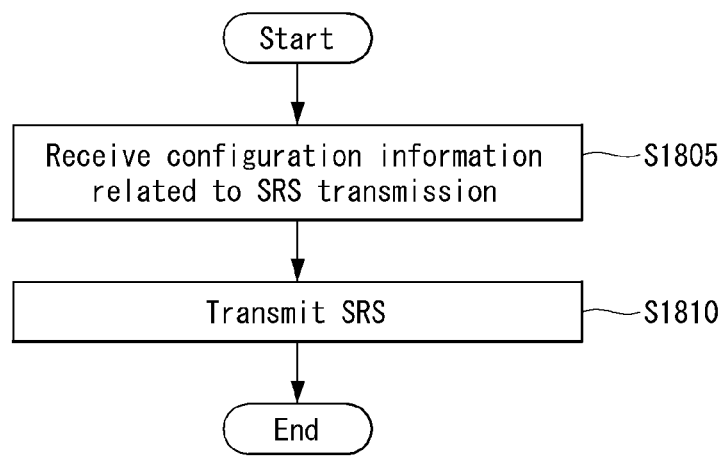

[FIG. 19]
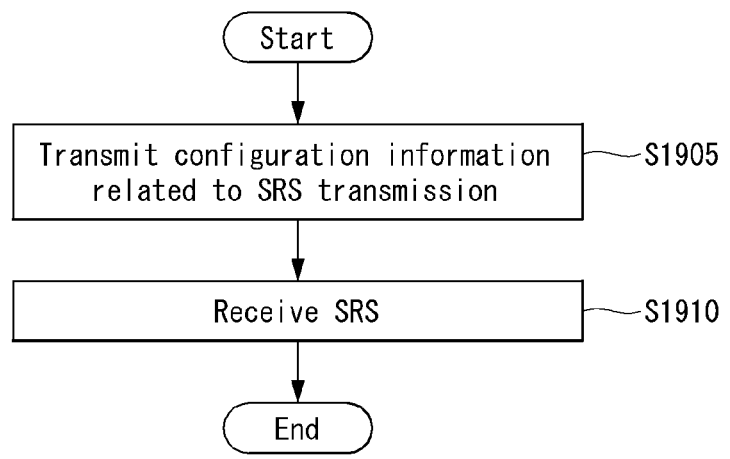

[FIG. 20]
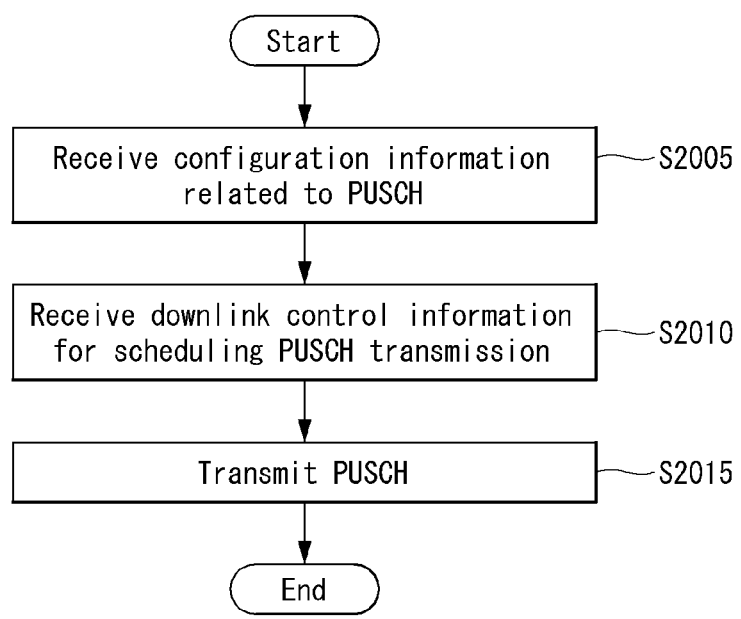

[FIG. 21]
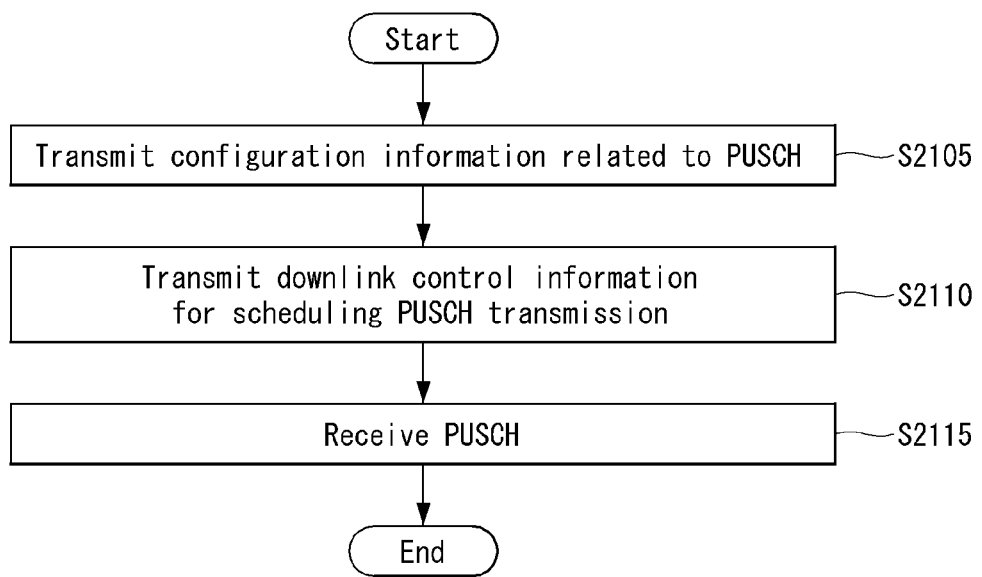

[FIG. 22]
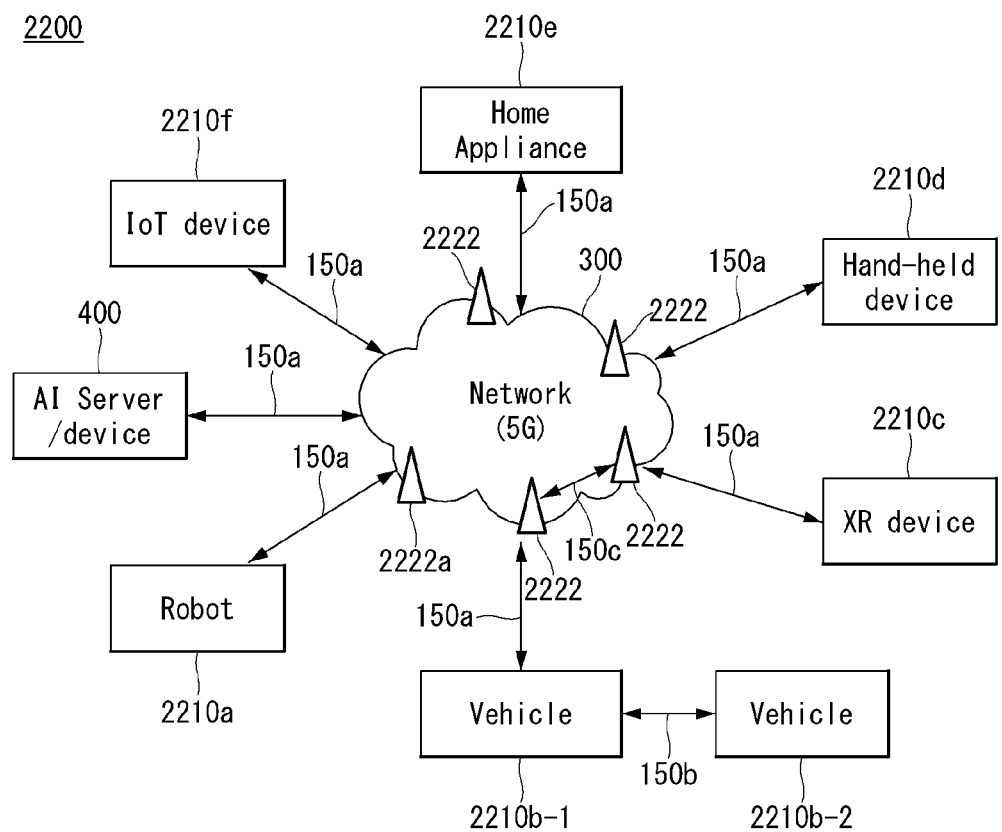

[FIG. 23]
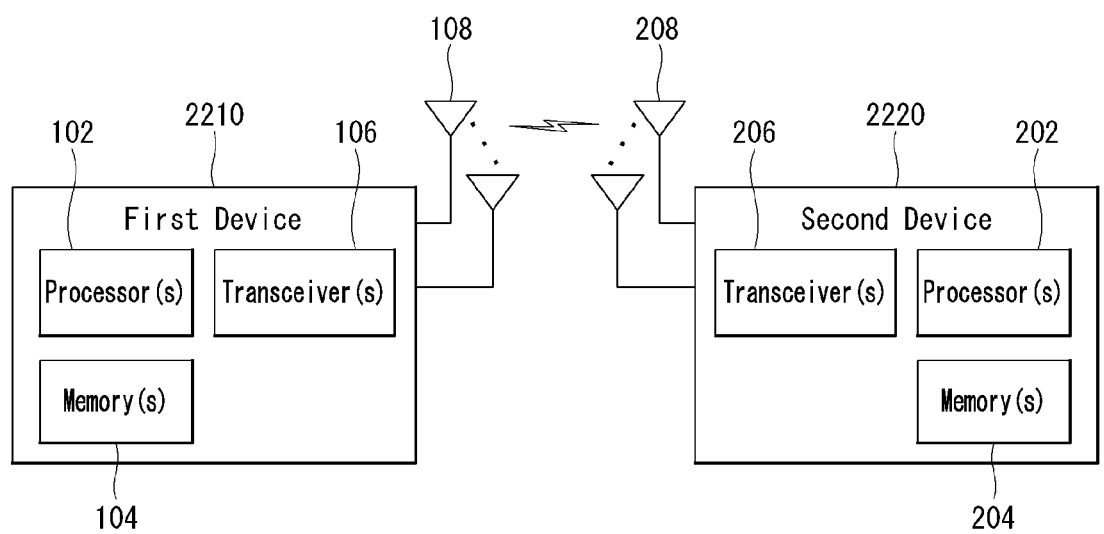

[FIG. 24]
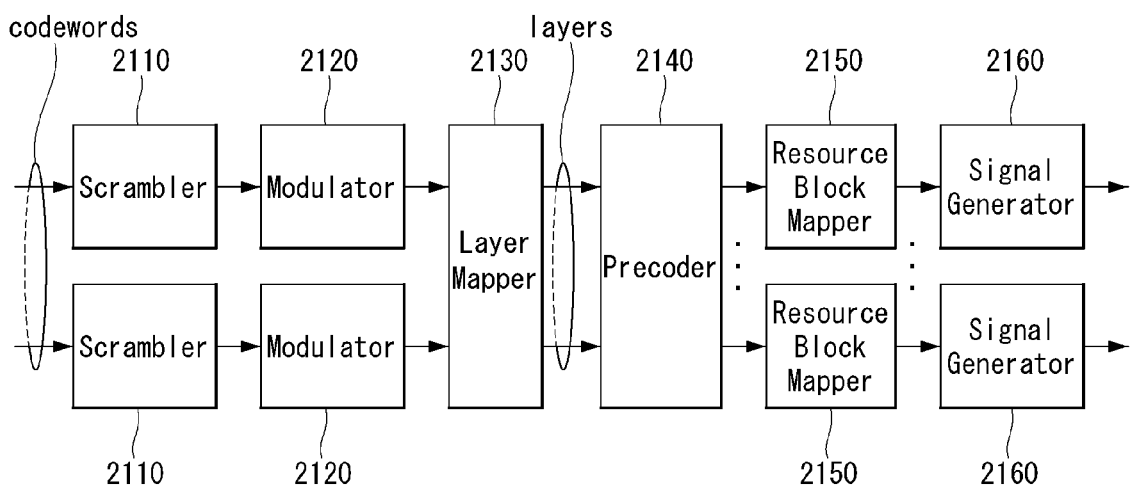

[FIG. 25]
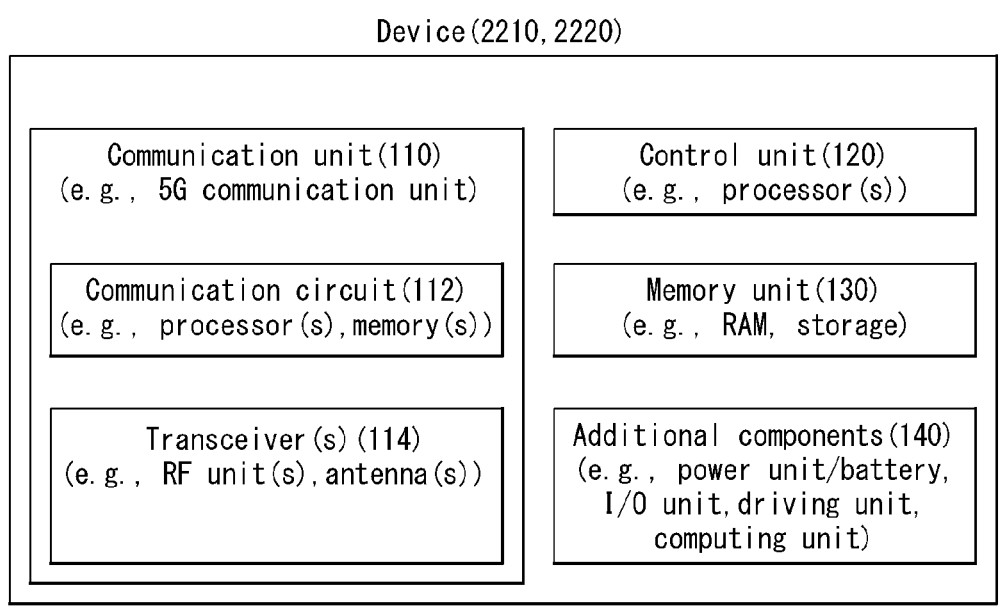

[FIG. 26]
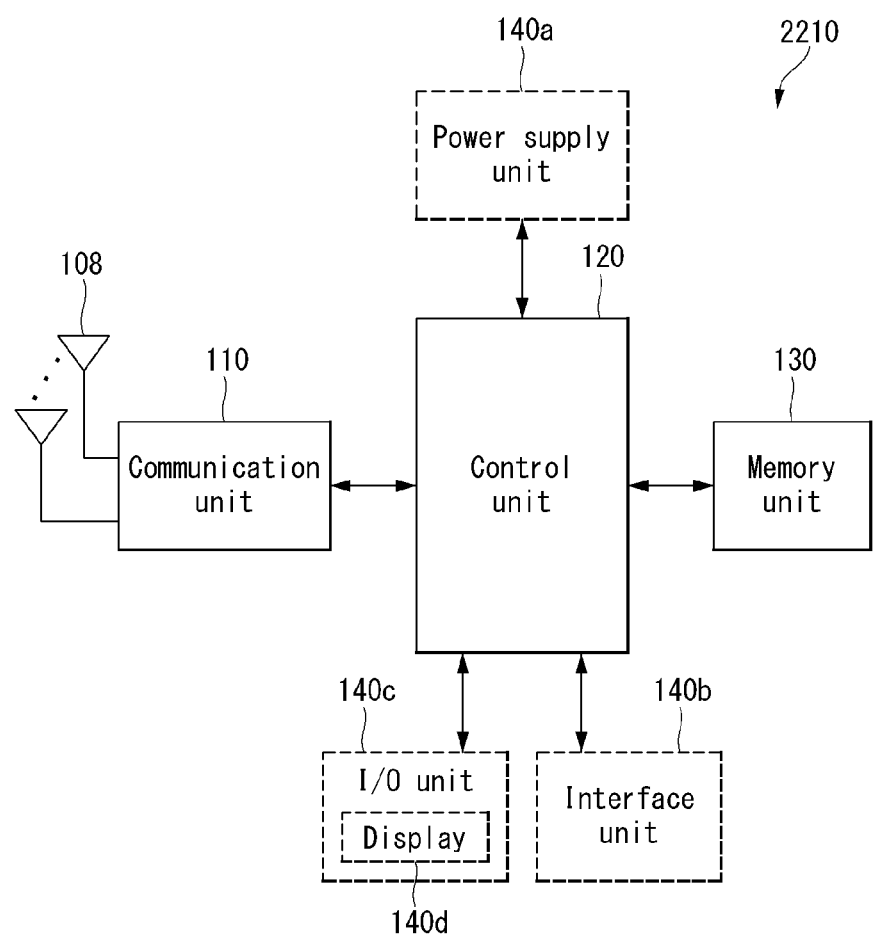

METHOD FOR PERFORMING UPLINK TRANSMISSION IN WIRELESS COMMUNICATION SYSTEMS, AND DEVICE FOR SAME

CROSS-REFERENCE TO RELATED APPLICATIONS

This application is the National Stage filing under 35 U.S.C. 371 of International Application No. PCT/KR2020/001782, filed on Feb. 7, 2020, which claims the benefit of U.S. Provisional Application No. 62/802,710, filed on Feb. 7, 2019, and No. 62/808,825, filed on Feb. 21, 2019, the contents of which are all hereby incorporated by reference herein in their entirety.

TECHNICAL FIELD

The present disclosure relates to a wireless communication system and, more particularly, to a method of performing uplink transmission in a wireless communication system and an apparatus supporting the same.

BACKGROUND ART

Mobile communication systems have been developed to guarantee user activity while providing voice services. Mobile communication systems are expanding their services from voice only to data. Current soaring data traffic is depleting resources and users' demand for higher-data rate services is leading to the need for more advanced mobile communication systems.

Next-generation mobile communication systems are required to meet, e.g., handling of explosively increasing data traffic, significant increase in per-user transmission rate, working with a great number of connecting devices, and support for very low end-to-end latency and high-energy efficiency. To that end, various research efforts are underway for various technologies, such as dual connectivity, massive multiple input multiple output (MIMO), in-band full duplex, non-orthogonal multiple access (NOMA), super wideband support, and device networking.

DISCLOSURE

Technical Problem

The present disclosure proposes a method of performing uplink transmission in a wireless communication system.

Specifically, the present disclosure proposes a method of performing signaling related to a configuration and/or indication of a panel unit and/or a beam unit, n relation to the transmission and reception of sounding reference signals (SRSs).

The technical problems to be solved by the present disclosure are not limited by the above-mentioned technical problems, and other technical problems which are not mentioned above can be clearly understood from the following description by those skilled in the art to which the present disclosure pertains.

Technical Solution

A method of transmitting, by a user equipment (UE), a physical uplink shared channel (PUSCH) in a wireless communication system according to an embodiment of the present disclosure includes receiving configuration information related to the PUSCH, receiving downlink control information scheduling the transmission of the PUSCH, and transmitting the PUSCH through a transmission unit and a beam determined based on the downlink control information. The downlink control information may include information representing an SRS resource associated with the beam. The transmission unit may be determined based on transmission unit identification information configured in an SRS resource set including the SRS resource.

Furthermore, in the method according to an embodiment of the present disclosure, the beam may be determined based on spatial-related information configured in the SRS resource. Furthermore, the spatial-related information may include information representing i) an SRS resource, ii) a channel state information-reference signal (CSI-RS), or iii) a synchronization signal block (SSB). Furthermore, the transmission unit for the transmission of the PUSCH may be determined based on i) the SRS resource, ii) the CSI-RS, or iii) a transmission unit used to transmit and receive the SSBs.

Furthermore, in the method according to an embodiment of the present disclosure, the method further includes transmitting, to a base station, information on whether correspondence may be established between an uplink transmission unit and downlink transmission unit of the UE. The transmission unit for the transmission of the PUSCH may be determined based on the information.

Furthermore, in the method according to an embodiment of the present disclosure, the method further includes receiving configuration information related to SRS transmission for the transmission of the PUSCH through higher layer signaling, and transmitting one or more SRSs to a base station based on the configuration information. The SRS resource may be a resource in which any one of the one or more SRSs has been transmitted.

A user equipment (UE) transmitting a physical uplink shared channel (PUSCH) in a wireless communication system according to an embodiment of the present disclosure includes one or more transceivers, one or more processors, and one or more memories storing instructions for operations executed by the one or more processors and connected to the one or more processors. The operations may include receiving configuration information related to the PUSCH, receiving downlink control information scheduling the transmission of the PUSCH, and transmitting the PUSCH through a transmission unit and a beam determined based on the downlink control information. The downlink control information may include information representing an SRS resource associated with the beam. The transmission unit may be determined based on transmission unit identification information configured in an SRS resource set including the SRS resource.

A method of receiving, by a base station (BS), a physical uplink shared channel (PUSCH) in a wireless communication system according to an embodiment of the present disclosure includes transmitting configuration information related to the PUSCH, transmitting downlink control information scheduling the transmission of the PUSCH, and receiving the PUSCH transmitted through a transmission unit and a beam based on the downlink control information. The downlink control information may include information representing an SRS resource associated with the beam. The transmission unit may be determined based on transmission unit identification information configured in an SRS resource set including the SRS resource.

A base station (BS) receiving a physical uplink shared channel (PUSCH) in a wireless communication system according to an embodiment of the present disclosure includes one or more transceivers, one or more processors, and one or more memories storing instructions for operations executed by the one or more processors and connected to the one or more processors. The operations may include transmitting configuration information related to the PUSCH, transmitting downlink control information scheduling the transmission of the PUSCH, and receiving the PUSCH transmitted through a transmission unit and a beam based on the downlink control information. The downlink control information may include information representing an SRS resource associated with the beam. The transmission unit may be determined based on transmission unit identification information configured in an SRS resource set including the SRS resource.

In an apparatus comprising one or more memories and one or more processors functionally connected to the one or more memories according to an embodiment of the present disclosure, the one or more processors control the apparatus to receive configuration information related to the PUSCH, receive downlink control information scheduling the transmission of the PUSCH, and transmit the PUSCH through a transmission unit and a beam determined based on the downlink control information. The downlink control information may include information representing an SRS resource associated with the beam. The transmission unit may be determined based on transmission unit identification information configured in an SRS resource set including the SRS resource.

In one or more non-transitory computer-readable media storing one or more instructions according to an embodiment of the present disclosure, the one or more instructions executable by one or more processors control a user equipment (UE) to receive configuration information related to the PUSCH, the UE to receive downlink control information scheduling the transmission of the PUSCH, and the UE to transmit the PUSCH through a transmission unit and a beam determined based on the downlink control information. The downlink control information may include information representing an SRS resource associated with the beam. The transmission unit may be determined based on transmission unit identification information configured in an SRS resource set including the SRS resource.

Advantageous Effects

According to an embodiment of the present disclosure, there is an effect in that a base station can control uplink transmission in a specific panel unit and/or specific beam unit of a UE in relation to an operation of performing, by a UE, uplink transmission.

Furthermore, according to an embodiment of the present disclosure, there is an effect in that a configuration and/or indication of panel and/or beam selective uplink transmission accompanied by enhanced power control of a panel and/or beam unit can be performed.

Effects which may be obtained by the present disclosure are not limited to the aforementioned effects, and other technical effects not described above may be evidently understood by a person having ordinary skill in the art to which the present disclosure pertains from the following description.

DESCRIPTION OF DRAWINGS

The accompanying drawings, which are included to provide a further understanding of the present disclosure and constitute a part of the detailed description, illustrate embodiments of the present disclosure and together with the description serve to explain the principle of the present disclosure.

FIG. 1 is a diagram illustrating an example of an overall system structure of NR to which a method proposed in the present disclosure is applicable.

FIG. 2 illustrates a relationship between an uplink frame and a downlink frame in a wireless communication system to which a method proposed by the present disclosure is applicable.

FIG. 3 illustrates an example of a frame structure in an NR system.

FIG. 4 illustrates an example of a resource grid supported by a wireless communication system to which a method proposed in the present disclosure is applicable.

FIG. 5 illustrates examples of a resource grid for each antenna port and numerology to which a method proposed in the present disclosure is applicable.

FIG. 6 illustrates physical channels and general signal transmission used in a 3GPP system.

FIG. 7 illustrates an example of beamforming using SSB and CSI-RS.

FIG. 8 illustrates an example of a UL BM procedure using an SRS.

FIG. 9 is a flowchart showing an example of a UL BM procedure using the SRS.

FIG. 10 is a flowchart showing an example of a method for performing an Idle mode DRX operation.

FIG. 11 is a diagram illustrating an example of an Idle mode DRX operation.

FIG. 12 is a flowchart showing an example of a method for performing a C-DRX operation.

FIG. 13 is a diagram illustrating an example of a C-DRX operation.

FIG. 14 is a diagram illustrating an example of power consumption depending on a state of a UE.

FIG. 15 illustrates an example of a PUSCH transmission and reception procedure to which a method proposed in the present disclosure may be applied.

FIG. 16 illustrates an example of a PUCCH transmission and reception procedure to which a method proposed in the present disclosure may be applied.

FIG. 17 illustrates an example of an SRS transmission and reception procedure to which a method proposed in the present disclosure may be applied.

FIG. 18 illustrates an example of an operating flowchart of a UE which performs SRS transmission based on the scheduling of a panel unit and/or a beam unit to which a method proposed in the present disclosure may be applied.

FIG. 19 illustrates an example of an operating flowchart of a base station which performs SRS reception based on the scheduling of a panel unit and/or a beam unit to which a method proposed in the present disclosure may be applied.

FIG. 20 illustrates an example of an operating flowchart of a UE which transmits a physical uplink shared channel (PUSCH) in a wireless communication system to which a method proposed in the present disclosure may be applied.

FIG. 21 illustrates an example of an operating flowchart of a base station which receives a physical uplink shared channel (PUSCH) in a wireless communication system to which a method proposed in the present disclosure may be applied.

FIG. 22 illustrates a communication system 2000 applied to the present disclosure.

FIG. 23 illustrates a wireless apparatus which may be applied to the present disclosure.

FIG. 24 illustrates a signal processing circuit for a transmission signal.

FIG. 25 illustrates another example of a wireless apparatus applied to the present disclosure. The wireless apparatus may be implemented in various forms depending on a usage-example/service.

FIG. 26 illustrates a portable device applied to the present disclosure.

MODE FOR INVENTION

Hereinafter, preferred embodiments of the disclosure are described in detail with reference to the accompanying drawings. The following detailed description taken in conjunction with the accompanying drawings is intended for describing example embodiments of the disclosure, but not for representing a sole embodiment of the disclosure. The detailed description below includes specific details to convey a thorough understanding of the disclosure. However, it will be easily appreciated by one of ordinary skill in the art that embodiments of the disclosure may be practiced even without such details.

In some cases, to avoid ambiguity in concept, known structures or devices may be omitted or be shown in block diagrams while focusing on core features of each structure and device.

Hereinafter, downlink (DL) means communication from a base station to a terminal and uplink (UL) means communication from the terminal to the base station. In the downlink, a transmitter may be part of the base station, and a receiver may be part of the terminal. In the uplink, the transmitter may be part of the terminal and the receiver may be part of the base station. The base station may be expressed as a first communication device and the terminal may be expressed as a second communication device. A base station (BS) may be replaced with terms including a fixed station, a Node B, an evolved-NodeB (eNB), a Next Generation NodeB (gNB), a base transceiver system (BTS), an access point (AP), a network (5G network), an AI system, a road side unit (RSU), a vehicle, a robot, an Unmanned Aerial Vehicle (UAV), an Augmented Reality (AR) device, a Virtual Reality (VR) device, and the like. Further, the terminal may be fixed or mobile and may be replaced with terms including a User Equipment (UE), a Mobile Station (MS), a user terminal (UT), a Mobile Subscriber Station (MSS), a Subscriber Station (SS), an Advanced Mobile Station (AMS), a Wireless Terminal (WT), a Machine-Type Communication (MTC) device, a Machine-to-Machine (M2M) device, and a Device-to-Device (D2D) device, the vehicle, the robot, an AI module, the Unmanned Aerial Vehicle (UAV), the Augmented Reality (AR) device, the Virtual Reality (VR) device, and the like.

The following technology may be used in various wireless access systems, such as code division multiple access (CDMA), frequency division multiple access (FDMA), time division multiple access (TDMA), orthogonal frequency division multiple access (OFDMA), single carrier-FDMA (SC-FDMA), non-orthogonal multiple access (NOMA), and the like. The CDMA may be implemented by radio technology such as universal terrestrial radio access (UTRA) or CDMA2000. The TDMA may be implemented by radio technology such as global system for mobile communications (GSM)/general packet radio service (GPRS)/enhanced data rates for GSM evolution (EDGE). The OFDMA may be implemented as radio technology such as IEEE 802.11(Wi-Fi), IEEE 802.16 (WiMAX), IEEE 802-20, E-UTRA (evolved UTRA), and the like. The UTRA is a part of a universal mobile telecommunication system (UMTS). 3rd generation partnership project (3GPP) long term evolution (LTE), as a part of an evolved UMTS (E-UMTS) using E-UTRA, adopts the OFDMA in the downlink and the SC-FDMA in the uplink. LTE-A (advanced) is the evolution of 3GPP LTE.

For clarity of description, the present disclosure is described based on the 3GPP communication system (e.g., LTE-A or NR), but the technical spirit of the present disclosure are not limited thereto. LTE means technology after 3GPP TS 36.xxx Release 8. In detail, LTE technology after 3GPP TS 36.xxx Release 10 is referred to as the LTE-A and LTE technology after 3GPP TS 36.xxx Release 13 is referred to as the LTE-A pro. The 3GPP NR means technology after TS 38.xxx Release 15. The LTE/NR may be referred to as a 3GPP system. "xxx" means a standard document detail number. The LTE/NR may be collectively referred to as the 3GPP system. Matters disclosed in a standard document published before the present disclosure may refer to a background art, terms, abbreviations, etc., used for describing the present disclosure. For example, the following documents may be referenced.

3GPP LTE
- 36.211: Physical channels and modulation
- 36.212: Multiplexing and channel coding
- 36.213: Physical layer procedures
- 36.300: Overall description
- 36.331: Radio Resource Control (RRC)

3GPP NR
- 38.211: Physical channels and modulation
- 38.212: Multiplexing and channel coding
- 38.213: Physical layer procedures for control
- 38.214: Physical layer procedures for data
- 38.300: NR and NG-RAN Overall Description
- 36.331: Radio Resource Control (RRC) protocol specification As more and more communication devices require larger communication capacity, there is a need for improved mobile broadband communication compared to the existing radio access technology (RAT). Further, massive machine type communications (MTCs), which provide various services anytime and anywhere by connecting many devices and objects, are one of the major issues to be considered in the next generation communication. In addition, a communication system design considering a service/UE sensitive to reliability and latency is being discussed. As such, the introduction of next-generation radio access technology considering enhanced mobile broadband communication (eMBB), massive MTC (mMTC), ultra-reliable and low latency communication (URLLC) is discussed, and in the present disclosure, the technology is called NR for convenience. The NR is an expression representing an example of 5G radio access technology (RAT).

Three major requirement areas of 5G include (1) an enhanced mobile broadband (eMBB) area, (2) a massive machine type communication (mMTC) area and (3) an ultra-reliable and low latency communications (URLLC) area.

Some use cases may require multiple areas for optimization, and other use case may be focused on only one key performance indicator (KPI). 5G support such various use cases in a flexible and reliable manner.

eMBB is far above basic mobile Internet access and covers media and entertainment applications in abundant bidirectional tasks, cloud or augmented reality. Data is one of key motive powers of 5G, and dedicated voice services may not be first seen in the 5G era. In 5G, it is expected that voice will be processed as an application program using a data connection simply provided by a communication system. Major causes for an increased traffic volume include an increase in the content size and an increase in the number of applications that require a high data transfer rate. Streaming service (audio and video), dialogue type video and mobile Internet connections will be used more widely as more devices are connected to the Internet. Such many application programs require connectivity always turned on in order to push real-time information and notification to a user. A cloud storage and application suddenly increases in the mobile communication platform, and this may be applied to both business and entertainment. Furthermore, cloud storage is a special use case that tows the growth of an uplink data transfer rate. 5G is also used for remote business of cloud. When a tactile interface is used, further lower end-to-end latency is required to maintain excellent user experiences. Entertainment, for example, cloud game and video streaming are other key elements which increase a need for the mobile broadband ability. Entertainment is essential in the smartphone and tablet anywhere including high mobility environments, such as a train, a vehicle and an airplane. Another use case is augmented reality and information search for entertainment. In this case, augmented reality requires very low latency and an instant amount of data.

Furthermore, one of the most expected 5G use case relates to a function capable of smoothly connecting embedded sensors in all fields, that is, mMTC. Until 2020, it is expected that potential IoT devices will reach 20.4 billions. The industry IoT is one of areas in which 5G performs major roles enabling smart city, asset tracking, smart utility, agriculture and security infra.

URLLC includes a new service which will change the industry through remote control of major infra and a link having ultra reliability/low available latency, such as a self-driving vehicle. A level of reliability and latency is essential for smart grid control, industry automation, robot engineering, drone control and adjustment.

Multiple use cases are described more specifically.

5G may supplement fiber-to-the-home (FTTH) and cable-based broadband (or DOCSIS) as means for providing a stream evaluated from gigabits per second to several hundreds of mega bits per second. Such fast speed is necessary to deliver TV with resolution of 4K or more (6K, 8K or more) in addition to virtual reality and augmented reality. Virtual reality (VR) and augmented reality (AR) applications include immersive sports games. A specific application program may require a special network configuration. For example, in the case of VR game, in order for game companies to minimize latency, a core server may need to be integrated with the edge network server of a network operator.

An automotive is expected to be an important and new motive power in 5G, along with many use cases for the mobile communication of an automotive. For example, entertainment for a passenger requires a high capacity and a high mobility mobile broadband at the same time. The reason for this is that future users continue to expect a high-quality connection regardless of their location and speed. Another use example of the automotive field is an augmented reality dashboard. The augmented reality dashboard overlaps and displays information, identifying an object in the dark and notifying a driver of the distance and movement of the object, over a thing seen by the driver through a front window. In the future, a wireless module enables communication between automotives, information exchange between an automotive and a supported infrastructure, and information exchange between an automotive and other connected devices (e.g., devices accompanied by a pedestrian). A safety system guides alternative courses of a behavior so that a driver can drive more safely, thereby reducing a danger of an accident. A next step will be a remotely controlled or self-driven vehicle. This requires very reliable, very fast communication between different self-driven vehicles and between an automotive and infra. In the future, a self-driven vehicle may perform all driving activities, and a driver will be focused on things other than traffic, which cannot be identified by an automotive itself. Technical requirements of a self-driven vehicle require ultra-low latency and ultra-high speed reliability so that traffic safety is increased up to a level which cannot be achieved by a person.

A smart city and smart home mentioned as a smart society will be embedded as a high-density radio sensor network. The distributed network of intelligent sensors will identify the cost of a city or home and a condition for energy-efficient maintenance. A similar configuration may be performed for each home. All of a temperature sensor, a window and heating controller, a burglar alarm and home appliances are wirelessly connected. Many of such sensors are typically a low data transfer rate, low energy and a low cost. However, for example, real-time HD video may be required for a specific type of device for surveillance.

The consumption and distribution of energy including heat or gas are highly distributed and thus require automated control of a distributed sensor network. A smart grid collects information, and interconnects such sensors using digital information and a communication technology so that the sensors operate based on the information. The information may include the behaviors of a supplier and consumer, and thus the smart grid may improve the distribution of fuel, such as electricity, in an efficient, reliable, economical, production-sustainable and automated manner. The smart grid may be considered to be another sensor network having small latency.

A health part owns many application programs which reap the benefits of mobile communication. A communication system can support remote treatment providing clinical treatment at a distant place. This helps to reduce a barrier for the distance and can improve access to medical services which are not continuously used at remote farming areas. Furthermore, this is used to save life in important treatment and an emergency condition. A radio sensor network based on mobile communication can provide remote monitoring and sensors for parameters, such as the heart rate and blood pressure.

Radio and mobile communication becomes increasingly important in the industry application field. Wiring requires a high installation and maintenance cost. Accordingly, the possibility that a cable will be replaced with reconfigurable radio links is an attractive opportunity in many industrial fields. However, to achieve the possibility requires that a radio connection operates with latency, reliability and capacity similar to those of the cable and that management is simplified. Low latency and a low error probability is a new requirement for a connection to 5G.

Logistics and freight tracking is an important use case for mobile communication, which enables the tracking inventory and packages anywhere using a location-based information system. The logistics and freight tracking use case typically requires a low data speed, but a wide area and reliable location information.

In a New RAT system including NR uses an OFDM transmission scheme or a similar transmission scheme thereto. The new RAT system may follow OFDM parameters different from OFDM parameters of LTE. Alternatively, the new RAT system may follow numerology of conventional LTE/LTE-A as it is or have a larger system bandwidth (e.g., 100 MHz). Alternatively, one cell may support a plurality of numerologies. In other words, UEs that operate with different numerologies may coexist in one cell.

The numerology corresponds to one subcarrier spacing in a frequency domain. By scaling a reference subcarrier spacing by an integer N, different numerologies can be defined.

Definition of Terms eLTE eNB: The eLTE eNB is the evolution of eNB that supports connectivity to EPC and NGC.

gNB: A node which supports the NR as well as connectivity to NGC.

New RAN: A radio access network which supports either NR or E-UTRA or interfaces with the NGC.

Network slice: A network slice is a network defined by the operator customized to provide an optimized solution for a specific market scenario which demands specific requirements with end-to-end scope.

Network function: A network function is a logical node within a network infrastructure that has well-defined external interfaces and well-defined functional behavior.

NG-C: A control plane interface used at an NG2 reference point between new RAN and NGC.

NG-U: A user plane interface used at an NG3 reference point between new RAN and NGC.

Non-standalone NR: A deployment configuration where the gNB requires an LTE eNB as an anchor for control plane connectivity to EPC, or requires an eLTE eNB as an anchor for control plane connectivity to NGC.

Non-standalone E-UTRA: A deployment configuration where the eLTE eNB requires a gNB as an anchor for control plane connectivity to NGC.

User plane gateway: An end point of NG-U interface.
Overview of System

FIG. 1 illustrates an example overall NR system structure to which a method as proposed in the disclosure may apply.

Referring to FIG. 1, an NG-RAN is constituted of gNBs to provide a control plane (RRC) protocol end for user equipment (UE) and NG-RA user plane (new AS sublayer/PDCP/RLC/MAC/PHY).

The gNBs are mutually connected via an Xn interface.

The gNBs are connected to the NGC via the NG interface.

More specifically, the gNB connects to the access and mobility management function (AMF) via the N2 interface and connects to the user plane function (UPF) via the N3 interface.
New RAT (NR) Numerology and Frame Structure In the NR system, a number of numerologies may be supported. Here, the numerology may be defined by the subcarrier spacing and cyclic prefix (CP) overhead. At this time, multiple subcarrier spacings may be derived by scaling the basic subcarrier spacing by integer N (or, μ). Further, although it is assumed that a very low subcarrier spacing is not used at a very high carrier frequency, the numerology used may be selected independently from the frequency band.

Further, in the NR system, various frame structures according to multiple numerologies may be supported.

Hereinafter, an orthogonal frequency division multiplexing (OFDM) numerology and frame structure that may be considered in the NR system is described.

The multiple OFDM numerologies supported in the NR system may be defined as shown in Table 1.

TABLE 1

| μ | $\Delta f = 2^\mu \cdot 15$[kHz] | Cyclic prefix |
| --- | --- | --- |
| 0 | 15 | Normal |
| 1 | 30 | Normal |
| 2 | 60 | Normal, Extended |
| 3 | 120 | Normal |
| 4 | 240 | Normal |

NR supports multiple numerologies (or subcarrier spacings (SCS)) for supporting various 5G services. For example, if SCS is 15 kHz, NR supports a wide area in typical cellular bands. If SCS is 30 kHz/60 kHz, NR supports a dense urban, lower latency and a wider carrier bandwidth. If SCS is 60 kHz or higher, NR supports a bandwidth greater than 24.25 GHz in order to overcome phase noise.

An NR frequency band is defined as a frequency range of two types FR1 and FR2. The FR1 and the FR2 may be configured as in Table 1 below. Furthermore, the FR2 may mean a millimeter wave (mmW).

TABLE 2

| Frequency Range designation | Corresponding frequency range | Subcarrier Spacing |
| --- | --- | --- |
| FR1 | 410 MHz-7125 MHz | 15, 30, 60 kHz |
| FR2 | 24250 MHz-52600 MHz | 60, 120, 240 kHz |

With regard to the frame structure in the NR system, the size of various fields in the time domain is expressed as a multiple of time unit of $T_s=1/(\Delta f_{max} \cdot N_f)$, where $\Delta f_{max}=480 \cdot 10^3$, and $N_f=4096$. Downlink and uplink transmissions is constituted of a radio frame with a period of $T_f=(\Delta f_{max} N_f/100) \cdot T_s=10$ ms. Here, the radio frame is constituted of 10 subframes each of which has a period of $T_{sf}=(\Delta f_{max} N_f/1000) \cdot T_s=1$ ms. In this case, one set of frames for uplink and one set of frames for downlink may exist.

FIG. 2 illustrates a relationship between an uplink frame and downlink frame in a wireless communication system to which a method described in the present disclosure is applicable.

As illustrated in FIG. 2, uplink frame number i for transmission from the user equipment (UE) should begin $T_{TA}=N_{TA}T_s$ earlier than the start of the downlink frame by the UE.

For numerology μ, slots are numbered in ascending order of $n_s^\mu \in \{0, \ldots, N_{subframe}^{slots,\mu}-1\}$ in the subframe and in ascending order of $n_{s,f}^\mu \in \{0, \ldots, N_{frame}^{slots,\mu}-1\}$ in the radio frame. One slot includes consecutive OFDM symbols of $N_{symb}^\mu$, and $N_{symb}^\mu$ is determined according to the used numerology and slot configuration. In the subframe, the start of slot $n_s^\mu$ is temporally aligned with the start of $n_s^\mu N_{symb}^\mu$.

Not all UEs are able to transmit and receive at the same time, and this means that not all OFDM symbols in a downlink slot or an uplink slot are available to be used.

Table 3 represents the number $N_{symb}^{slot}$ of OFDM symbols per slot, the number $N_{slot}^{frame,\mu}$ of slots per radio frame, and the number $N_{slot}^{subframe,\mu}$ of slots per subframe in a normal CP. Table 4 represents the number of OFDM symbols per slot, the number of slots per radio frame, and the number of slots per subframe in an extended CP.

TABLE 3

| μ | $N_{symb}^{slot}$ | $N_{slot}^{frame, \mu}$ | $N_{slot}^{subframe, \mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

TABLE 4

| μ | $N_{symb}^{slot}$ | $N_{slot}^{frame, \mu}$ | $N_{slot}^{subframe, \mu}$ |
|---|---|---|---|
| 2 | 12 | 40 | 4 |

FIG. 3 illustrates an example of a frame structure in a NR system. FIG. 3 is merely for convenience of explanation and does not limit the scope of the present disclosure.

In Table 4, in case of μ=2, i.e., as an example in which a subcarrier spacing (SCS) is 60 kHz, one subframe (or frame) may include four slots with reference to Table 3, and one subframe={1, 2, 4} slots shown in FIG. 3, for example, the number of slot(s) that may be included in one subframe may be defined as in Table 3.

Further, a mini-slot may consist of 2, 4, or 7 symbols, or may consist of more symbols or less symbols.

In regard to physical resources in the NR system, an antenna port, a resource grid, a resource element, a resource block, a carrier part, etc. may be considered.

Hereinafter, the above physical resources that can be considered in the NR system are described in more detail.

First, in regard to an antenna port, the antenna port is defined so that a channel over which a symbol on an antenna port is conveyed can be inferred from a channel over which another symbol on the same antenna port is conveyed. When large-scale properties of a channel over which a symbol on one antenna port is conveyed can be inferred from a channel over which a symbol on another antenna port is conveyed, the two antenna ports may be regarded as being in a quasi co-located or quasi co-location (QC/QCL) relation. Here, the large-scale properties may include at least one of delay spread, Doppler spread, frequency shift, average received power, and received timing.

FIG. 4 illustrates an example of a resource grid supported in a wireless communication system to which a method proposed in the present disclosure is applicable.

Referring to FIG. 4, a resource grid consists of $N_{RB}^{\mu} N_{sc}^{RB}$ subcarriers on a frequency domain, each subframe consisting of 14·2μ OFDM symbols, but the present disclosure is not limited thereto.

In the NR system, a transmitted signal is described by one or more resource grids, consisting of $N_{RB}^{\mu} N_{sc}^{RB}$ subcarriers, and $2^{\mu} N_{symb}^{(\mu)}$ OFDM symbols, where $N_{RB}^{\mu} \leq N_{RB}^{max,\mu}$. $N_{RB}^{max,\mu}$ denotes a maximum transmission bandwidth and may change not only between numerologies but also between uplink and downlink.

In this case, as illustrated in FIG. 5, one resource grid may be configured per numerology μ and antenna port p.

FIG. 5 illustrates examples of a resource grid per antenna port and numerology to which a method proposed in the present disclosure is applicable.

Each element of the resource grid for the numerology μ and the antenna port p is called a resource element and is uniquely identified by an index pair (k, l̄), where k=0, . . . , $N_{RB}^{\mu} N_{sc}^{RB}$−1 is an index on a frequency domain, and l̄=0, . . . , $2^{\mu} N_{symb}^{(\mu)}$−1 refers to a location of a symbol in a subframe. The index pair (k, l̄) is used to refer to a resource element in a slot, where l=0, . . . , $N_{symb}^{\mu}$−1.

The resource element (k, l̄) for the numerology μ and the antenna port p corresponds to a complex value $a_{k,\bar{l}}^{(p,\mu)}$. When there is no risk for confusion or when a specific antenna port or numerology is not specified, the indexes p and μ may be dropped, and as a result, the complex value may be $a_{k,\bar{l}}^{(p)}$ or $a_{k,\bar{l}}$.

Further, a physical resource block is defined as $N_{sc}^{RB}$=12 consecutive subcarriers in the frequency domain.

Point A serves as a common reference point of a resource block grid and may be obtained as follows.

offsetToPointA for PCell downlink represents a frequency offset between the point A and a lowest subcarrier of a lowest resource block that overlaps a SS/PBCH block used by the UE for initial cell selection, and is expressed in units of resource blocks assuming 15 kHz subcarrier spacing for FR1 and 60 kHz subcarrier spacing for FR2;

absoluteFrequencyPointA represents frequency-location of the point A expressed as in absolute radio-frequency channel number (ARFCN).

The common resource blocks are numbered from 0 and upwards in the frequency domain for subcarrier spacing configuration μ.

The center of subcarrier 0 of common resource block 0 for the subcarrier spacing configuration μ coincides with 'point A'. A common resource block number $n_{CRB}^{\mu}$ in the frequency domain and resource elements (k, l) for the subcarrier spacing configuration μ may be given by the following Equation 1.

$$n_{CRB}^{\mu} = \left\lfloor \frac{k}{N_{sc}^{RB}} \right\rfloor \quad \text{[Equation 1]}$$

Here, k may be defined relative to the point A so that k=0 corresponds to a subcarrier centered around the point A. Physical resource blocks are defined within a bandwidth part (BWP) and are numbered from 0 to $N_{BWP,i}^{size}$−1, where i is No. of the BWP. A relation between the physical resource block $n_{PRB}$ in BWP i and the common resource block $n_{CRB}$ may be given by the following Equation 2.

$$n_{CRB} = n_{PRB} + N_{BWP,i}^{start} \quad \text{[Equation 2]}$$

Here, $N_{BWP,i}^{start}$ may be the common resource block where the BWP starts relative to the common resource block 0.

Physical Channel and General Signal Transmission

FIG. 6 illustrates physical channels and general signal transmission used in a 3GPP system. In a wireless communication system, the UE receives information from the eNB through Downlink (DL) and the UE transmits information from the eNB through Uplink (UL). The information which the eNB and the UE transmit and receive includes data and various control information and there are various physical channels according to a type/use of the information which the eNB and the UE transmit and receive.

When the UE is powered on or newly enters a cell, the UE performs an initial cell search operation such as synchronizing with the eNB (S601). To this end, the UE may receive a Primary Synchronization Signal (PSS) and a (Secondary Synchronization Signal (SSS) from the eNB and synchronize with the eNB and acquire information such as a cell ID or the like. Thereafter, the UE may receive a Physical Broadcast Channel (PBCH) from the eNB and acquire in-cell broadcast information. Meanwhile, the UE receives a Downlink Reference Signal (DL RS) in an initial cell search step to check a downlink channel status.

A UE that completes the initial cell search receives a Physical Downlink Control Channel (PDCCH) and a Physical Downlink Control Channel (PDSCH) according to information loaded on the PDCCH to acquire more specific system information (S602).

Meanwhile, when there is no radio resource first accessing the eNB or for signal transmission, the UE may perform a Random Access Procedure (RACH) to the eNB (S603 to S606). To this end, the UE may transmit a specific sequence to a preamble through a Physical Random Access Channel (PRACH) (S603 and S605) and receive a response message (Random Access Response (RAR) message) for the preamble through the PDCCH and a corresponding PDSCH. In the case of a contention based RACH, a Contention Resolution Procedure may be additionally performed (S606).

The UE that performs the above procedure may then perform PDCCH/PDSCH reception (S607) and Physical Uplink Shared Channel (PUSCH)/Physical Uplink Control Channel (PUCCH) transmission (S608) as a general uplink/downlink signal transmission procedure. In particular, the UE may receive Downlink Control Information (DCI) through the PDCCH. Here, the DCI may include control information such as resource allocation information for the UE and formats may be differently applied according to a use purpose.

Meanwhile, the control information which the UE transmits to the eNB through the uplink or the UE receives from the eNB may include a downlink/uplink ACK/NACK signal, a Channel Quality Indicator (CQI), a Precoding Matrix Index (PMI), a Rank Indicator (RI), and the like. The UE may transmit the control information such as the CQI/PMI/RI, etc., through the PUSCH and/or PUCCH.

Beam Management (BM)

A BM procedure as layer 1 (L1)/layer 2 (L2) procedures for acquiring and maintaining a set of base station (e.g., gNB, TRP, etc.) and/or terminal (e.g., UE) beams which may be used for downlink (DL) and uplink (UL) transmission/reception may include the following procedures and terms.

- Beam measurement: Operation of measuring characteristics of a beam forming signal received by the eNB or UE.
- Beam determination: Operation of selecting a transmit (Tx) beam/receive (Rx) beam of the eNB or UE by the eNB or UE.
- Beam sweeping: Operation of covering a spatial region using the transmit and/or receive beam for a time interval by a predetermined scheme.
- Beam report: Operation in which the UE reports information of a beamformed signal based on beam measurement.

The BM procedure may be divided into (1) a DL BM procedure using a synchronization signal (SS)/physical broadcast channel (PBCH) Block or CSI-RS and (2) a UL BM procedure using a sounding reference signal (SRS). Further, each BM procedure may include Tx beam sweeping for determining the Tx beam and Rx beam sweeping for determining the Rx beam.

Downlink Beam Management (DL BM)

The DL BM procedure may include (1) transmission of beamformed DL reference signals (RSs) (e.g., CIS-RS or SS Block (SSB)) of the eNB and (2) beam reporting of the UE.

Here, the beam reporting a preferred DL RS identifier (ID)(s) and L1-Reference Signal Received Power (RSRP).

The DL RS ID may be an SSB Resource Indicator (SSBRI) or a CSI-RS Resource Indicator (CRI).

FIG. 7 illustrates an example of beamforming using a SSB and a CSI-RS.

As illustrated in FIG. 7, a SSB beam and a CSI-RS beam may be used for beam measurement. A measurement metric is L1-RSRP per resource/block. The SSB may be used for coarse beam measurement, and the CSI-RS may be used for fine beam measurement. The SSB may be used for both Tx beam sweeping and Rx beam sweeping. The Rx beam sweeping using the SSB may be performed while the UE changes Rx beam for the same SSBRI across multiple SSB bursts. One SS burst includes one or more SSBs, and one SS burst set includes one or more SSB bursts.

DL BM Related Beam Indication

A UE may be RRC-configured with a list of up to M candidate transmission configuration indication (TCI) states at least for the purpose of quasi co-location (QCL) indication, where M may be 64.

Each TCI state may be configured with one RS set. Each ID of DL RS at least for the purpose of spatial QCL (QCL Type D) in an RS set may refer to one of DL RS types such as SSB, P-CSI RS, SP-CSI RS, A-CSI RS, etc.

Initialization/update of the ID of DL RS(s) in the RS set used at least for the purpose of spatial QCL may be performed at least via explicit signaling.

Table 6 represents an example of TCI-State IE.

The TCI-State IE associates one or two DL reference signals (RSs) with corresponding quasi co-location (QCL) types.

TABLE 5

```
-- ASN1START
-- TAG-TCI-STATE-START
TCI-State ::=              SEQUENCE {
    tci-StateId            TCI-StateId,
    qcl-Type1              QCL-Info,
    qcl-Type2              QCL-Info
    ...
}
QCL-Info ::=               SEQUENCE {
    cell                   ServCellIndex
    bwp-Id                 BWP-Id
    referenceSignal        CHOICE {
        csi-rs             NZP-CSI-RS-ResourceId,
        ssb                SSB-Index
    },
    qcl-Type               Enumerated {typeA, typeB, typeC, typeD},
    ...
}
-- TAG-TCI-STATE-STOP
-- ASN1STOP
```

In Table 5, bwp-ld parameter represents a DL BWP where the RS is located, cell parameter represents a carrier where the RS is located, and reference signal parameter represents reference antenna port(s) which is a source of quasi co-location for corresponding target antenna port(s) or a reference signal including the one. The target antenna port(s) may be CSI-RS, PDCCH DMRS, or PDSCH DMRS. As an example, in order to indicate QCL reference RS information on NZP CSI-RS, the corresponding TCI state ID may be indicated to NZP CSI-RS resource configuration information. As another example, in order to indicate QCL reference information on PDCCH DMRS antenna port(s), the TCI state ID may be indicated to each CORESET configuration. As another example, in order to indicate QCL reference information on PDSCH DMRS antenna port(s), the TCI state ID may be indicated via DCI.

Quasi-Co Location (QCL)

The antenna port is defined so that a channel over which a symbol on an antenna port is conveyed can be inferred from a channel over which another symbol on the same antenna port is conveyed. When properties of a channel over which a symbol on one antenna port is conveyed can be inferred from a channel over which a symbol on another antenna port is conveyed, the two antenna ports may be considered as being in a quasi co-located or quasi co-location (QC/QCL) relationship.

The channel properties include one or more of delay spread, Doppler spread, frequency/Doppler shift, average received power, received timing/average delay, and spatial RX parameter. The spatial Rx parameter means a spatial (reception) channel property parameter such as an angle of arrival.

The UE may be configured with a list of up to M TCI-State configurations within the higher layer parameter PDSCH-Config to decode PDSCH according to a detected PDCCH with DCI intended for the corresponding UE and a given serving cell, where M depends on UE capability.

Each TCI-State contains parameters for configuring a quasi co-location relationship between one or two DL reference signals and the DM-RS ports of the PDSCH.

The quasi co-location relationship is configured by the higher layer parameter qcl-Type1 for the first DL RS and qcl-Type2 for the second DL RS (if configured). For the case of two DL RSs, the QCL types are not be the same, regardless of whether the references are to the same DL RS or different DL RSs.

The quasi co-location types corresponding to each DL RS are given by the higher layer parameter qcl-Type of QCL-Info and may take one of the following values:
- 'QCL-TypeA': {Doppler shift, Doppler spread, average delay, delay spread}
- 'QCL-TypeB': {Doppler shift, Doppler spread}
- 'QCL-TypeC': {Doppler shift, average delay}
- 'QCL-TypeD': {Spatial Rx parameter}

For example, if a target antenna port is a specific NZP CSI-RS, the corresponding NZP CSI-RS antenna ports may be indicated/configured to be QCLed with a specific TRS in terms of QCL-TypeA and with a specific SSB in terms of QCL-TypeD. The UE receiving the indication/configuration may receive the corresponding NZP CSI-RS using the Doppler or delay value measured in the QCL-TypeA TRS and apply the Rx beam used for QCL-TypeD SSB reception to the reception of the corresponding NZP CSI-RS reception.

The UE may receive an activation command by MAC CE signaling used to map up to eight TCI states to the codepoint of the DCI field 'Transmission Configuration Indication'.

UL BM Procedure

A UL BM may be configured such that beam reciprocity (or beam correspondence) between Tx beam and Rx beam is established or not established depending on the UE implementation. If the beam reciprocity between Tx beam and Rx beam is established in both a base station and a UE, a UL beam pair may be adjusted via a DL beam pair. However, if the beam reciprocity between Tx beam and Rx beam is not established in any one of the base station and the UE, a process for determining the UL beam pair is necessary separately from determining the DL beam pair.

Even when both the base station and the UE maintain the beam correspondence, the base station may use a UL BM procedure for determining the DL Tx beam even if the UE does not request a report of a (preferred) beam.

The UM BM may be performed via beamformed UL SRS transmission, and whether to apply UL BM of a SRS resource set is configured by the (higher layer parameter) usage. If the usage is set to 'BeamManagement (BM)', only one SRS resource may be transmitted to each of a plurality of SRS resource sets in a given time instant.

The UE may be configured with one or more sounding reference symbol (SRS) resource sets configured by (higher layer parameter) SRS-ResourceSet (via higher layer signaling, RRC signaling, etc.). For each SRS resource set, the UE may be configured with K≤1 SRS resources (higher later parameter SRS-resource), where K is a natural number, and a maximum value of K is indicated by SRS_capability.

In the same manner as the DL BM, the UL BM procedure may be divided into a UE's Tx beam sweeping and a base station's Rx beam sweeping.

FIG. 8 illustrates an example of an UL BM procedure using a SRS.

More specifically, (a) of FIG. 8 illustrates an Rx beam determination procedure of a base station, and (a) of FIG. 8 illustrates a Tx beam sweeping procedure of a UE.

FIG. 9 is a flow chart illustrating an example of an UL BM procedure using a SRS.

The UE receives, from the base station, RRC signaling (e.g., SRS-Config IE) including (higher layer parameter) usage parameter set to 'beam management' in S910.

Table 6 represents an example of SRS-Config information element (IE), and the SRS-Config IE is used for SRS transmission configuration. The SRS-Config IE contains a list of SRS-Resources and a list of SRS-Resource sets. Each SRS resource set means a set of SRS resources.

The network may trigger transmission of the SRS resource set using configured aperiodicSRS-ResourceTrigger (L1 DCI).

TABLE 6

```
-- ASN1START
-- TAG-MAC-CELL-GROUP-CONFIG-START
SRS-Config ::=                      SEQUENCE {
    srs-ResourceSetToReleaseList            SEQUENCE (SIZE(1..maxNrofSRS-
ResourceSets)) OF SRS-ResourceSetId         OPTIONAL,       -- Need N
    srs-ResourceSetToAddModList             SEQUENCE (SIZE(1..maxNrofSRS-
ResourceSets)) OF SRS-ResourceSet                   OPTIONAL,       -- Need N
    srs-ResourceToReleaseList               SEQUENCE (SIZE(1..maxNrofSRS-
Resources)) OF SRS-ResourceId                       OPTIONAL,       -- Need N
    srs-ReSourceToAddModList                SEQUENCE (SIZE(1..maxNrofSRS-
Resources)) OF SRS-Resource                         OPTIONAL,       -- Need N
    tpc-Accumulation                        ENUMERATED {disabled}
    ...
}
```

TABLE 6-continued

```
SRS-ResourceSet ::=              SEQUENCE {
    srs-ResourceSetId                SRS-ResourceSetId,
    srs-ResourceIdList               SEQUENCE (SIZE(1..maxNrofSRS-
ResourcesPerSet)) OF SRS-ResourceId    OPTIONAL, -- Cond Setup
    resourceType                     CHOICE {
        aperiodic                        SEQUENCE {
            aperiodicSRS-ResourceTrigger         INTEGER (1..maxNrofSRS-
TriggerStates-1),
            csi-RS                               NZP-CSI-RS-ResourceId
            slotOffset                           INTEGER (1..32)
            ...
        },
        send-persistent                  SEQUENCE {
            associatedCSI-RS                     NZP-CSI-RS-ResourceId
            ...
        },
        periodic                         SEQUENCE {
            associatedCSI-RS                     NZP-CSI-RS-ResourceId
            ...
        }
    },
    usage                            ENUMERATED {beamManagement,
codebook, nonCodebook, antennaSwitching},
    alpha                            Alpha
    p0                               INTEGER (-202..24)
    pathlossReferenceRS              CHOICE {
        ssb-Index                        SSB-Index,
        csi-RS-Index                     NZP-CSI-RS-ResourceId
SRS-SpatialRelationInfo ::=      SEQUENCE {
    servingCellId                    ServCellIndex
    referenceSignal                  CHOICE {
        ssb-Index                        SSB-Index,
        csi-RS-Index                     NZP-CSI-RS-ResourceId,
        srs                              SEQUENCE {
            resourceId                           SRS-ResourceId,
            uplinkBWP                            BWP-Id
        }
    }
}
SRS-ResourceId ::=               INTEGER (0..maxNrofSRS-Resources-1)
```

In Table 6, usage refers to a higher layer parameter to indicate whether the SRS resource set is used for beam management or is used for codebook based or non-codebook based transmission. The usage parameter corresponds to L1 parameter 'SRS-SetUse'. 'spatialRelationInfo' is a parameter representing a configuration of spatial relation between a reference RS and a target SRS. The reference RS may be SSB, CSI-RS, or SRS which corresponds to L1 parameter 'SRS-SpatialRelationInfo'. The usage is configured per SRS resource set.

The UE determines the Tx beam for the SRS resource to be transmitted based on SRS-SpatialRelation Info contained in the SRS-Config IE in S920. The SRS-SpatialRelation Info is configured per SRS resource and indicates whether to apply the same beam as the beam used for SSB, CSI-RS, or SRS per SRS resource. Further, SRS-SpatialRelationInfo may be configured or not configured in each SRS resource.

If the SRS-SpatialRelationInfo is configured in the SRS resource, the same beam as the beam used for SSB, CSI-RS or SRS is applied for transmission. However, if the SRS-SpatialRelationInfo is not configured in the SRS resource, the UE randomly determines the Tx beam and transmits the SRS via the determined Tx beam in S930.

More specifically, for P-SRS with 'SRS-ResourceConfigType' set to 'periodic':

i) if SRS-SpatialRelationInfo is set to 'SSB/PBCH,' the UE transmits the corresponding SRS resource with the same spatial domain transmission filter (or generated from the corresponding filter) as the spatial domain Rx filter used for the reception of the SSB/PBCH, or ii) if SRS-SpatialRelationInfo is set to 'CSI-RS,' the UE transmits the SRS resource with the same spatial domain transmission filter used for the reception of the periodic CSI-RS or SP CSI-RS; or iii) if SRS-SpatialRelationInfo is set to 'SRS,' the UE transmits the SRS resource with the same spatial domain transmission filter used for the transmission of the periodic SRS.

Even if 'SRS-ResourceConfigType' is set to 'SP-SRS' or 'AP-SRS,' the beam determination and transmission operations may be applied similar to the above.

Additionally, the UE may receive or may not receive feedback for the SRS from the base station, as in the following three cases in S940.

i) If Spatial_Relation_Info is configured for all the SRS resources within the SRS resource set, the UE transmits the SRS with the beam indicated by the base station. For example, if the Spatial_Relation_Info indicates all the same SSB, CRI, or SRI, the UE repeatedly transmits the SRS with the same beam. This case corresponds to (a) of FIG. 8 as the usage for the base station to select the Rx beam.

ii) The Spatial_Relation_Info may not be configured for all the SRS resources within the SRS resource set. In this case, the UE may perform transmission while freely changing SRS beams. That is, this case corresponds to (b) of FIG. 8 as the usage for the UE to sweep the Tx beam.

iii) The Spatial_Relation_Info may be configured for only some SRS resources within the SRS resource set. In this case, the UE may transmit the configured SRS resources with the indicated beam, and transmit the SRS resources, for which Spatial_Relation_Info is not configured, by randomly applying the Tx beam.

Discontinuous Reception Related Operation

3GPP LTE 36.304: UE procedures in idle mode
    36.321: Medium Access Control (MAC) protocol
    36.331: Radio Resource Control (RRC)

3GPP NR 38.304: UE procedures in idle mode and in RRC Inactive state
    38.321: Medium Access Control (MAC) protocol
    38.331: Radio Resource Control (RRC)

Discontinuous Reception (DRX) means an operation mode of allowing the UE to reduce battery consumption so as for the UE to discontinuously receive a downlink channel. In other words, a UE in which the DRX is configured discontinuously receives a DL signal to reduce power consumption. A DRX operation is performed in a DRX cycle representing a time interval in which On Duration is periodically repeated and the DRX cycle includes the On Duration and a slip interval (alternatively, Opportunity for DRX). The On Duration represents a time interval which the UE monitors in order to receive the PDCCH. The DRX may be performed in a Radio Resource Control (RRC)_IDLE state (or mode), an RRC_INACTIVE state (or mode), and an RRC_CONNECTED state (or mode). In the RRC_IDLE state and the RRC_INACTIVE state, the DRX is used for discontinuously receiving a paging signal.

RRC_Idle state: State in which a wireless connection (RRC connection) is not configured between the eNB and the UE.
    RRC Inactive state: State in which the wireless connection (RRC connection) is configured between the eNB and the UE, but the wireless connection is inactivated.
    RRC_Connected state: State in which the wireless connection (RRC connection) is configured between the eNB and the UE.

The DRX is generally divided into Idle mode DRX, Connected DRX(C-DRX), and extended DRX, and DRX applied in the IDLE state is referred to as Idle mode DRX and DRX applied in the CONNECTED state is referred to as Connected mode DRX (C-DRX).

Extended/enhanced DRX (eDRX) as a mechanism capable of extending cycles of Idle mode DRX and C-DRX may be primarily used for application of (massive) IoT. Whether the eDRX is permitted in the Idle mode DRX may be configured by system information (e.g., SIB1). The SIB1 may include an eDRX-Allowed parameter and the eDRX-Allowed parameter is a parameter representing whether Idle mode extended DRX is permitted.

Idle Mode DRX

In the Idle mode, the UE may use the DRX in order to reduce the power consumption. One paging occasion (PO) is a subframe in which Paging-Radio Network Temporary Identifier (P-RNTI) may be transmitted on PDCCH, MPDCCH, or NPDCCH of addressing a paging message for NB-IoT. In the P-RNTI transmitted on the MPDCCH, the PO represents a start subframe of MPDCCH repetition. In the case of the P-RNTI transmitted on the NPDCCH, the PO indicates a start subframe of NPDCCH repetition when a subframe determined by the PO is not a valid NB-IoT downlink subframe. Then, a first valid NB-IoT downlink subframe after the PO is a start subframe of NPDCCH repetition.

One paging frame (PF) is one radio frame which may include one or multiple paging occasions. When the DRX is used, the UE needs to monitor only one PO per DRX cycle. One paging narrowband (PNB) is one narrowband in which the UE receives the paging message. The PF, the PO, and the PNB may be determined based on the DRX parameters provided in the system information.

FIG. 10 is a flowchart showing an example of a method for performing an Idle mode DRX operation.

The UE receives Idle mode DRX configuration information from the eNB through higher layer signaling (e.g., system information).

In addition, the UE determines a Paging Frame (PF) for monitoring a physical downlink control channel (e.g., PDCCH) in a DRX cycle and a Paging Occasion (PO) in the PF based on the Idle mode DRX configuration information (S1020). Here, the DRX cycle includes On duration and a sleep interval (alternatively, Opportunity for DRX).

In addition, the UE monitors the PDCCH in the PO of the determined PF (S1030). The UE monitors only one subframe (PO) per paging DRX cycle.

Additionally, when the UE receives a PDCCH scrambled by P-RNTI for On duration (i.e., when detecting paging), the UE transitions to a connected mode to transmit and receive data to and from the eNB.

FIG. 11 is a diagram illustrating an example of an Idle mode DRX operation.

Referring to FIG. 11, when traffic destined for a UE in an RRC_Idle state (hereinafter, referred to as an 'Idle state') occurs, paging occurs to the corresponding UE. The UE wakes up periodically, i.e., every (paging) DRX cycle and monitors the PDCCH. When there is the paging, the UE transitions to a Connected state and receives data and when there is no paging, the UE enters a sleep mode again.

Connected Mode DRX (C-DRX)

C-DRX may be DRX applied in an RRC Connected state and a DRX cycle of the C-DRX may be constituted by a Short DRX cycle and/or a Long DRX cycle. The Short DRX cycle is optional. When the C-DRX is configured, the UE monitors the PDCCH for On Duration. When there is a PDCCH which is successfully detected while monitoring the PDCCH, the UE operates an inactivity timer and maintains an awake state. On the contrary, when there is no PDCCH which is successfully detected while monitoring PDCCH, the UE enters a sleep state after the On Duration ends. When the C-DRX is configured, a PDCCH reception occasion (e.g., a slot having a PDCCH search space) may be discontinuously configured according to the C-DRX configuration. On the contrary, when the C-DRX is not configured, the PDCCH reception occasion (e.g., the slot having the PDCCH search space) may be continuously configured. Meanwhile, regardless of whether the C-DRX is configured, PDCCH monitoring may be limited in a time interval configured as a measurement gap.

FIG. 12 is a flowchart showing an example of a method for performing a C-DRX operation.

The UE receives from the eNB RRC signaling (e.g., MAC-MainConfig IE) including DRX configuration information. The DRX configuration information may include the following information.

onDurationTimer: The number of PDCCH subframes to be continuously monitored a start part of the DRX cycle
    drx-InactivityTimer: The number of PDCCH subframes to be continuously monitored when the UE decodes PDCCH having scheduling information drx-RetransmissionTimer: The number of PDCCH subframes to be continuously monitored when HARQ retransmission is predicted longDRX-Cycle: On Duration occurrence cycle drxStartOffset: Subframe number in which the DRX cycle starts drxShortCycleTimer: The number of times of short DRX cycle shortDRX-Cycle: DRX cycle which operates at the number of times of drxShortCycleTimer when Drx-InactivityTimer is terminated In addition, when DRX 'ON' is configured through a DRX command of MAC command element (CE) (S1220), the UE monitors the PDCCH for ON duration of the DRX cycle based on the DRX configuration (S1230).

FIG. 13 is a diagram illustrating an example of a C-DRX operation.

Referring to FIG. 13, when the UE receives scheduling information (e.g., DL Grant) in an RRC_Connected state (hereinafter, referred to as a Connected state), the UE drives a DRX inactivity timer and an RRC inactivity timer.

When the DRX inactivity timer expires, a DRX mode starts and the UE wakes up at the DRX cycle and monitors the PDCCH for a predetermined time (on duration timer). Here, when Short DRX is configured, the UE starts with a short DRX cycle when starting the DRX mode and when the short DRX cycle ends, the UE enters a long DRX cycle. The long DRX cycle is a multiple of the short DRX cycle and the UE wakes up more frequently in the short DRX cycle. When the RRC inactivity timer expires, the UE transitions to the Idle state and performs the Idle mode DRX operation.

IA/RA+DRX Operation

FIG. 14 is a diagram illustrating an example of power consumption depending on a state of a UE.

Referring to FIG. 14, after power on, the UE performs Boot Up for application loading, an initial access/random access procedure for synchronizing downlink and uplink with the eNB, a registration procedure with the network, etc., and current (or power consumption) consumed while performing each procedure is illustrated in FIG. A5. When the transmission power of the UE is high, current consumption of the UE increases. In addition, when there is no traffic transmitted to the UE or to be transmitted to the eNB, the UE transitions to the Idle mode and performs the Idle mode DRX operation. In addition, when paging (e.g., call occurrence) occurs during the Idle mode DRX operation, the UE transitions to the Connected mode to the Idle mode through a cell establishment procedure and transmits and receives data to and from the eNB. In addition, when there is no data which the UE transmits and receives to and from the eNB in the connected mode for a specific time or at a configured time, the UE performs the connected DRX (C-DRX) operation.

In addition, when the extended DRX (eDRX) is configured through the higher layer signaling (e.g., system information), the UE may perform the eDRX operation in the Idle mode or Connected mode.

In a next-generation wireless communication system (e.g., NR system), operations for an uplink transmission beam of the UE may be supported. As an example, an operation of determining the uplink transmission beam of the UE in Frequency Range 1 (FR1) and/or Frequency Range 2 (FR2) areas in Table 2 described above may be considered.

For example, in order to determine a specific uplink transmission beam, a higher layer parameter (e.g., RRC parameter) is configured to configure association information (or linkage information) with a value of the corresponding parameter. The association information may be configured based on an identifier (e.g., CSI-RS resource ID), an identifier (e.g., SSB ID, SSB index) of the SSB, and/or an identifier (e.g., SRS resource ID) of the SRS resource. The UE may determine, as the uplink transmission beam, a beam based on, i.e., determined (or identified) by the association information. As an example, it may be defined or limited that the association information based on the identifier of the CSI-RS resource and/or the identifier of the SSB is configured when a beam correspondence is established and association information based on the identifier of the SRS resource is configured when the beam correspondence of the UE is not completely supported.

In the next-generation wireless communication system, a method in which the BS configures (or indicates) the uplink transmission beam of the corresponding UE by using a specific unit based on implementation of the UE, etc., needs to be considered. For example, a method needs to be considered in which the BS configures and/or indicates the uplink transmission beam of the corresponding UE in a specific antenna group unit of the UE. Further, a method may need to be considered in which the BS configures and/or controls whether to receive a DL RS (e.g., CSI-RS resource ID, SSB ID/index) corresponding to the higher layer parameter (e.g., RRC parameter spatialRelationInfo) value and/or transmission of a UR RS (e.g., SRS resource ID) corresponding to the higher layer parameter value, based on a specific antenna group unit of the UE.

By considering this case, in the next-generation wireless communication system, a definition of a panel which becomes an actual transmission unit or reception unit of the UE and a configuration method related to the panel need to be supported.

The 'panel' referred to in the present disclosure may be modified to, and interpreted/applied as 'at least one panel', 'a plurality of panels', or 'panel group' (having similarity and/or a common value (having a specific characteristic viewpoint (e.g., Timing Advance (TA), Power control parameter, etc.)). Further, the 'panel' referred to in the present disclosure may be modified to, and interpreted/ applied as 'at least one antenna port', 'a plurality of antenna ports', 'at least one uplink resource', 'a plurality of uplink resources, 'antenna port group', 'uplink resource group', or uplink resource set' (having a specific characteristic viewpoint (e.g., TA, Power control parameter, etc.)). In addition, the 'panel' referred to in the present disclosure may be modified, and interpreted/applied to 'at least one beam', 'a plurality of beams', 'at least one beam group', or 'at least one beam set' (having similarity and/or a common value in a specific characteristic viewpoint (e.g., TA, Power control parameter, etc.).

Further, the 'panel' referred to in the present disclosure may be defined as a unit for configuring the transmission beam and/or reception beam by the UE. For example, a transmission panel' may be defined as a unit in which a plurality of candidate transmission beams may be generated, but only one beam among the candidate transmission beams may be used in transmission at a specific timing. As an example, only one transmission beam (e.g., spatial relation information RS) may be used per transmission panel for transmission of a specific uplink signal and/or channel.

Further, in the present disclosure, the 'panel' may refer to 'at least one antenna port', 'a plurality of antenna ports', 'antenna port group', 'uplink resource group', or 'uplink resource set' of which uplink synchronization is common (or similar). In this case, the 'panel' may be modified to, and interpreted/applied as a generalized expression 'Uplink Synchronization Unit (USU)'. Further, in the present disclosure, the 'panel' may be modified to, and interpreted/applied as a generalized expression 'Uplink Transmission Entity (UTE)'.

The 'uplink resource (or resource group)' may be modified, and interpreted/applied as a PUSCH/PUCCH/SRS/PRACH resource (or a resource group, a resource set). Further, the modification, and interpretation/application may be applied even inversely, of course.

Further, in the present disclosure, the 'antenna (or antenna port)' may represent a physical or logical antenna (or antenna port). In other words, the 'panel' referred to in the present disclosure may be variously interpreted as 'group of a UE antenna element', group of a UE antenna port', 'group of a UE logical antenna', etc. For example, which physical/logical antennas (or antenna ports) are to be bound and mapped to one panel may be configured in various schemes by considering a location/distance/correlation between antennas, an RF configuration, and/or an antenna (port) virtualization scheme. Such a mapping process may vary depending on UE implementation. Further, the 'panel' referred to in the present disclosure may be modified, and interpreted/applied to 'a plurality of panels' or 'panel group' (having similarity and/or a common value in a specific characteristic viewpoint).

When the panel as described above is considered, panel unit activation or deactivation may be considered based on a common understanding of whether the panel between the BS and the UE is used. Therefore, there is an effect that power control may be efficiently performed. Further, since the BS may perform scheduling in units of the panel, an effect that the BS may control interference (e.g., uplink interference, etc.) in a desired direction (or beam region) may also be obtained in terms of a cell operation.

The UE may report the information related to the panel to the BS in the form of a UE capability. Further, the UE may also transmit the information related to the panel to the BS through semi-static or dynamic reporting. The BS may receive the information related to the panel from the UE to perform a specific control signaling of the panel unit, and may configure and/or indicate the related operation of the UE.

For example, when four SRS resource sets (e.g., RRC parameter usage is configured to 'BeamManagement') configured for a beam management (BM) usage are configured to the UE, each SRS resource set may be configured and/or defined to correspond to each panel of the UE. As an example, when four SRS resource sets are represented by SRS resource sets A, B, C, and D, and the UE implements a total of four (transmission) panels, each SRS resource set corresponds to one (transmission) panel to perform the SRS transmission.

As an example, implementation of the UE shown in Table 7 may be possible.

TABLE 7

| Maximum number of SRS resource sets across all time domain behavior (periodic/semi-persistent/aperiodic) | Additional constraint on the maximum of SRS resource sets per supported time domain behavior (periodic/semi-persistent/aperiodic) |
|---|---|
| 1 | 1 |
| 2 | 1 |
| 3 | 1 |
| 4 | 2 |
| 5 | 2 |

TABLE 7-continued

| Maximum number of SRS resource sets across all time domain behavior (periodic/semi-persistent/aperiodic) | Additional constraint on the maximum of SRS resource sets per supported time domain behavior (periodic/semi-persistent/aperiodic) |
|---|---|
| 6 | 2 |
| 7 | 4 |
| 8 | 4 |

Referring to contents of Table 7, when the UE reports (or transmits), to the BS, UE capability information in which the number of SRS resource sets which may be supported by the UE itself is 7 or 8, the corresponding UE may be configured with up to a total of four SRS resource sets (for the BM usage) from the BS. In this case, as an example, the UE may also be defined, configured, and/or indicated to perform uplink transmission by making each of the SRS resource sets (for the BM usage) correspond to each panel (transmission panel and/or reception panel) of the UE. That is, an SRS resource set(s) for a specific usage (e.g., BM usage) configured to the UE may be defined, configured, and/or indicated to correspond to the panel of the UE. As an example, when the BS (implicitly or explicitly) configures and/or indicates, to the UE, a first SRS resource set in relation to the uplink transmission (configured for the BM usage), the corresponding UE may recognize to perform the uplink transmission by using a panel related (or corresponding) to the first SRS resource set.

Further, like the UE, when the UE that supports four panels transmits each panel to correspond to one SRS resource set for the BM usage, information on the number of SRS resources configurable per SRS resource set may also be include in the capability information of the UE. Here, the number of SRS resources may correspond to the number of transmittable beams (e.g., uplink beams) per panel of the UE. For example, the UE in which four panels are implemented may be configured to perform the uplink transmission in such a manner that two uplink beams correspond to two configured RS resources, respectively for each panel.

The present disclosure proposes a method for performing, by the UE, the panel unit configuration and/or indication when performing the uplink transmission, in particular, when transmitting the uplink data channel (e.g., PUSCH, PUCCH, SRS etc).

Method(s) and/or scheme(s) hereinafter described in embodiments of the present disclosures may be independently applied for each embodiment or may be applied in a combined form by considering a combination between the embodiments and may be substituted with configurations of other embodiments.

First Embodiment: Method of Configuring and/or Indicating Panel and/or Beam for PUSCH Transmission A PUSCH transmission/reception procedure in the next-generation wireless communication system may be illustrated in FIG. 15.

FIG. 15 illustrates an example of a PUSCH transmission/reception procedure to which a method proposed in the present disclosure is applicable. FIG. 15 is just for convenience of the description and does not limit the scope of the present disclosure.

Referring to FIG. 15, a case where the BS and the UE perform PUSCH transmission/reception based on the panel unit and/or the beam unit is assumed.

The UE may transmit (or report) UE capability information to the BS (S1505). Here, the corresponding UE capability information may include information on a UE capability related to the PUSCH transmission, information related to a panel configuration of the UE, information related to a beam configuration of the UE, and the like. For example, the corresponding UE capability information may include information on the number of activatable panels of the UE, information on the maximum number of panels available for one transmission, information on the number of beams constituting the panel of the UE, and the like.

The UE may receive, from the BS, configuration information related to the PUSCH transmission (S1510). In this case, the configuration information may be transferred through higher layer signaling (e.g., RRC signaling, etc.). Here, the configuration information may include configuration information (e.g., PUSCH configuration, etc.) for the PUSCH transmission, configuration information related to the panel and/or beam for the PUSCH transmission, and the like.

The UE may receive, from the BS, PUSCH scheduling information (S1515). In this case, the scheduling information may be transferred through downlink control information (DCI) and/or MAC-CE. For example, the DCI may include Identifier for DCI formats, UL/Supplementary uplink (SUL) indicator, Bandwidth part indicator, Frequency domain resource assignment, Time domain resource assignment, Frequency hopping flag, Modulation and coding scheme (MCS), SRS resource indicator (SRI), Precoding information and number of layers, Antenna port(s), SRS request, DMRS sequence initialization, Uplink Shared Channel (UL-SCH) indicator, and the like. Further, configured SRS resources in an SRS resource set related to a higher layer parameter 'usage' may be indicated by an SRI field included in the DCI. Further, 'spatialRelationInfo' may be configured for each SRS resource and a value of 'spatialRelationInfo' may be one of {CRI, SSB, and SRI}.

The US may transmit, to the BS, the PUSCH based on the PUSCH transmission related configuration information and the PUSCH scheduling information (S1520). In this case, the corresponding PUSCH may be transmitted by considering the panel unit and/or the beam unit.

In relation to a PUSCH transmission scheme in the next-generation wireless communication system, codebook based transmission (CB transmission) and non-codebook based transmission (NCB transmission) may be supported. The UE may perform the CB transmission when a higher layer parameter txConfig in PUSCH-Config is configured to 'codebook' and performs the NCB transmission when the txConfig is configured to 'nonCodebook'. When the txConfig is not configured, the PUSCH transmission may be based on one PUSCH antenna port and this may be triggered by DCI format 0_0.

First, the codebook based uplink transmission will be described in detail.

In the case of the codebook based transmission, the UE may determine a PUSCH transmission precoder based on an SRS resource indicator (SRI), a transmit precoding matrix indicator (TPMI), and a transmit rank indicator (TRI). Here, the SRI, the TPMI, and the TRI may be given by SRS resource indicator field information and Precoding information and number of layers information included in the DCI field. The TPMI may be used for representing a precoder to be applied through antenna port {0 . . . v−1} corresponding to an SRS resource selected by the SRI when multiple SRS resources are configured or one SRS resource is configured or the TPMI may be used for representing a precoder to be applied through antenna port {0 . . . v−1} corresponding to the SRS resource.

A transmit precoder may be selected in an uplink codebook having the same multiple antenna ports as a higher layer parameter nrofSRS-Ports of SRS-Config. When the UE is configured to have the higher layer parameter txConfig configured to 'codebook', the UE may be constituted by at least one SRS resource. SRI indicated in slot n may be related to most recent transmission of an SRS resource before the PDCCH carrying SRI before slot n, i.e., an SRS resource identified by the SRI.

Further, in the case of the codebook based transmission, the UE may be constituted by a single SRS resource set and only one SRS resource may be indicated based on the SRI within the SRS resource set. The maximum number of SRS resources configured for the codebook based transmission may be 2. When aperiodic (AP)-SRS is configured to the UE, an SRS request field of the DCI may trigger transmission of the AP-SRS resource. Further, when multiple SRS resources are configured, the UE may expect that the higher layer parameter nrofSRS-Ports of SRS-Config will be configured as the same value in all SRS resources and the higher layer parameter resourceType of SRS-ResourceSet will be configured as the same value with respect to all SRS resources.

Next, the non-codebook based uplink transmission will be described in detail.

In the case of the non-codebook based transmission, the UE may determine the PUSCH precoder and the transmit rank thereof based on wideband SRI by the SRI field from the DCI. The UE may use one or multiple SRS resources for the SRS transmission and the number of SRS resources which may be configured to the UE for simultaneous transmission in the same RB may be the UE capability. Further, only SRS port may be configured with respect to each SRS resource. Further, when the higher layer parameter usage of SRS-Config is configured to 'nonCodebook', only one SRS resource set may be configured. The maximum number of SRS resources which may be configured for the non-codebook based uplink transmission is 4. Further, the SRI indicated in slot n may be related to the most recent transmission of the SRS resource before the PDCCH carrying the SRI before slot n, i.e., the SRS resource identified by the SRI.

In the case of the non-codebook based transmission, the UE may calculate a precoder to be used for transmission of precoded SRS based on measurement of a related NZP CSI-RS resource. The UE may be configured with only one NZP CSI-RS resource with respect to the SRS resource set. Further, in the case of the non-codebook based transmission, the UE does not expect that all spatialRelationInfo for associated CSI-RS and SRS resources in SRS-Config for the SRS resource set will be configured. Further, in the case of the non-codebook based transmission, when at least one SRS resource is configured, the UE may be scheduled by DCI format 0_1.

The present disclosure proposes a panel and/or beam unit configuration and/or indication method in relation to the PUSCH transmission/reception between the BS and the UE. As an example, methods and/or examples described below in the present disclosure may correspond to specific methods and/or examples of respective steps in FIG. 15 described above. Further, the methods and/or examples described below may be distinguished for convenience of description, and may be applied independently, or may be applied through mutual combination.

Hereinafter, 'a panel and/or beam unit configuration and/or indication method which may be applied to the codebook-based (CB based) UL transmission and/or non codebook-based (NCB-based) UL transmission will be described. As an example, as described above, in the case of the codebook-based UL transmission and/or non-codebook-based UL transmission, a single SRS resource set or multiple SRS resource sets may be configured for the corresponding usage.

The SRS resource set configured for the usage of the codebook based UL transmission and/or non-codebook based UL transmission and the SRS resource set for the BM usage may be independently configured without a predetermined connection relationship. Here, since the SRS resource set for the BM usage may correspond to the panel o the UE as mentioned above, the connection relationship may mean a connection relationship between the SRS resource set configured for the usage of the codebook based UL transmission and/or non-codebook based UL transmission and the panel of the UE. When the SRS resource set configured for the usage of the codebook based UL transmission and/or non-codebook based UL transmission and the SRS resource set for the BM usage are independently configured as such, the BS may not know from which UE panel the PUSCH is transmitted in spite of following a form of performing (or implementing) the PUSCH transmission from a specific single panel. As an example, when two SRS resources are configured within the single SRS resource set configured for the usage of the codebook based UL transmission, to which panel(s) of four panels the UE performs is to perform transmission of a first SRS resource and a second SRS resource by mapping may be an implementation matter of the UE.

By considering such a point, the present disclosure proposes a method for configuring (and/or indicating) an association relationship (and/or a linkage) between the SRS resource set(s) for the usage of the codebook based and/or non-codebook based PUSCH transmission and the SRS resource(s) within each SRS resource set in relation to the SRS resource set(s) according to the configuration of the SRS resource set(s) for the specific BM usage and the SRS resource(s) within each SRS resource set. As an example, the association relationship may be configured through separate higher layer signaling or may be based on a predefined (or predetermined or preconfigured) rule or mechanism. Through this, the BS may configure (or indicate or schedule) (transmission) panel-specific UL transmission of the UE.

In the following description, the number of SRS resource sets configured for the usage of the codebook based UL transmission and/or non-codebook based UL transmission may be 2 or more, and for convenience of description, a case where two SRS resource sets are configured for the usage of the codebook based UL transmission and/or non-codebook based UL transmission is assumed. Two SRS resource sets are referred to as SRS resource set 1 and SRS resource set 2, respectively.

(Panel Unit and/or Beam Unit Based PUSCH Transmission/Reception Method)

Signaling related to the linkage relationship between the SRS resource set(s) configured for the usage of the codebook based UL transmission and/or non-codebook based UL transmission, and the SRS resource set(s) configured for the BM usage may be configured, defined, or indicated. Here, the SRS resource set(s) configured for the BM usage may correspond to the panel(s) of the UE as described above. In other words, the BS may configure or indicate, to the UE, information indicating the linkage relationship between the panel of the UE and the SRS resource(s) related to the PUSCH transmission through signaling.

For example, a method for transferring the information related to the linkage through the higher layer signaling (e.g., RRC signaling) and/or Medium Access Control-Control Element (MAC-CE) based signaling may be considered. The corresponding scheme may be related to step S1510 and/or step S1515 in FIG. 15. In a state in which a set of candidate linkage configurations connected to the linkage is preconfigured through the higher layer signaling, a semi-dynamic control scheme such as which candidate linkage configuration is activated or deactivated through the MAC-CE based signaling, etc., may be considered. Further, a method for directly providing or updating a configuration related to the linkage by the MAC-CE based signaling itself may also be considered.

Specifically, the first SRS resource set for the codebook based UL transmission and/or non-codebook based UL transmission may be associated with SRS resource set A (e.g., penal A among the panels of the UE) for the BM usage and the second SRS resource set may be associated with SRS resource set C (e.g., panel C among the panels of the UE) for the BM usage. In other words, the panel of the UE related to the codebook based UL transmission and/or non-codebook based UL transmission may be configured and/or indicated through the higher layer signaling and/or MAC-CE based signaling. In this case, the linkage relationship itself may be updated, activated, deactivated, or indicated by the MAC-CE based signaling and/or dynamic signaling (e.g., DCI).

For example, when the PUSCH of the codebook based UL transmission and/or non-codebook based UL transmission is scheduled, indication information related to the first SRS resource set and/or the second SRS resource set may be transferred through a specific field (i.e., a specific field(s) within UL related DCI) of DCI (e.g., DCI format 0_1) for the corresponding scheduling. The corresponding scheme may be related to step S1510 and/or step S1515 in FIG. 15. As an example, the indication information may be indicated by a Transmission Configuration Indicator (TCI) field within the DCI. Alternatively, in the case of configured grant based PUSCH transmission, the indication information may be configured through the higher layer parameter. Further, in relation to the SRS resource set indicated by the indication information, the BS indicates the SRS(s) indicator to the UE together, and as a result, the corresponding UE may determine (or select) a final SRI(s).

Further, even when only a single SRI field exists within the DCI, each state and/or codepoint within the specific field may be used for configuring and/or indicating the linkage relationship. As an example, the state and/or the codepoint may be preconfigured based on the higher layer signaling (and/or MAC-CE based signaling), and updated, activated, or deactivated (within a preconfigured parameter/value set) through the MAC-CE based signaling.

Through such a scheme, the BS may perform, to the UE, a panel unit indication (e.g., an SRS resource set unit indication) of the UE and/or a beam unit indication (e.g., SRI(s) within the indicated SRS resource set) within the panel in relation to the PUSCH transmission. In other words, the UE may perform the panel unit and/or beam unit PUSCH transmission based on the indication described above.

The above-described proposal scheme may be configured (or defined or indicated) to be applicable when a time-domain behavior of the SRS is aperiodic, semi-persistent, and/or periodic. In other words, the above-described proposal scheme may be configured and/or defined to be supported with respect to at least one of three types of time-domain behaviors.

When a PUSCH transmission/reception method based on the SRS resource set unit configuration and/or indication is generalized, the generalized method may be described as in the following example.

For example, assumed is a case where a linkage relationship between the SRS resource set for the PUSCH transmission and the SRS resource set (e.g., a unit corresponding to the panel of the UE) for the BM usage through i) a specific SRI field(s) or ii) a panel and/or beam indication related specific field (e.g., may be referred to as a UL TCI field, etc.) within specific UL DCI is configured (or indicated) through the RRC signaling and/or MAC-CE and/or DCI. In this case, a scheme may be considered, which enables an individual or local indicator(s) (e.g., SRI, UL RCI state, etc.) within the field to perform dynamic selection only with respect to an individual or local indicator within the corresponding linked SRS resource set(s) for the BM usage. As an example, a value indicated by the corresponding field may be configured or defined to be related to a pre-linked SRS resource set(s) for the BM usage. Of course, in the scheme may be applied to the configured grant based PUSCH transmission based on not the UL DCI but the higher layer parameter related to the configured grant.

In respect to the scheme, an operation may be considered in which one specific panel corresponds to each SRS resource set for the BM usage in an implementation situation of the UE (e.g., a UE that supports four panels), and each of multiple UL beams within the corresponding panel is applied to the individual or local SRS resource within the corresponding SRS resource set, and transmitted or swept. In this case, a method may be considered in which when the PUSCH is scheduled, qualities of SRSs transmitted from two specific panels among panels (e.g., four panels) supported by the UE are relatively more excellent and the SRSs are linked to a panel(s) which become(s) a candidate of the PUSCH scheduling. To this end, a configuration (and/or indication) operation may be applied, which links only two specific SS resource sets for the BM usage to a specific field within the corresponding UL DCI.

When two SRS resource sets down-selected or linked as such are SRS resource set A and SRS resource set C as in the example described above, dynamic selection may be configured to be made only for the individual or local beams within SRS resource set A and SRS resource set C through the corresponding field (i.e., panel/beam related scheduling field) of the corresponding UL DCI. Through this, an effect may be obtained, which enables dynamic beam selection within an indicated (or selected) panel while reducing overhead on a DCI bit size (bit-width). Further, information of the linked (or associated) SRS resource set A and SRS resource set C may be designed to be updated, activated, or deactivated through the higher layer signaling and/or the MAC-CE based signaling, and a panel selection related operation based on the corresponding scheme may be excluded from DCI overhead, and as a result, an effect that control channel overhead may be reduced may be obtained.

When the PUSCH transmission/reception method based on the SRS resource set unit configuration and/or indication is further generalized, the further generalized method may be described as in the following example.

For example, assumed is a case where a linkage relationship between the SRS resource set for the PUSCH transmission and the SRS resource set (e.g., a unit corresponding to the panel of the UE) for the BM usage through i) a specific SRI field(s) or ii) a panel and/or beam indication related specific field (e.g., may be referred to as a UL TCI field, etc.) within specific UL DCI is configured (or indicated) through the RRC signaling and/or MAC-CE and/or DCI. In this case, a scheme may be considered, which enables the individual or local indicator(s) (e.g., SRI, UL RCI state, etc.) within the field to perform dynamic selection only for a corresponding linked (higher) reference signal (RS) for the BM usage (i.e., related to the BM) and/or an individual or local reference signal identifier (RS ID) and/or channel identifier (channel ID) within a set(s) of the channels. Here, the set of the (higher) reference signal (RS) for the BM usage and/or the set(s) of the channels may be defined or configured to correspond to the panel of the UE similarly to the SRS resource set(s) for the BM usage.

As an example, the UE may apply the indicated panel and/or beam to the PUSCH transmission. When a DL signal and/or channel is linked (or indicated) as a reference of the PUSCH transmission, a UL transmission beam corresponding (or reciprocal) to the corresponding DL reception beam may be configured and/or defined to be applied to the PUSCH transmission.

The set(s) of the reference signals and/or the set(s) of the channels for the (BM usage) may be related to the panel unit and/or beam unit indication of the UE, and particularly, defined, configured, or indicated to include at least one among the following examples. In the following examples, the group may be replaced with the set, and one or more examples may be combined and applied.

As an example, the set(s) of the reference signals and/or the set(s) of the channels may include a specific group of the CSI-RS resource(s) and/or a CSI-RS resource set(s). In other words, the set(s) of the corresponding reference signals may include a unit (e.g., CSI-RS resource setting) of grouping a specific CSI-RS resource(s). And/or the specific group may be limitedly constituted only by a CSI-RS resource(s) for a tracking reference signal (TRS) usage in which a higher space QCL reference is configured. And/or, when a CSI-RS resource(s) for a DL CSI acquisition usage is constituted by the specific group, the case may be limited only to a case where the CSI-RS resource(s) includes a spatial QCL reference RS(s).

As another example, the set(s) of the reference signals and/or the set(s) of the channels may include a specific group constituted by a synchronization signal block (SSB) (identifier (ID)(s). In this case, it may be limited or allowed that all SSBs which may be included in the specific group are SSBs configured for the BM usage. Here, the SSB configured for the BM usage may mean an SSB configured in at least one resource setting for DL reporting related to the BM.

As yet another example, the set(s) of the reference signals and/or the set(s) of the channels may include a specific group constituted by a control resource set (CORESET) (identifier (ID)(s). As an example, it may be limited or allowed that the control resource set is only linked to at least one specific search space configuration. And/or, an identifier(s) of the search space configuration may also become the set(s) of the reference signals and/or the set(s) of the channels. Information of an individual control resource set and the corresponding associated panel and/or beam may be configured, applied, and/or indicated in association with the identifier(s) of the search space configuration.

As yet another example, the set(s) of the reference signals and/or the set(s) of the channels may include a specific group constituted by a PUCCH resource (identifier (ID)(s). As an example, as being configured (or associated, indicated) by an individual specific PUCCH resource ID(s), the UE may be configured to perform the codebook based and/or non-codebook based PUSCH transmission based on a configuration including beam information applied to the corresponding PUCCH resource ID(s). And/or, as being configured (or associated, indicated) by a specific set unit in which a preconfigured (or defined) specific PUCCH resource ID(s) is grouped, the UE may be configured to perform the codebook based and/or non-codebook based PUSCH transmission based on a configuration including the beam information applied to the corresponding PUCCH resource ID(s). And/or, by a default configuration, an operation may be configured or defined, in which a predetermined PUCCH resource (e.g., a PUCCH resource corresponding to a lowest or highest index) is linked to the codebook based and/or non-codebook based PUSCH transmission by default. Here, the default configuration may be applied to a case where there is no reference signal set(s) and/or channel set(s) associated with the codebook based and/or non-codebook based PUSCH transmission, a case where a specific (ambiguous) interval is configured, etc.

When a (DL and/or UL related) reference signal set(s) and/or channel set(s) are/is linked (or configured, indicated) to the codebook based and/or non-codebook based PUSCH transmission based on the above-described schemes, the UE may be configured to perform the PUSCH transmission, based on a panel applied to previous reception and/or a panel applied to previous transmission, through a panel corresponding thereto. Hereinafter, the corresponding scheme is described based on the DL related reference signal set(s) and/or channel set(s), but this is just for convenience of description, and the scheme described below may also be extensively applied to the UL related reference signal set(s) and/or channel set(s), of course.

For example, as in the examples, when the DL related reference signal set(s) and/or channel set(s) is linked (or configured, indicated) to the PUSCH transmission, the UE may be defined (or configured, indicated) to perform panel unit and/or beam unit selective UL transmission during subsequent PUSCH scheduling, based on a (reception) panel of a specific UE applied during receiving, through a (transmission) panel of the UE corresponding (i.e., reciprocal) thereto.

Based on the (reception) panel, the (transmission) panel of the UE corresponding thereto may mean a panel for a UL transmission usage associated (or implemented), when the UE implements a specific DL receiving panel, so as to perform transmission in which beam correspondence (and/or panel correspondence) is maintained (to a specific predetermined or preconfigured level) with respect to the implementation of the panel. As an example, the UE may be implemented in the form of a specific transmission/reception panel in which both DL reception and UL transmission are performed with the same specific panel.

Further, when the DL related reference signal set(s) and/or channel set(s) are/is linked (or configured, indicated) to the PUSCH transmission, the UE may be defined (or configured, indicated) to apply the corresponding indicated DL related reference signal to a pathloss compensation operation during power control. As an example, the pathloss compensation operation may be included in an open-loop power control process related to the PUSCH transmission.

And/or, the DL related reference signal associated with the corresponding indicated DL channel (e.g., specific CORESET(s)) may be defined (or configured, indicated) to be applied to the pathloss compensation operation during the power control. Here, the DL related reference signal may be a reference signal used for receiving the corresponding DL channel, and may include, for example, a DMRS for CORE-SET(s) (or QCLed). Further, the pathloss compensation operation may be included in the open-loop power control process related to the PUSCH transmission.

And/or, a method may be considered, in which a structure of indicating the SRI by the DCI is maintained, and the DL related reference signal set(s) and/or channel set(s) configures (and/or indicates) an (additional linkage (or association) relationship to an SRS resource set level for the usage of the codebook based and/or non-codebook based uplink transmission. As an example, the linkage (or association) relationship may be configured and/or indicated through the higher layer signaling (e.g., RRC signaling) and/or MAC-CE based signaling. In this case, an operation may be defined (or configured, indicated) in which the UE performs the uplink transmission by using a (corresponding) beam and/or panel applied to reception of the corresponding reference signal set(s) and/or channel set(s).

For example, based on the above-described scheme of configuration and/or indication, the corresponding UE may transmit the PUSCH and/or SRS based on (the SRS resource(s) within) the associated SRS resource set(s) by using the (corresponding) beam and/or panel applied to reception of the DL reference signal set(s) and/or channel set(s). As an example, when the first SRS resource set and the second SRS resource set are configured for the codebook based PUSCH transmission and/or non-codebook based PUSCH transmission, it may be configured and/or indicated that the first SRS resource set is associated (or linked) to SSB #3 (i.e., an SSB corresponding to index/ID #3) and the second RS resource set is associated with SSB #7 (i.e., an SSB corresponding to index/ID #7). As another example, when the first SRS resource set and the second SRS resource set are configured for the SRS transmission, it may be configured and/or indicated that the first SRS resource set is associated with SSB #3 and the second SRS resource set is associated with SSB #7.

When the linkage (or association relationship) as in the example is configured and/or indicated, the UE may transmit the PUSCH and/or SRS through the configured SRS resource(s) within the first SRS resource set by using a (transmission) panel corresponding to a (best, preferred) (reception) panel applied when receiving SSB #3. Here, the reception panel and/or transmission panel of the UE may be one same transmission/reception panel.

Further, in each of the SRS resource(s) within the indicated SRS resource set, spatial relation information (e.g., RRC parameter spatial relation info, etc.) may be configured to a unique resource level. As an example, when an independent CSI-RS resource indicator (CRI) is configured for each SRS resource, the UE may be configured to perform transmission by using an uplink beam corresponding (i.e., reciprocal) to corresponding CRI reception when transmitting the PUSCH and/or SRS through each corresponding SRS resource. Here, a separate (or additional) linkage of SSB #3 is assigned for each SRS resource set, so that the UE may be configured (and/or indicated) to determine a (best, preferred) beam for CSI-RS reception for the SRI within the (transmission) panel of the UE corresponding to the SRS resource set, and perform the transmission of the PUSCH and/or SRS with a transmission beam corresponding to the determined beam.

The above-described example may be applied by replacing the first SRS resource set with the second SRS resource set and replacing SSB #3 with SSB #7, and extended to an example related to multiple SRS resource sets in addition to two cases.

In other words, the linkage (or association) relationship of the above-described SRS resource set level may be interpreted as panel selection (and/or panel association) of the UE. Further, the linkage (or association) relationship of the SRS resource level within the SRS resource set may be interpreted as beam selection (and/or beam association) within the selected (and/or associated) panel.

And/or, the beam (and/or beam association) relationship may be configured at an SRS resource level in addition to the SRS resource set level. As an example, when the first SRS resource set and the second SRS resource set are configured for the codebook based PUSCH transmission, the non-codebook based PUSCH transmission, and/or the SRS transmission, it may be configured and/or indicated that the first SRS resource set is associated with SSB #3 and the second SRS resource set is associated with SSB #7. In this case, it may be configured and/or indicated that SRS resource #4 within the first SRS resource set is associated with CRI #11 and SRS resource #5 within the first SRS resource set is associated with CRI #12. Further, it may be configured and/or indicated that SRS resource #8 within the second SRS resource set is associated with CRI #11 and SRS resource #9 within the first SRS resource set is associated with CRI #14. The UE may transmit a codebook based PUSCH, a non-codebook based PUSCH, and/or an SRS by using the associated resource set(s) and the associated SRS resource(s).

As in the example, CRI #11 may be commonly configured in a specific SRS resource (e.g., SRS resource #4) within the first SRS resource set and redundantly configured in a specific SRS resource (e.g., SRS resource #8) within the second SRS resource set. Further, there may be a separate UE capability for whether the redundancy configuration is allowed and a procedure in which the UE reports the corresponding UE capability information to the BS may be applied. Through this, the above-described scheme may be applied according to the whether the redundancy configuration is allowed and/or whether the UE is implemented.

For example, when the redundancy configuration is allowed, the UE may receive a CSI-RS resource corresponding to CRI #11 with a transmission/reception module (e.g., transmission/reception panel) of the UE corresponding to the first SRS resource set, and the UE may transmit the codebook based PUSCH, the non-codebook based PUSCH, and/or the SRS within SRS resource #4 by using a transmission beam corresponding to a reception beam of the CSI-RS resource within the transmission/reception module. Further, the corresponding UE may receive a CSI-RS resource corresponding to CRI #11 with a transmission/reception module (e.g., transmission/reception panel) of the UE corresponding to the second SRS resource set, and the UE may transmit the codebook based PUSCH, the non-codebook based PUSCH, and/or the SRS in SRS resource #8 by using the transmission beam corresponding to the reception beam of the CSI-RS resource within the transmission/reception module. As an example, each of the transmission/reception module may be determined by reception of SSB #3 and reception of SSB #7. Further, the CSI-RS resource corresponding to CRI #11 may mean a specific beam among the beams of the BS. In other words, the corresponding CSI-RS resource may be based on the same transmission beam of the BS.

If both SRS resource #4 and SRS resource #8 are indicated when the UE schedules the UL transmission of the UE, the BS may obtain an effect of being capable of effectively receiving the corresponding UL transmission with a BS reception beam corresponding to the transmission beam of CRI #11 when receiving the corresponding UL transmission. In other words, a plurality of panel(s) and/or a plurality of beam(s) of the UE may correspond (or be reciprocal) to a single panel and/or a single beam of the BS.

Further, in order to support the above-described proposal operations, a source RS of spatial QCL (e.g., QCL type D) configured and/or indicated for the CSI-RS resource corresponding to CRI #11 exemplified above may be configured to become {SSB #3 and/or SSB #7} (e.g., integration of SSB #3 and SSB #7 in terms of a beam region). Further, a scheme may also be considered, in which when CRI #11 is an aperiodic CSI-RS type, the BS selectively changes and/or indicates the source RS of the spatial QCL followed by CRI #11 to be SSB #3 or SSB #7 at every transmission time by individual trigger based on the DCI. In this case, the change and/or indication may be dynamic or semi-dynamic.

Further, in the present disclosure, a method may also be considered, which applies the above-described proposal scheme by considering the time domain behavior(s) in relation to scheduling (i.e., UL scheduling) for the codebook based PUSCH transmission and/or non-codebook based PUSCH transmission.

For example, in the above contents, a method for dynamically indicating a local resource identifier (e.g., local SRS resource ID) by using the UL DCI (e.g., DCI format 0_1) is described. In addition, when multiple SRS resource sets are configured, in which the usage of the SRS resource is configured to the usage of the codebook based uplink transmission and/or the non-codebook based uplink transmission, a scheme of performing the panel unit and/or beam unit indication by considering the time-domain behaviors of the multiple SRS resource sets may be considered. A codepoint(s) (e.g., SRI state, UL TCI state) of a specific field (e.g., SRI field, UL TCI state field, etc.) within the UL DCI may be mapped over an SRS resource set(s) configured for the same specific time-domain behavior among the multiple SRS resource sets, and a scheme of configuring and/or indicating dynamic panel selection by using the codepoint(s) may be applied. The reason is that the SRS resources within the multiple SRS resource sets may be configured by mixing with a codepoint(s) within a specific field of the corresponding UL DCI.

As an example, in this regard, information related to which time domain behavior the BS is to apply the corresponding scheme to may be configured (or defined) to be down-selected, activated, deactivated, updated, changed, and/or switched based on the higher layer signaling (e.g., RRC signaling) and/or MAC-CE signaling. As an example, in this regard, mapping of the codepoint(s) may be performed by combinatorial mapping. In other words, the information may be mechanically configured and/or defined so that a specific field within the UL DCI is configured by a rule of making sequential mechanical codepoint mapping of the SRS resource(s) within the corresponding SRS resource set.

When the scheme in the example is applied, a power control behavior for the codebook based PUSCH transmission and/or non-codebook based PUSCH transmission may be configured to follow the power control scheme corresponding to the SRS resource set to which a specific codepoint (e.g., SRI, UL TCI state) in a specific field of the UL DCI. As an example, a power for the codebook based PUSCH transmission and/or non-codebook based PUSCH transmission may be controlled by applying a power control related parameter configured in the corresponding SRS resource set. Further, a power control may also be performed, which is interlocked based on a specific offset (e.g., power control related offset value).

Further, unlike the above-described scheme, in the case where two or more time-domain behaviors are configurable together, only SRS resources following the same time-domain behavior may be defined or configured to be indicated in the case where two or more SRS resources are indicated together when performing the PUSCH scheduling. Alternatively, the UE may expect to be indicated with only the SRS resources following the same time-domain behavior. Here, the case where two or more SRS resources are indicated together means multi-beam and/or multi-panel based simultaneous UL transmission.

Further, in at least one of the proposal methods described above in the present disclosure, a specific linkage (or association) related signaling may be defined or configured, which applies SRS resource set(s) configured for other usages (e.g., BM usage, antenna switching usage, etc.) together for the codebook based and/or non-codebook based PUSCH transmission without configuring the SRS resource set(s) (separately or exclusively) for the usage of the codebook based and/or non-codebook based PUSCH transmission. In this case, an effect may be obtained, which is capable of using the SRS resource set(s) for other usages for the usage of the codebook based and/or non-codebook based PUSCH transmission only by the signaling without a process of configuring the SRS resource set(s) for the usage of the codebook based and/or non-codebook based PUSCH transmission. Through this, there is an effect of being capable of reducing a latency required for final PUSCH scheduling and reducing even overhead related to the SRS resource configuration.

The corresponding scheme may be applied by considering the number of ports of the SRS resource related to the corresponding SRS resource set, implementation (e.g., nT/mR implementation, etc.) of the UE related to antenna switching, etc. In other words, when the corresponding scheme is suitable for the implementation situation (i.e., capability information of the UE, etc.) of the UE, the corresponding scheme may be selectively applied.

Further, in relation to the scheme proposed in the present disclosure described above, in the case of the non-codebook based PUSCH transmission, the UE may also report, to the BS, its capability information that simultaneous uplink transmission based multiple UE panels is impossible. As an example, even though two or more panels of the panels supported by the UE are activated for the PUSCH transmission, information that only one panel is available for each actual transmission may be included in the form of the capability information of the UE. In the following description, the capability information of the UE is described based on the non-codebook based PUSCH transmission, but may be extensively applied even to other uplink transmission (e.g., codebook based PUSCH, PUCCH, SRS, PRACH, etc.).

In the case where there are two or more SRS resources when scheduling the uplink transmission (e.g., PUSCH transmission), all of the corresponding SRS resources may also be limited to be constituted only by SR resources corresponding to SRS resource identifiers which belong to the same specific SRS resource set. That is, the UE may expect that all of the SRS resources will be constituted by the SRS resources which belong to the same (specific) SRS resource set. Here, two or more SRS resources may be indicated by a specific field (e.g., SRI field) within the DCI.

For example, the UE may report, to the BS, the UE capability information that simultaneous transmission based on multiple panels is impossible as described above, and may be configured with the first SRS resource set and the second SRS resource set for the non-codebook based PUSCH transmission. Here, the UE capability information may includes information (e.g., 2, 4) on the maximum number of layers which the UE may support for the non-codebook based PUSCH transmission. Further, the first SRS resource set may be constituted by SRS resource #1, SRS resource #2, SRS resource #3, and SRS resource #4, and the second SRS resource set may be constituted by SRS resource #5, SRS resource #6, SRS resource #7, and SRS resource #8. Further, the UE capability information may includes the information on the maximum number of layers which the UE may support for the non-codebook based PUSCH transmission.

When the UE reports that the maximum number of layers is 2, the UE may effectively recognize (or expect) an operation in which up to 2 SRS resources are scheduled within the first SRS resource set or up to 2 SRS resources are scheduled within the second SRS resource set. However, the corresponding UE may not expect a scheduling indication of applying both one SRS resource within the first SRS resource set and one SRS resource within the second SRS resource set to the PUSCH transmission. The reason is that the scheduling indication is contrary to the capability information of the UE, which the corresponding UE reports to the BS.

Similarly to this, when the UE reports, to the BS, that simultaneous uplink transmission based on other panels (i.e., based on other SRS resource sets) is possible, the corresponding UE may additionally (or independently) report, to the BS, information on the maximum number of layers supportable for each panel in addition to the information on the maximum number of layers supportable for the non-codebook based PUSCH transmission.

For example, a case is considered, in which the UE reports that the maximum number of layers supportable for the non-codebook based PUSCH transmission is 4 and reports that the maximum number of layers supportable for each panel is 2. The corresponding UE may effectively recognize (or expect) an operation in which up to 2 SRS resources are scheduled within the first SRS resource set, up to 2 SRS resources are scheduled within the second SRS resource set, or up to 2 SRS resources in the first SRS resource set and up to 2 SRS resources in the second SRS resource set are simultaneously scheduled. However, the UE may not expect other scheduling indications. The reason is that the scheduling indication is contrary to the capability information of the UE, which the corresponding UE reports to the BS.

Further, similarly to this, when the UE reports, to the BS, that simultaneous uplink transmission based on other panels (i.e., based on other SRS resource sets) is possible, the corresponding UE may additionally (or independently) report, to the BS, the information on the maximum number of layers supportable for each panel as additional capability information limited to a case (or situation) in which simultaneous PUSCH transmission through two or more panels is scheduled, in addition to the information on the maximum number of layers supportable for the non-codebook based PUSCH transmission.

For example, a case is considered, in which the UE reports that the maximum number of layers supportable for the non-codebook based PUSCH transmission is 4 and reports that the maximum number of layers supportable for each panel is 2 only in the case (or situation) in which simultaneous PUSCH transmission through two or more panels is scheduled. The corresponding UE may effectively recognize (or expect) an operation in which up to 4 SRS resources are scheduled within the first SRS resource set, up to 2 SRS resources are scheduled within the second SRS resource set, or up to 4 SRS resources in the first SRS resource set and up to 2 SRS resources in the second SRS resource set are simultaneously scheduled. However, the UE may not expect a scheduling indication of applying both one SRS resource within the first SRS resource set and three SRS resources within the second SRS resource set to the PUSCH transmission. The reason is that the scheduling indication is contrary to the capability information of the UE, which the corresponding UE reports to the BS.

Further, in the methods and/or operations proposed in the present disclosure, indication information related to scheduling of the codebook PUSCH transmission and the non-codebook based PUSCH transmission may be configured and/or indicated by a specific field (or state) within DCI for the corresponding scheduling. On the contrary, when the corresponding PUSCH transmission is based on a configured grant, the indication information may be configured and/or indicated through the higher layer parameter (e.g., RRC signaling and/or MAC-CE signaling).

If methods and/or operations proposed in the present disclosures are applied, in relation to an operation of performing, by a UE, codebook-based PUSCH transmission and/or non-codebook-based PUSCH transmission, there is an effect in that a base station can control uplink transmission in a specific panel unit and/or specific beam unit of the UE. Accordingly, panel and/or beam selective PUSCH scheduling accompanied by enhanced power control of a panel and/or beam unit can be performed.

Second Embodiment: Method of Configuring and/or Indicating Panel and/or Beam for PUCCH Transmission A PUCCH transmission and reception procedure in a next-generation wireless communication system may be the same as that of FIG. 16.

FIG. 16 illustrates an example of a PUCCH transmission and reception procedure to which a method proposed in the present disclosure may be applied. FIG. 16 is merely for convenience of description and does not limit the scope of the present disclosure.

Referring to FIG. 16, a case a base station and a UE perform PUCCH transmission and reception based on a panel unit and/or a beam unit is assumed.

The UE may transmit (or report) UE capability information to the base station (S1605). In this case, the corresponding UE capability information may include information on UE capability related to the PUCCH transmission of the UE, information related to a panel configuration of the UE, information related to a beam configuration of the UE, etc. For example, the corresponding UE capability information may include information on the number of panels of the UE which may be activated, information on a maximum number of panels available for one transmission, information on the number of beams that constitutes a panel of the UE, etc.

The UE may receive, from the base station, configuration information (and/or scheduling information or indication information) related to PUCCH transmission (S1610). In this case, the configuration information may be transmitted through higher layer signaling (e.g., RRC signaling, MAC-CE-based signaling). In this case, the configuration information may include configuration information (e.g., PUCCH configuration, PUCCH resource configuration) for PUCCH transmission, configuration information related to a panel and/or a beam for PUCCH transmission, etc.

The UE may transmit a PUCCH to the base station based on the PUCCH transmission-related configuration information (S1615). In this case, the corresponding PUCCH may be transmitted by considering a panel unit and/or a beam unit.

In the present disclosure, a configuration and/or indication method of a panel and/or beam unit in relation to PUCCH transmission and reception between a base station and a UE is proposed. For example, methods and/or examples hereinafter described in the present disclosure may correspond to detailed methods and/or examples of steps in FIG. 16. Furthermore, the methods and/or examples described hereinafter are merely divided for convenience of description, and may be independently applied or may be applied through a combination between them.

Hereinafter, a configuration and/or indication method of a panel and/or beam unit which may be applied to PUCCH transmission is described. Specifically, in the present disclosure, in relation to an SRS resource set(s) of a UE according to an SRS resource set(s) configuration for the specific BM usage and an SRS resource(s) within each SRS resource set, a method of configuring (and/or indicating) association (and/or linkage) with PUCCH transmission is proposed. For example, the association may be configured through separate higher layer signaling, etc. or may be based on a predefined (or predetermined or preconfigured) rule or mechanism. Accordingly, the base station may configure (or indicate or schedule) the (transmission) panel-specific UL transmission of the UE.

Furthermore, in the present disclosure, PUCCH transmission may be a concept including PUCCH transmission for each PUCCH resource configuration unit and/or PUCCH transmission for each configuration in a PUCCH resource set unit.

Upon PUCCH transmission, one or more SRS resource sets may be associated (or configured) in an individual PUCCH resource unit or a PUCCH resource set unit for the indication of a panel and/or a beam unit. For example, this may be considered as a method for panel-specific PUCCH transmission, and may be defined, configured or indicated so that the UE is required to map (or in accordance with) a specific (transmission) panel for each SRS resource set and transmit the PUCCH as described above. Alternatively, a rule from a UE operation viewpoint in which the UE is required to transmit the PUCCH by using another (transmission) panel between at least other SRS resource sets may be defined, configured or indicated.

In the following description, the number of SRS resources configured for PUCCH transmission may be two or more. A case where two SRS resource sets are configured for PUCCH transmission for convenience of description is assumed. The two SRS resource sets are denoted as a first SRS resource set (SRS resource set 1) and a second SRS resource set (SRS resource set 2), respectively.

(PUCCH Transmission and Reception Method Based on Panel Unit and/or Beam Unit)

Linkage-related signaling between a PUCCH transmission-related configuration (e.g., PUCCH resource configuration) (and/or an SRS resource set(s) configured for corresponding usage) and an SRS resource set(s) configured for BM usage may be configured, defined or indicated. In this case, the corresponding signaling may be configured and/or indicated in an individual PUCCH resource unit or a PUCCH resource set unit. In this case, the SRS resource set(s) configured for BM usage may correspond to a panel(s) of a UE as described above. In other words, a base station may configure or indicate, in the UE, information indicating linkage between a panel of the UE and the SRS resource set(s) related to PUSCH transmission through signaling.

For example, a method of transmitting information related to the linkage through higher layer signaling (e.g., RRC signaling) and/or signaling based on a medium access control-control element (MAC-CE) may be considered. The corresponding method may be related to step S1610 in FIG. 16. In the state in which a set of candidate linkage configurations related to the linkage has been preconfigured through higher layer signaling, a semi-dynamic control method, such as which candidate linkage configuration is activated or deactivate, through MAC-CE signaling may be considered. Furthermore, a method of directly providing or update a configuration related to the linkage through MAC-CE-based signaling itself may also be considered. And/or if a PUCCH resource itself is activated using a MAC-CE like a PUCCH-based semi-persistent (SP) CSI, a base station may configure or indicate, in a UE, the linkage through a MAC-CE for corresponding activation. In this case, the base station may directly indicate the linkage in the UE through the MAC-CE or may indicate the linkage in the UE through RRC signaling in a form to down-select, activate or deactivate one of configured candidates using a MAC-CE.

Specifically, PUCCH transmission and/or the first SRS resource set for PUCCH transmission may be associated with an SRS resource set A (e.g., a panel A among the panels of the UE) for BM usage. Furthermore, PUCCH transmission and/or the second SRS resource set for PUCCH transmission may be associated with an SRS resource set C (e.g., a panel C among the panels of the UE) for BM usage. That is, a panel of the UE related to the PUCCH transmission may be configured and/or indicated through the higher layer signaling and/or through the MAC-CE signaling. In this case, the linkage itself may be updated, activated, deactivated or indicated by MAC-CE-based signaling and/or dynamic signaling (e.g., DCI), etc.

For example, upon signaling related to a configuration and/or indication of PUCCH transmission, indication information related to the first SRS resource set and/or the second SRS resource set may be transmitted in an individual PUCCH resource unit or a PUCCH resource set unit. The corresponding method may be related to step S1610 in FIG. 16. For example, the indication information may be transmitted in an UL transmission configuration indicator (TCI) form. Furthermore, in relation to an SRS resource set indicated by the indication information, a base station may also indicate a local SRS resource(s) indicator in the UE, and the corresponding UE may determine (or select) a panel(s) and/or beam(s) to be applied to PUCCH transmission.

Through such a method, in relation to the PUCCH transmission, the base station may perform, on the UE, the indication (e.g., the SRS resource set unit 의 indication) of a panel unit of the UE and/or the indication (e.g., a beam and/or RS indicator within an indicated SRS resource set) of a beam unit within a panel. In other words, the UE may perform the PUCCH transmission of a panel unit and/or a beam unit based on the indication of the example.

The aforementioned proposal method may be configured (or defined or indicated) to be applied when a time-domain behavior of an SRS is aperiodic, semi-persistent and/or periodic. In other words, the aforementioned proposal method may be configured and/or defined to be supported with respect to at least one of the three types of time-domain behaviors.

A PUCCH transmission and reception method of a panel unit and/or a beam unit based on the configuration of the SRS resource set unit may be generalized as in the following example.

Upon signaling related to the configuration and/or indication of PUCCH transmission, a case where linkage between an SRS resource set for PUSCH transmission and an SRS resource set (e.g., a unit corresponding to a panel of a UE) for BM usage is configured (or indicated) based on RRC signaling and/or a MAC-CE and/or DCI through a message or field (e.g., this may be denoted as an UL TCI field) related to panel indication and/or beam indication is assumed. In this case, the linkage may be configured (or indicated) in an individual PUCCH resource unit or a PUCCH resource set unit.

In this case, a method of allowing an individual or local indicator(s) (e.g., SRI, UL RCI state) within the message or the field to be dynamically (or semi-dynamically) selected with respect to only an individual or local indicator within a corresponding linked SRS resource set(s) for BM usage may be considered. For example, the dynamic (or semi-dynamic) selection may be related to the selection of a panel and/or a beam, and may be performed based on a MAC-CE and/or DCI.

In relation to the method, in the assumed implementation situation (e.g., a UE supporting 4 panels) of the UE, an operation of making a specific one panel correspond to each SRS resource set for BM usage and transmitting or sweeping multiple UL beams within a corresponding panel by applying the multiple UL beams to an individual or local SRS resource within each corresponding SRS resource set may be considered. In this case, upon signaling related to the configuration and/or indication of PUCCH transmission, a method of linking quality of SRSs, transmitted by specific two panels, to a panel(s), that is, relatively more excellent candidates for PUCCH transmission among panels (e.g., 4 panels) supported by the UE may be considered. To this end, a configuration (and/or indication) operation of linking only specific two SRS resource sets for BM usage to a panel and/or beam-related message (or field) upon signaling related to the configuration and/or indication of the PUCCH transmission may be applied.

If two SRS resource sets down-selected or linked as described above are an SRS resource set A and an SRS resource set C as in the aforementioned example, only individual or local beams within the SRS resource set A and the SRS resource set C may be configured to be dynamically selected (or semi-dynamically selected) through the message (or field). Accordingly, there is an effect in that dynamic (or semi-dynamic) beam selection within an indicated (or selected) panel is possible while reducing overhead in a DCI bit-width. Furthermore, information of the linked (or associated) SRS resource set A and SRS resource set C may be designed to be updated, activated or deactivated through higher layer signaling and/or through MAC-CE signaling. There is an effect in that signaling overhead can be reduced.

A PUCCH transmission and reception method of a panel unit and/or a beam unit based on a configuration of an SRS resource set unit may be more generalized as in the following example.

For example, upon signaling related to the configuration and/or indication of PUCCH transmission, a case where linkage between an SRS resource set for PUSCH transmission and an SRS resource set (e.g., a unit corresponding to a panel of a UE) for BM usage is configured (or indicated) using RRC signaling and/or a MAC-CE and/or DCI through a message or field (e.g., this may be denoted as an UL TCI field) related to panel indication and/or beam indication is assumed. In this case, the linkage may be configured (or indicated) in an individual PUCCH resource unit or a PUCCH resource set unit.

In this case, a methods of allowing an individual or local indicator(s) (e.g., SRI, UL RCI state) within the message or the field to be dynamically (or semi-dynamically) selected with respect to an individual or local reference signal ID (RS ID) and/or channel ID within a corresponding linked (i.e., related to BM) (higher) reference signal (RS) and/or a set(s) of channels for BM usage may be considered. For example, the dynamic (or semi-dynamic) selection may be related to the selection of a panel and/or a beam, and may be performed based on a MAC-CE and/or DCI. In this case, the set(s) of (higher) reference signals (RSs) and/or the set(s) of channels for BM usage may be defined or configured to correspond to a panel of the UE similar to the SRS resource set(s) for BM usage.

For example, the UE may apply, to PUCCH transmission a panel and/or a beam indicated as described above. If a DL signal and/or a channel are linked (or indicated) based on a reference for the PUCCH transmission, an UL transmission beam corresponding (or reciprocal) to a corresponding DL reception beam may be configured and/or defined to be applied to the PUCCH transmission.

The set(s) of reference signals and/or the set(s) of channels (for BM usage) may be related to the indication of a panel unit and/or a beam unit for the UE. Specifically, the set(s) of reference signals and/or the set(s) of channels (for BM usage) may be defined, configured or indicated, including at least one of the following examples. Hereinafter, in the examples, a group may be substituted with a set, and one or more examples may be combined and applied.

For example, the set(s) of reference signals and/or the set(s) of channels may include a specific group of a CSI-RS resource(s) and/or a CSI-RS resource set(s). In other words, a corresponding set(s) of reference signals may include a unit (e.g., CSI-RS resource setting) in which a specific CSI-RS resource(s) is grouped. And/or the specific group may be limited to and configured with only a CSI-RS resource(s) for tracking reference signal (TRS) usage in which a higher spatial QCL reference is configured. And/or if a CSI-RS resource(s) for DL CSI acquisition usage is configured as the specific group, this may be limited to only a case where a spatial QCL reference RS(s) is included.

Furthermore, for example, the set(s) of reference signals and/or the set(s) of channels may include a specific group consisting of a synchronization signal block (SSB) (ID)(s). In this case, all the SSBs which may be included in the specific group may be limited to or permitted as SSBs configured for BM usage. In this case, the SSB configured for BM usage may mean an SSB configured in at least one resource setting for DL reporting related to BM.

Furthermore, for example, the set(s) of reference signals and/or the set(s) of channels may include a specific group consisting of a control resource set (CORESET) (ID)(s). For example, the control resource set may be limited or permitted as being only linked to only at least one specific search space configuration. And/or the ID(s) of a search space configuration may directly become the set(s) of reference signals and/or the set(s) of channels. Information of an individual control resource set and a corresponding associated panel and/or beam may be configured, applied and/or indicated in association with the ID(s) of a search space configuration.

Furthermore, for example, the set(s) of reference signals and/or the set(s) of channels may include a specific group consisting of different PUCCH resource (ID)(s). In this case, the corresponding example may be interpreted in a rule form of panel and/or beam link between PUCCH-to-PUCCH. For example, the set(s) of reference signals and/or the set(s) of channels may be configured (or associated or indicated) as an individual specific PUCCH resource ID(s), and a UE may be configured to transmit a PUCCH based on a configuration including beam information applied to a corresponding PUCCH resource ID(s). And/or the set(s) of reference signals and/or the set(s) of channels may be configured (or linked or indicated) in a specific set unit in which a preconfigured (or defined) specific PUCCH resource ID(s) is grouped, and a UE may be configured to transmit a PUCCH based on a configuration including beam information applied to a corresponding PUCCH resource ID(s). And/or as a default configuration, an operating of linking a predetermined PUCCH resource (e.g., a PUCCH resource corresponding to the lowest or highest index) to PUCCH transmission by default may be configured or defined. In this case, if a reference signal set(s) and/or a channel set(s) associated with the PUCCH transmission is not present, the default configuration may be applied to a case where a specific (ambiguous) section of an update process is configured.

If a (DL and/or UL-related) reference signal set(s) and/or channel set(s) is linked (or configured or indicated) with respect to the PUCCH transmission based on the aforementioned methods, a UE may be configured to transmit a PUCCH through a corresponding panel based on a panel applied to previous reception and/or a panel applied to previous transmission. Hereinafter, a corresponding method is described based on a reference signal set(s) and/or channel set(s) related to DL, but this is merely for convenience of description, A method described hereinafter may also be extended and applied to the case of an a reference signal set(s) and/or channel set(s) related to UL.

For example, as in the examples, if a reference signal set(s) and/or channel set(s) related to DL is linked (or configured or indicated) with respect to the PUCCH transmission, the UE may be defined (or configured or indicated) to perform selective UL transmission of a panel unit and/or a beam unit upon subsequent PUSCH scheduling through a corresponding (i.e., reciprocal) (transmission) panel of the UE based on a specific (reception) panel of the UE applied when the UE performs reception.

A corresponding (transmission) panel of the UE may mean a panel for UL transmission usage, which is associated (or implemented) to perform transmission in which beam correspondence (and/or panel correspondence) is maintained (in a specific predetermined or preconfigured level) when the UE implements a specific panel for DL reception based on the (reception) panel. For example, the UE may be implemented in the form of a specific transmission and reception panel that performs DL reception and UL transmission together as a specific identical panel.

Furthermore, if the reference signal set(s) and/or channel set(s) related to DL are linked (or configured or indicated) with respect to the PUCCH transmission, a UE may be defined (or configured or indicated) to be applied to a pathloss compensation operation upon power control of a corresponding indicated reference signal related to DL. For example, the pathloss compensation operation may be included in an open-loop power control process related to PUCCH transmission.

And/or a DL-related reference signal associated with a corresponding indicated DL channel (e.g., a specific CORE-SET(s)) may be defined (or configured or indicated) to be applied to a pathloss compensation operation upon power control. In this case, the DL-related reference signal may be a reference signal used for the reception of the corresponding DL channel. For example, the DL-related reference signal may include a DMRS for CORESET(s) (or QCLed). Furthermore, the pathloss compensation operation may be included in an open-loop power control process related to PUCCH transmission.

If the methods and/or operations proposed in the present disclosures are applied, there is an effect in that a base station can control uplink transmission in a specific panel unit and/or specific beam unit of a UE in relation to an operation of performing, by the UE, PUCCH transmission. Accordingly, panel and/or beam selective PUCCH transmission accompanied by enhanced power control of a panel and/or beam unit can be performed.

Third Embodiment: Method of Configuring and/or Indicating Panel and/or Beam for SRS Transmission An SRS transmission and reception procedure in a next-generation wireless communication system may be the same as that of FIG. 17.

FIG. 17 illustrates an example of an SRS transmission and reception procedure to which a method proposed in the present disclosure may be applied. FIG. 17 is merely for convenience of description and does not limit the scope of the present disclosure.

Referring to FIG. 17, a case where a base station and a UE perform SRS transmission and reception based on a panel unit and/or a beam unit is assumed.

The UE may transmit (or report) UE capability information to the base station (S1705). In this case, the corresponding UE capability information may include information on UE capability related to the SRS transmission of the UE, information related to a panel configuration of the UE, information related to a beam configuration of the UE, etc. For example, the corresponding UE capability information may include information on the number of panels of the UE which may be activated, information on a maximum number of panels available for one transmission, information on the number of beams that constitute a panel of the UE, etc.

The UE may receive, from the base station, configuration information (and/or scheduling information or indication information) related to SRS transmission (S1710). For example, the configuration information may be transmitted through RRC signaling, MAC-CE-based signaling, DCI, etc. In this case, the configuration information may include configuration information (e.g., SRS configuration, SRS resource configuration) for SRS transmission, configuration information related to a panel and/or a beam for SRS transmission, information representing (or triggering, activating or deactivating) SRS transmission, etc.

The UE may transmit an SRS to the base station based on the configuration information related to SRS transmission (S1715). In this case, the corresponding SRS may be transmitted by considering a panel unit and/or a beam unit.

In the present disclosure, a configuration and/or indication method of a panel and/or beam unit in relation to SRS transmission and reception between a base station and a UE is proposed. For example, methods and/or examples hereinafter described in the present disclosure may correspond to detailed methods and/or examples of the steps in FIG. 17. Furthermore, the methods and/or examples described hereinafter are merely divided for convenience of description, and may be independently applied or may be applied through a combination between them.

Hereinafter, a configuration and/or indication method a panel and/or beam unit which may be applied to SRS transmission is described. For example, a single SRS resource set or multiple SRS resource sets may be configured for SRS transmission as described above.

In the present disclosure, in relation to an SRS resource set(s) of a UE according to the specific SRS resource set(s) configuration for BM usage and an SRS resource(s) within each SRS resource set, a method of configuring (and/or indicating) association (and/or linkage) between the SRS resource set(s) related to SRS transmission and the SRS resource(s) within each SRS resource set is proposed. For example, the association may be configured through separate higher layer signaling, etc. or may be based on a predefined (or predetermined or preconfigured) rule or mechanism. Accordingly, the base station may configure (or indicate or schedule) (transmission) panel-specific UL transmission of the UE.

In the following description, the number of SRS resources configured for SRS transmission may be two or more. A case where two SRS resource sets are configured for SRS transmission for convenience of description is assumed. The two SRS resource sets area denoted as a first SRS resource set (SRS resource set 1) and a second SRS resource set (SRS resource set 2), respectively.

(SRS Transmission and Reception Method Based on Panel Unit and/or Beam Unit)

Signaling related to linkage between an SRS resource set(s) configured for SRS transmission and an SRS resource set(s) configured for BM usage may be configured, defined or indicated. In this case, the SRS resource set(s) configured for BM usage may correspond to a panel(s) of the UE as described above. In other words, the base station may configure or indicate, in the UE, information indicating linkage between a panel of the UE and an SRS resource set(s) related to SRS transmission through signaling.

For example, a method of transmitting linkage information through higher layer signaling (e.g., RRC signaling) and/or signaling based on a medium access control-control element (MAC-CE) may be considered. The corresponding method may be related to step S1710 in FIG. 17. In the state in which a set of candidate linkage configurations related to linkage has been preconfigured through higher layer signaling, a semi-dynamic control method, such as which candidate linkage configuration is activated or deactivated through MAC-CE signaling may be considered. Furthermore, a method of directly providing or updating a configuration related to the linkage through MAC-CE-based signaling itself may also be considered.

Specifically, a first SRS resource set for SRS transmission is associated with an SRS resource set A (e.g., a panel A among the panels of the UE) for BM usage. A second SRS resource set may be associated with an SRS resource set C (e.g., a panel C among the panels of the UE) for BM usage. That is, a panel of the UE related to codebook-based UL transmission and/or non-codebook-based UL transmission through the higher layer signaling and/or the MAC-CE signaling may be configured and/or indicated. In this case, the linkage itself may be updated, activated, deactivated or indicated by MAC-CE-based signaling and/or dynamic signaling (e.g., DCI).

For example, upon signaling for configuring and/or indicating SRS transmission, indication information related to the first SRS resource set and/or the second SRS resource set may be transmitted through a message or field for the corresponding scheduling. The corresponding method may be related to step S1570 in FIG. 17. For example, the indication information may be indicated by a UL transmission configuration indicator (TCI) field within the DCI. For another example, the indication information may be indicated by an UL TCI message (or field) based on a MAC-CE.

Through such a method, in relation to the SRS transmission, the base station may perform, on the UE, the indication of a panel unit of (e.g., the indication of an SRS resource set unit) and/or the indication of a beam unit within a panel (e.g., an SRI(s) within an indicated SRS resource set) the UE. In other words, the UE may perform the SRS transmission of a panel unit and/or a beam unit based on indication, such as that in the example.

The aforementioned proposal method may be configured (or defined or indicated) to be applied if a time-domain behavior of an SRS is aperiodic, semi-persistent and/or periodic. In other words, the aforementioned proposal method may be configured and/or defined to be supported for at least one of the three types of time-domain behaviors.

An SRS transmission and reception method based on the configuration and/or indication of the SRS resource set unit may be generalized as in the following example.

For example, a case where linkage between an SRS resource set for SRS transmission and an SRS resource set (e.g., a unit corresponding to a panel of a UE) for BM usage is configured (or indicated) through RRC signaling and/or a MAC-CE and/or DCI by using a specific message or field (e.g., this may be denoted as an UL TCI field) is assumed. In this case, a method of enabling an individual or local indicator(s) (e.g., SRI, UL RCI state) within the message or field to dynamically select only an individual or local indicator within a corresponding linked SRS resource set(s) for BM usage may be considered. For example, a value indicated by a corresponding field may be configured or defined to be related to an already-linked SRS resource set(s) for BM usage.

In relation to the method, in the assumed implementation situation of the UE (e.g., a UE supporting 4 panels), an operation of making a specific one panel correspond to each SRS resource set for BM usage and transmitting or sweeping multiple UL beams within a corresponding panel by applying the multiple UL beams to an individual or local SRS resource within a corresponding SRS resource set may be considered. In this case, upon signaling for configuring and/or indicating SRS transmission, a method of linking a panel(s) which has relatively more excellent quality of SRSs transmitted by specific two panels of panels (e.g., 4 panels) supported by the UE and becomes a candidate for SRS transmission may be considered. To this end, a configuration (and/or indication) operation for linking only specific two SRS resource sets for BM usage to a specific field within corresponding UL DCI may be applied.

If the two SRS resource sets down-selected or linked as described above are an SRS resource set A and an SRS resource set C as in the aforementioned example, only individual or local beams within the SRS resource set A and the SRS resource set C may be configured to be dynamically selected through a corresponding message or a corresponding field (i.e., panel/beam-related scheduling field). Accordingly, there can be achieved effects in that overhead in control signaling can be reduced and dynamic beam selection within an indicated (or selected) panel is made possible. Furthermore, information on a linked (or associated) SRS resource set A and SRS resource set C may be designed to be updated, activated or deactivated through higher layer signaling and/or through MAC-CE signaling. An effect in that control channel overhead can be reduced because a panel selection-related operation based on a corresponding method can be excluded from CI overhead can be obtained.

A PUSCH transmission and reception method based on the configuration and/or indication of the SRS resource set unit may be more generalized as in the following example.

For example, a case where linkage between an SRS resource set for SRS transmission and an SRS resource set (e.g., a unit corresponding to a panel of a UE) for BM usage is configured (or indicated) through RRC signaling and/or a MAC-CE and/or DCI by using a specific message or field (e.g., this may be denoted as an UL TCI field) is assumed. In this case, a method of enabling an individual or local indicator(s) (e.g., SRI, UL RCI state) within the message or the field to dynamically select only an individual or local reference signal ID (RS ID) and/or a channel ID within a corresponding linked (i.e., related to BM) (higher) reference signal (RS) and/or a set(s) of channels for BM usage may be considered. In this case, the set(s) of (higher) reference signals (RSs) and/or the set(s) of channels for BM usage may be defined or configured to correspond to a panel of the UE like the SRS resource set(s) for BM usage.

For example, the UE may apply, to SRS transmission, a panel and/or a beam indicated as described above. If a DL signal and/or a channel are linked (or indicated) based on a reference for the SRS transmission, UL transmission beam corresponding (or reciprocal) to a corresponding DL reception beam may be configured and/or defined to be applied to the SRS transmission.

The set(s) of reference signals and/or the set(s) of channels (for BM usage) may be related to the indication of a panel unit and/or a beam unit of the UE, and may be defined, configured or indicated to include at least one of the following examples, specifically. Hereinafter, in the examples, a group may be substituted with a set, and one or more examples may be combined and applied.

For example, the set(s) of reference signals and/or the set(s) of channels may include a specific group of a CSI-RS resource(s) and/or a CSI-RS resource set(s). In other words, a corresponding set(s) of reference signals may include a unit (e.g., CSI-RS resource setting) in which a specific CSI-RS resource(s) is grouped. And/or the specific group may be limited and configured as only a CSI-RS resource(s) for tracking reference signal (TRS) usage in which a higher spatial QCL reference is configured. And/or if a CSI-RS resource(s) for DL CSI acquisition usage may consist of the specific group, the specific group may be limited to only a case where a spatial QCL reference RS(s) is included.

For another example, the set(s) of reference signals and/or the set(s) of channels may include a specific group consisting of a synchronization signal block (SSB) (ID)(s). In this case, an SSB which may be included in the specific group may be limited or permitted as being an SSB configured for BM usage. In this case, the SSB configured for BM usage may mean an SSB configured in at least one resource setting for DL reporting related to BM.

Furthermore, for example, the set(s) of reference signals and/or the set(s) of channels may include a specific group consisting of a control resource set (CORESET) (ID)(s). For example, the control resource set may be limited or permitted as being only linked to at least one specific search space configuration. And/or the ID(s) of a search space configuration may directly become the set(s) of reference signals and/or the set(s) of channels. Information of an individual control resource set and a corresponding associated panel and/or beam may be configured, applied and/or indicated to be associated with the ID(s) of a search space configuration.

Furthermore, for example, the set(s) of reference signals and/or the set(s) of channels may include a specific group consisting of a PUCCH resource (ID)(s). For example, the set(s) of reference signals and/or the set(s) of channels may be configured (or associated or indicated) as an individual specific PUCCH resource ID(s), and a UE may be configured to transmit an SRS based on a configuration including beam information applied to a corresponding PUCCH resource ID(s). And/or the set(s) of reference signals and/or the set(s) of channels may be configured (or linked or indicated) as a specific set unit in which a preconfigured (or defined) specific PUCCH resource ID(s) is grouped, and a UE may be configured to transmit an SRS based on a configuration including beam information applied to a corresponding PUCCH resource ID(s). And/or as a default configuration, an operation of linking a predetermined PUCCH resource (e.g., a PUCCH resource corresponding to the lowest or highest index) to SRS transmission by default may be configured or defined. In this case, if a reference signal set(s) and/or a channel set(s) associated with the SRS transmission is not present, the default configuration may be applied to a case where a specific (ambiguous) section of an update process is configured.

If a (DL and/or UL-related) reference signal set(s) and/or channel set(s) is linked (or configured or indicated) with respect to SRS transmission based on the aforementioned methods, a UE may be configured to transmit the SRS through a corresponding panel based on a panel applied to previous reception and/or a panel applied to previous transmission. Hereinafter, a corresponding method is described based on a reference signal set(s) and/or channel set(s) related to DL, but this is merely for convenience of description, and may also be extended and applied to a case where a method described hereinafter is a reference signal set(s) and/or channel set(s) related to UL.

For example, as in the examples, if a reference signal set(s) and/or channel set(s) related to DL is linked (or configured or indicated) with respect to SRS transmission, the UE may be defined (or configured or indicated) to perform selective UL transmission of a panel unit and/or a beam unit upon configuration (and/or indication) of subsequent SRS transmission through a corresponding (i.e., reciprocal) (transmission) panel of the UE based on a specific (reception) panel of the UE applied when performing reception.

Based on the (reception) panel, a (transmission) panel of the UE corresponding to the (reception) panel may mean a panel for UL transmission usage, which is associated (or implemented) to perform transmission in which beam correspondence (and/or panel correspondence) is maintained (in a specific predetermined or preconfigured level) when the UE implements a specific panel for DL reception. For example, the UE may be implemented in the form of a specific transmission and reception panel in which DL reception and UL transmission are also performed as a specific identical panel.

Furthermore, if the reference signal set(s) and/or channel set(s) related to DL is linked (or configured or indicated) with respect to the SRS transmission, the UE may be defined (or configured or indicated) to apply a corresponding indicated reference signal related to DL to a pathloss compensation operation upon power control. For example, the pathloss compensation operation may be included in an open-loop power control process related to SRS transmission.

And/or a DL-related reference signal associated with a corresponding indicated DL channel (e.g., a specific CORESET(s)) may be defined (or configured or indicated) to be applied to a pathloss compensation operation upon power control. In this case, the DL-related reference signal may be a reference signal used for the reception of a corresponding DL channel, and may include a DMRS for a CORESET(s) (or QCLed), for example. Furthermore, the pathloss compensation operation may be included in an open-loop power control process related to PUSCH transmission.

And/or a method of allowing a reference signal set(s) and/or a channel set(s) related to DL to configure (and/or indicate) an (additional) linkage (or association) in an SRS resource set level configured for SRS transmission may be considered. For example, the linkage (or association) may be configured and/or indicated through higher layer signaling (e.g., RRC signaling) and/or through signaling based on a MAC-CE. In this case, an operation of performing, by a UE, uplink transmission by using a (corresponding) beam and/or panel applied to receive a corresponding reference signal set(s) and/or channel set(s) may be defined (or configured or indicated).

For example, based on the aforementioned configuration and/or indication of the method, a corresponding UE may transmit an SRS based on (an SRS resource(s) within) an associated SRS resource set(s) by using a (corresponding) beam and/or panel applied to receive a DL reference signal set(s) and/or channel set(s). For example, if a first SRS resource set and a second SRS resource set are configured for SRS transmission, the first SRS resource set may be configured and/or indicated to be associated with an SSB #3, and the second SRS resource set may be configured and/or indicated to be associated with an SSB #7.

If linkage (or association relation), such as that in the example, is configured and/or indicated, a UE may transmit an SRS through a configured SRS resource(s) within the first SRS resource set by using a (transmission) panel corresponding to (the best or preferred) (reception) panel applied to receive an SSB #3. In this case, the reception panel and/or transmission panel of the UE may be one identical transmission and reception panel.

Furthermore, spatial relation information (e.g., RRC parameter spatial relation info) may be configured in the SRS resource(s) within the indicated SRS resource set in a unique resource level. For example, if an independent CSI-RS (CRI) resource indicator is configured for each SRS resource, a UE may be configured to transmit a P SRS by using an uplink beam corresponding (i.e., reciprocal) to the reception of a corresponding CRI when transmitting the P SRS through each corresponding SRS resource. In this case, since the linkage of a separate (or additional) SSB #3 is assigned for each SRS resource set, the UE may be configured (and/or indicated) to determine (the best or preferred) beam for the reception of a CSI-RS for an SRI within a (transmission) panel of the UE corresponding to the SRS resource set and to perform the transmission of the SRS by using a transmission beam corresponding to the determined beam.

The aforementioned example may be applied by substituting the first SRS resource set with the second SRS resource set and substituting the SSB #3 with the SSB #7.

The two cases may also be extended to an example related to multiple SRS resource sets.

That is, the aforementioned linkage (or association) in the SRS resource set level may be interpreted as a panel of UE selection (and/or panel association). Furthermore, the linkage (or association) in the SRS resource level within the SRS resource set may be interpreted as beam selection (and/or beam association) within a selected (and/or associated) panel.

And/or a beam selection (and/or beam association) relation may be configured in an SRS resource level in addition to the aforementioned SRS resource set level. For example, if a first SRS resource set and a second SRS resource set are configured for SRS transmission, the first SRS resource set may be configured and/or indicated to be associated with an SSB #3, and the second SRS resource set may be configured and/or indicated to be associated with an SSB #7. In this case, an SRS resource #4 within the first SRS resource set may be configured and/or indicated to be associated with a CRI #11, and an SRS resource #5 within the first SRS resource set may be configured and/or indicated to be associated with a CRI #12. Furthermore, an SRS resource #8 within the second SRS resource set may be configured and/or indicated to be associated with a CRI #11, and an SRS resource #9 within the first SRS resource set may be configured and/or indicated to be associated with a CRI #14. A UE may transmit an SRS by using the associated SRS resource set(s) and the associated SRS resource(s).

As in the example, the CRI #11 may be configured in a specific SRS resource (e.g., the SRS resource #4) within the first SRS resource set and also be redundantly configured in a specific SRS resource (e.g., the SRS resource #8) within the second SRS resource set in common. Furthermore, UE capability for permission related to the redundant configuration is separately present. A procedure of reporting, by a UE, corresponding UE capability information to a base station may be applied. Accordingly, the aforementioned association method may be applied depending on whether to enable the redundant configuration and/or an implementation of a UE.

For example, if the redundant configuration is enabled, a UE may receive a CSI-RS resource corresponding to a CRI #11 through a transmission and reception module (e.g., transmission and reception panel) of the UE corresponding to a first SRS resource set. The UE may transmit an SRS in an SRS resource #4 by using a transmission beam corresponding to the reception beam of a CSI-RS resource within the transmission and reception module. Furthermore, the corresponding UE may receive the CSI-RS resource corresponding to the CRI #11 through a transmission and reception module (e.g., transmission and reception panel) of the UE corresponding to the second SRS resource set. The UE may transmit an SRS in an SRS resource #8 by using a transmission beam corresponding to the reception beam of a CSI-RS resource within the transmission and reception module. For example, the transmission and reception module may be determined by each of the reception of the SSB #3 and the reception of the SSB #7. Furthermore, the CSI-RS resource corresponding to the CRI #11 may mean a specific beam of beams of a base station. That is, the corresponding CSI-RS resource may be based on the same transmission beam of the base station.

If the SRS resource #4 and the SRS resource 8 are simultaneously indicated when a base station schedules the UL transmission of a UE, there can be obtained an effect in that the base station can effectively receive corresponding UL transmission through a base station reception beam corresponding to a transmission beam of a CRI #11 when receiving the corresponding UL transmission. That is, a plurality of panel(s) and/or a plurality of beam(s) of the UE may be configured to correspond (or reciprocal) to a single panel and/or a single beam of the base station.

Furthermore, a source RS of spatial QCL (e.g., QCL type D) configured and/or indicated for the CSI-RS resource corresponding to the CRI #11 exemplified in order to support the aforementioned proposal operations may be configured to become {SSB #3 and/or SSB #7} (e.g., an integration of an SSB #3 and an SSB #7 from a beam region viewpoint). Furthermore, if a CRI #11 is an aperiodic CSI-RS type, a method of (selectively) changing and/or indicating a source RS of spatial QCL followed by the CRI #11 every piece of transmission timing based on an individual trigger based on DCI so that the source RS becomes an SSB #3 or an SSB #7 may be considered. In this case, the change and/or the indication may be dynamic or semi-dynamic.

Furthermore, in the present disclosure, in relation to signaling related to a configuration and/or indication of the SRS transmission, a method of applying the aforementioned proposal method z application by considering a time-domain behavior(s) may be considered.

For example, in the contents, a method of dynamically indicating a local resource ID (e.g., local SRS resource ID) by using a specific message or field has been described. Furthermore, if multiple SRS resource sets in which the usage of an SRS resource is configured for the usage of codebook-based uplink transmission and/or non-codebook-based uplink transmission are configured, a method of performing the indication of a panel unit and/or a beam unit by considering a time-domain behavior of the multiple SRS resource sets may also be considered. A codepoint(s) (e.g., an SRI state or an UL TCI state) of a message or field (e.g., an SRI field or an UL TCI state field) may be mapped over an SRS resource set(s) configured in a specific identical time-domain behavior among the multiple SRS resource sets. A method of configuring and/or indicating the dynamic selection of a panel by using the codepoint(s) may be applied. The reason for this is that SRS resources within the multiple SRS resource sets may be mixed and configured with a codepoint(s) within a corresponding message or field.

For example, in relation to this, information regarding to which time-domain behavior a base station will apply the corresponding method may be configured (or defined) to be down-selected, activated, deactivated, updated, changed and/or switched based on higher layer signaling (e.g., RRC signaling) and/or MAC-CE signaling. For example, in relation to this, the mapping of the codepoint(s) may be based on combinatorial mapping. That is, a specific field within UL DCI may be configured and/or defined to be configured based on a rule on which SRS resource(s) within a corresponding SRS resource set are mechanically mapped onto mechanical codepoints.

If the method in the example is applied, a power control operation for SRS transmission may be configured to follow a power control method corresponding to an SRS resource set to which a specific codepoint (e.g., an SRI or UL TCI state) of a specific field of the UL DCI belongs. For example, power for SRS transmission may be controlled by applying a power control-related parameter configured in a corresponding SRS resource set. Furthermore, interlocked power control is performed based on a specific offset (e.g., an offset value related to power control).

Furthermore, unlike in the aforementioned method, in case that operations on two or more time domains are configurable together, when signaling for a configuration and/or indication of SRS transmission is performed, if two or more SRS resources are indicated together, only SRS resources following the same time-domain behavior may be defined or configured to be indicated. Alternatively, a UE may expect that only SRS resources following the same time-domain behavior are indicated. In this case, if two or more SRS resources are indicated together, this may mean simultaneous UL transmission based on multiple beams and/or multiple panels.

If methods and/or operations proposed in the present disclosure are applied, in relation to an operation of performing, by a UE, SRS transmission, there can be obtained an effect in that a base station can control uplink transmission in a specific panel unit and/or specific beam unit of the UE. Accordingly, panel and/or beam selective SRS transmission accompanied by enhanced power control of a panel and/or beam unit can be performed.

FIG. 18 illustrates an example of an operating flowchart of a UE which performs SRS transmission based on the scheduling of a panel unit and/or a beam unit to which a method proposed in the present disclosure may be applied. FIG. 18 is merely for convenience of description and does not limit the scope of the present disclosure.

Referring to FIG. 18, in relation to the SRS transmission, a UE and a base station may operate using an SRS transmission method based on the configuration (and/or indication) of a panel unit and/or a beam unit described in the present disclosure.

The UE may receive configuration information related to the transmission of an SRS (S1805). For example, the configuration information may include resource configuration information related to SRS transmission, configuration information of a panel and/or a beam, etc. as described above. For example, the configuration information may include a configuration(s) (e.g., UL TCI states) indicating at least one of a transmission unit (e.g., the aforementioned panel or an SRS resource set configured for BM usage) or a beam (e.g., an SRS resource configured for BM usage) related to the transmission of the SRS. For example, as described above, the configuration may be configured for each resource or resource set of the SRS. Furthermore, the transmission unit and the beam may be determined based on i) an uplink reference signal transmitted by the UE or ii) a downlink reference signal received by the UE.

For example, a specific field (e.g., an UL TCI state field) included in the configuration information may be used to indicate information (e.g., a panel indicator or a specific SRS resource set) indicating a panel related to the SRS transmission and/or information (e.g., resource or identification information of an UL RS (or channel), resource or identification information of a DL RS (or channel)) indicating a beam.

For example, the operation of receiving, by the UE (e.g., 2210 and/or 2220 in FIGS. 22 to 26), the configuration information in step S1805 may be implemented by apparatuses of FIGS. 22 to 26 to be described hereinafter. For example, referring to FIG. 22, one or more processors 102 may control one or more transceivers 106 and/or one or more memories 104, etc. to receive the configuration information. The one or more transceivers 106 may receive the configuration information.

The UE may transmit the SRS based on the configuration information (S1810).

For example, the operation of transmitting, by the UE (e.g., 2210 and/or 2220 in FIGS. 22 to 26), the SRS in step S1810 may be implemented by the apparatuses of FIGS. 22 to 26 to be described hereinafter. For example, referring to FIG. 22, the one or more processors 102 may control the one or more transceivers 106 and/or the one or more memories 104, etc. to transmit the SRS. The one or more transceivers 106 may transmit the SRS.

FIG. 19 illustrates an example of an operating flowchart of a base station which performs SRS reception based on the scheduling of a panel unit and/or a beam unit to which a method proposed in the present disclosure may be applied. FIG. 19 is merely for convenience of description and does not limit the scope of the present disclosure.

Referring to FIG. 19, in relation to the SRS reception, a UE and a base station may operate using an SRS transmission method based on the configuration (and/or indication) of a panel unit and/or a beam unit described in the present disclosure.

The base station may transmit configuration information related to the transmission of an SRS (S1905). For example, the configuration information may include resource configuration information related to SRS transmission, configuration information of a panel and/or a beam, etc. as described above. For example, the configuration information may include a configuration(s) (e.g., UL TCI states) indicating at least one of a transmission unit (e.g., the aforementioned panel or an SRS resource set configured for BM usage) or a beam (e.g., an SRS resource configured for BM usage) related to the transmission of an SRS. For example, as described above, the configuration may be configured for each resource or resource set of the SRS. Furthermore, the transmission unit and the beam may be determined based on i) an uplink reference signal transmitted by the UE or ii) a downlink reference signal received by the UE.

For example, a specific field (e.g., an UL TCI state field) included in the configuration information may be used to indicate information (e.g., a panel indicator or a specific SRS resource set) indicating a panel related to the SRS transmission and/or information (e.g., resource or identification information of an UL RS (or channel), resource or identification information of a DL RS (or channel)) indicating a beam.

For example, the operation of transmitting, by the base station (e.g., 2210 and/or 2220 in FIGS. 22 to 26), the configuration information in step S1905 may be implemented by the apparatuses of FIGS. 22 to 26 to be described hereinafter. For example, referring to FIG. 22, the one or more processors 102 may control the one or more transceivers 106 and/or the one or more memories 104, etc., to transmit the configuration information. The one or more transceivers 106 may transmit the configuration information.

The base station may receive the SRS based on the configuration information (S1910). For example, the base station may receive the SRS by using its reception beam corresponding to a transmission beam of the UE configured and/or indicated based on the control information (and/or the configuration information).

For example, the operation of receiving, by the base station (e.g., 2210 and/or 2220 in FIGS. 22 to 26), the SRS in step S1910 may be implemented by the apparatuses of FIGS. 22 to 26 to be described hereinafter. For example, referring to FIG. 22, the one or more processors 102 may control the one or more transceivers 106 and/or the one or more memories 104, etc., to receive the SRS. The one or more transceivers 106 may receive the SRS.

Furthermore, in relation to the steps of FIGS. 18 and 19, the following examples may be additionally applied.

For example, the transmission unit may be based on a set configured as one or more uplink reference signals. Furthermore, the beam may be based on any one of the one or more uplink reference signals. That is, the beam may be a configuration included in the transmission unit. In other words, a beam to be applied when the UE transmits the SRS may be any one of beams constituting a panel configured (or indicated) for the transmission of a corresponding SRS. For example, as described above, the set may include a set of sounding reference signal resources, etc. The set of sounding reference signal resources may be configured for BM usage.

For example, the transmission unit may be based on a set configured as one or more downlink reference signals. Furthermore, the beam may be based on one of the one or more downlink reference signals. That is, the beam may be a configuration included in the transmission unit. In other words, a beam to be applied when the UE transmits the SRS may be one of beams constituting a panel configured (or indicated) for the transmission of a corresponding SRS. For example, as described above, the set may include a set of channel state information-reference signal (CSI-RS) resources and/or a set of synchronization signal block IDs.

For example, a UE may transmit UE capability information related to the number of transmission units which can be simultaneously supportable by the UE for the transmission of an SRS. For example, as described above, although multiple panels of a UE are activated for SRS transmission, there may be restriction in which only one panel is actually used for SRS transmission. The corresponding UE may report information related to the restriction in the form of UE capability information.

For example, power control for the transmission of an SRS may be configured for each transmission unit (e.g., panel).

Accordingly, there can be obtained an effect in that a base station can control uplink transmission in a specific panel unit and/or specific beam unit of a UE in relation to an operation of performing, by a UE, SRS transmission. Furthermore, the configuration and/or indication of panel and/or beam selective SRS transmission accompanied by enhanced power control of a panel and/or beam unit can be performed.

Fourth Embodiment: Panel and/or Beam Configuration for Uplink Transmission

A method of configuring and/or indicating uplink transmission of multiple transmission units (e.g., multiple panels) based on the aforementioned specific transmission unit (e.g., a panel, UTE) is described. In the present embodiment, the specific transmission unit is denoted and described as a panel, for convenience of description, but may be substituted with another technical term and applied.

In the case of panel-specific uplink transmission, panel indication based on a panel ID may be performed. In this case, the panel-specific uplink transmission may mean uplink transmission of a panel unit, and may also be denoted as panel-selective uplink transmission. Furthermore, a panel identifier (ID) includes identification information of a panel of a UE and/or a base station, and may also be substituted with an expression of a UTE ID, etc. Furthermore, uplink transmission (e.g., the transmission of an uplink signal and/or the transmission of an uplink channel) through different panels may be performed based on scheduling (and/or indication) by a base station, etc.

In this case, the UE may report, to the base station, the number of panels (e.g., UTEs) supported by the UE in the form of UE capability information. For example, the UE may report, to the base station, information on a maximum number of panels supportable by the UE for one or more uplink transmissions. The UE may report, to the base station, information on the number of panels simultaneously supported by the UE for uplink transmission.

For example, if a panel is defined as a concept corresponding to an SRS resource set as described above, a configuration and/or indication method of a panel may be differently configured (or defined) depending on the usage of the corresponding SRS resource set. Hereinafter, in Methods 1 to 4, operations of a UE and/or a base station related to the configuration and/or indication of a panel depending on each usage are described.

Method 1)

First, a case where identification information (hereinafter a panel ID) indicating a panel is configured for each SRS resource set configured for BM usage is described. The configuration (and/or mapping) of a panel ID for the SRS resource set may be performed through higher layer signaling (e.g., RRC signaling).

In this case, a UE may not expect that the same panel ID is configured for different SRS resource sets configured for BM usage. That is, if a base station configures (and/or schedules) uplink transmission in the UE, the base station may map (or configure) different panel IDs for different SRS resource sets. In other words, the UE may receive a configuration and/or indication indicating that the UE has to apply different panel IDs to different SRS resource sets configured for BM usage.

The SRS resource sets may be based on the same time-domain behavior. For example, the time-domain behavior may include a periodic operation, an aperiodic operation, or a semi-persistent operation. That is, if an operation of a UE and/or a base station is limited to only a specific identical time-domain behavior, the same panel ID may be redundantly (or configured or mapped) for each SRS resource set with respect to different time-domain behaviors. Accordingly, there are technical effects in that an SRS transmitted by the same panel (e.g., the same UTE) can be configured as one or more of periodic, semi-persistent, or aperiodic and the flexibility of SRS transmission can be improved.

If a panel ID is not configured for an SRS resource set for BM usage(s), a panel to be applied to the corresponding SRS resource set may be determined based on an UE implementation. For example, if a panel ID has not been configured for some (e.g., a subset) of SRS resource sets configured for BM usage with respect to a UE, the UE may apply (or map) a panel to an SRS resource set for which a panel ID is not configured based on an UE implementation, and may perform SRS transmission through the corresponding panel. Alternatively, a specific rule on which the UE is configured to perform SRS transmission by mapping panels to an SRS resource set from a panel not allocated to an SRS resource set may be defined (or configured).

A UE may perform SRS transmission by using a corresponding panel ID with respect to an SRS resource set(s) for which a panel ID is (explicitly) configured. In contrast, a corresponding UE may be defined (and/or configured or indicated) to perform SRS transmission by first mapping a panel ID(s) other than a configured panel ID(s) to an SRS resource set(s) for which a panel ID is not configured. Accordingly, there is an effect in that an SRS beam sweeping and/or SRS panel sweeping operation of a panel unit can be performed. For example, a UE may sequentially (or intersectionally) perform mapping between an SRS resource set and a panel ID from a non-configured (and/or non-allocated) panel ID. If all panel IDs supported by a corresponding UE have been mapped at least once, an operation of redundantly mapping an already-mapped panel ID to an SRS resource set may be defined (and/or configured or indicated). There is a technical effect in that a UE can equally perform uplink transmission by using a different panel(s) because a panel ID is equally allocated (or mapped).

Method 2)

Next, a case where identification information (hereinafter panel ID) indicating a panel is configured for each SRS resource set configured for codebook usage is described. To configure an SRS resource set for codebook usage may mean that the corresponding SRS resource set is configured for codebook-based PUSCH transmission. In this case, multiple SRS resource sets for codebook usage may be configured. A configuration (and/or mapping) of a panel ID for an SRS resource set may be performed through higher layer signaling (e.g., RRC signaling).

If a panel ID is not configured for an SRS resource set(s) for codebook usage, a panel to be applied to the corresponding SRS resource set may be determined based on a UE implementation. A panel ID may be indicated by DCI (i.e., an UL grant) for scheduling for PUSCH transmission. That is, information on a corresponding panel ID may be included in the DCI. Furthermore, if a panel ID indicated by the DCI is also configured for an SRS resource set for BM usage, a UE needs to transmit a scheduled PUSCH by using the same panel indicated by the panel ID.

If a panel ID(s) is configured (and/or indicated, associated or mapped) for an SRS resource set for codebook usage, upon PUSCH scheduling, a transmit rank and/or a transmit PMI for a corresponding PUSCH may be indicated through a specific transmit rank indicator (TRI) and/or a transmit precoding matrix indicator (TPMI). Table 8 illustrates an example of TPMI indices which may be indicated through a TPMI.

partial and non-coherent (PartialAndNonCoherent)-related TPMI index(s) is not indicated. The non-coherent-related TPMI index(s) may include an index(s) when one non-zero value is present per column vector (e.g., TPMI indices 0 to 3 in Table 8). The partial and non-coherent-related TPMI index(s) may include an index(s) when at least one non-zero value is present per column vector (e.g., TPMI indices 0 to 15 in Table 8). In this case, the restriction may be automatically applied through a rule, etc. or may be applied through a configuration and/or indication of a base station, etc.

For example, a specific TPMI index(s) indicating a TPMI over multiple UE panels may be interpreted as a TPMI index(s) present a method of configuring (and/or mapping or associating) a panel ID. As described in the present method, if a base station independently (or separately) applies a specific panel of a UE to scheduling (and/or configuration indication) along with a specific panel ID(s), a specific TPMI index(s) indicating a TPMI over multiple UE panels may be excluded upon scheduling. Accordingly, there is a technical effect in that DCI overhead can be reduced because a redundant indication possibility of a panel, etc. is obviated and the size of a TPMI indication field can also be reduced.

The aforementioned TPMI restriction operation (i.e., codebook-subset restriction operation) may be applied in association with corresponding reporting if there is reporting of UE capability information related to the TPMI restriction operation. And/or the TPMI restriction operation may be selectively applied along with a separate configuration and/or indicator of a base station separately from the reporting of the UE capability information.

Furthermore, a panel ID may be associated (or configured or mapped) in an SRS resource level within an SRS resource set. For example, a panel ID may be configured for each SRS

TABLE 8

| TPMI index | $W$, (ordered from left to right in increasing order of TPMI index) |
|---|---|
| 0-7 | $\frac{1}{2}\begin{bmatrix}1\\0\\0\\0\end{bmatrix}$ $\frac{1}{2}\begin{bmatrix}0\\1\\0\\0\end{bmatrix}$ $\frac{1}{2}\begin{bmatrix}0\\0\\1\\0\end{bmatrix}$ $\frac{1}{2}\begin{bmatrix}0\\0\\0\\1\end{bmatrix}$ $\frac{1}{2}\begin{bmatrix}1\\0\\1\\0\end{bmatrix}$ $\frac{1}{2}\begin{bmatrix}1\\0\\-1\\0\end{bmatrix}$ $\frac{1}{2}\begin{bmatrix}1\\0\\j\\0\end{bmatrix}$ $\frac{1}{2}\begin{bmatrix}1\\0\\-j\\0\end{bmatrix}$ |
| 8-15 | $\frac{1}{2}\begin{bmatrix}0\\1\\0\\1\end{bmatrix}$ $\frac{1}{2}\begin{bmatrix}0\\1\\0\\-1\end{bmatrix}$ $\frac{1}{2}\begin{bmatrix}0\\1\\0\\j\end{bmatrix}$ $\frac{1}{2}\begin{bmatrix}0\\1\\0\\-j\end{bmatrix}$ $\frac{1}{2}\begin{bmatrix}1\\1\\1\\1\end{bmatrix}$ $\frac{1}{2}\begin{bmatrix}1\\1\\j\\j\end{bmatrix}$ $\frac{1}{2}\begin{bmatrix}1\\1\\-1\\-1\end{bmatrix}$ $\frac{1}{2}\begin{bmatrix}1\\1\\-j\\-j\end{bmatrix}$ |
| 16-23 | $\frac{1}{2}\begin{bmatrix}1\\j\\1\\j\end{bmatrix}$ $\frac{1}{2}\begin{bmatrix}1\\j\\j\\-1\end{bmatrix}$ $\frac{1}{2}\begin{bmatrix}1\\j\\-1\\-j\end{bmatrix}$ $\frac{1}{2}\begin{bmatrix}1\\j\\-j\\1\end{bmatrix}$ $\frac{1}{2}\begin{bmatrix}1\\-1\\1\\-1\end{bmatrix}$ $\frac{1}{2}\begin{bmatrix}1\\-1\\j\\-j\end{bmatrix}$ $\frac{1}{2}\begin{bmatrix}1\\-1\\-1\\1\end{bmatrix}$ $\frac{1}{2}\begin{bmatrix}1\\-1\\-j\\j\end{bmatrix}$ |
| 24-27 | $\frac{1}{2}\begin{bmatrix}1\\-j\\1\\-j\end{bmatrix}$ $\frac{1}{2}\begin{bmatrix}1\\-j\\j\\1\end{bmatrix}$ $\frac{1}{2}\begin{bmatrix}1\\-j\\-1\\j\end{bmatrix}$ $\frac{1}{2}\begin{bmatrix}1\\-j\\-j\\-1\end{bmatrix}$ — — — — |

If a panel ID(s) is configured for an SRS resource set for codebook usage, to indicate a specific TPMI index among TPMI indices which may be indicated through a corresponding TPMI with respect to a corresponding UE may be restricted. For example, there may be restriction by which a non-coherent (nonCoherent)-related TPMI index(s) and/or a resource within an SRS resource set configured for codebook usage. A panel ID may be indicated by DCI (i.e., an UL grant) for PUSCH scheduling. Furthermore, if a panel ID indicated by the DCI is also configured for an SRS resource set for BM usage, a UE needs to transmit a scheduled PUSCH by using the same panel indicated by the panel ID.

Furthermore, although a panel ID is configured for each SRS resource, the aforementioned TPMI restriction operation may be applied.

Method 3)

Next, a case where identification information (hereinafter panel ID) indicating a panel is configured for each SRS resource set configured for non-codebook usage is described. To configure an SRS resource set for non-codebook usage may mean that the corresponding SRS resource set is configured for PUSCH transmission based on a non-codebook. In this case, multiple SRS resource sets for non-codebook usage may be configured. A configuration (and/or mapping) of a panel ID for an SRS resource set may be performed through higher layer signaling (e.g., RRC signaling).

If a panel ID is not configured for an SRS resource set(s) for non-codebook usage, a panel to be applied to the corresponding SRS resource set may be determined based on a UE implementation. A panel ID may be indicated by DCI (i.e., an UL grant) for scheduling for PUSCH transmission. That is, information on the corresponding panel ID may be included in the DCI. Furthermore, if a panel ID indicated by the DCI is also configured for an SRS resource set for BM usage, a UE needs to transmit a scheduled PUSCH by using the same panel indicated by the panel ID. Accordingly, uplink simultaneous transmission based on a non-codebook from multiple panels may be configured, indicated and/or scheduled.

Furthermore, a panel ID may be associated (or configured or mapped) in an SRS resource level within an SRS resource set. For example, a panel ID may be configured for each SRS resource within an SRS resource set configured for non-codebook usage. The panel ID may be indicated by DCI (i.e., an UL grant) for PUSCH scheduling. Furthermore, if a panel ID indicated by the DCI is also configured for an SRS resource set for BM usage, a UE needs to transmit a scheduled PUSCH by using the same panel indicated by the panel ID. Furthermore, although a panel ID is configured for each SRS resource, the aforementioned TPMI restriction operation may be applied. Accordingly, uplink simultaneous transmission based on a non-codebook from multiple panels may be configured, indicated and/or scheduled.

Method 4)

Next, a case where identification information (hereinafter panel ID) indicating a panel is configured for each SRS resource set configured for antenna switching usage is described. In this case, multiple SRS resource sets for antenna switching usage may be configured. A configuration (and/or mapping) of a panel ID for the SRS resource set may be performed through higher layer signaling (e.g., RRC signaling).

If a panel ID is not configured for an SRS resource set(s) for antenna switching usage, a panel to be applied to the corresponding SRS resource set may be determined based on a UE implementation. For example, if a panel ID has not been configured for some (e.g., a subset) of SRS resource sets configured for antenna switching usage with respect to a UE, the UE may apply (or map) a panel to an SRS resource set for which the panel ID has not been configured depending on a UE implementation, and may perform SRS transmission through the corresponding panel. Alternatively, a specific rule on which a UE is configured to perform SRS transmission by mapping panels to an SRS resource set from a panel not allocated to the SRS resource set may be defined (or configured).

A UE may perform SRS transmission on an SRS resource set(s) for which a panel ID has been (explicitly) configured by using a corresponding panel ID. In contrast, a corresponding UE may be defined (and/or configured or indicated) to perform SRS transmission on an SRS resource set(s) for which a panel ID has not been configured by first mapping a panel ID among panel IDs other than a configured panel ID(s). Accordingly, there is an effect in that an SRS antenna switching and/or SRS panel switching operation of a panel unit can be performed. A base station may obtain state information of a DL channel based on the SRS antenna switching and/or SRS panel switching operation. For example, the UE may sequentially (or intersectionally) perform mapping between an SRS resource set and a panel ID from a non-configured (and/or non-allocated) panel ID. If all panel IDs supported by a corresponding UE has been mapped at least once, an operation of redundantly mapping an already mapped panel ID to an SRS resource set may be defined (and/or configured or indicated). There is a technical effect in that a UE can equally perform uplink transmission using a different panel(s) because a panel ID is equally allocated (or mapped).

In the aforementioned method, an antenna switching-related operation applied to one SRS resource set configured for antenna switching usage has been a prerequisite. That is, an antenna switching operation (e.g., 1 transmission (T)/2 reception (R), 1T/4R, 2T/4R) aimed at multiple SRS resources within one SRS resource set may be an operation in which a basic unit is based on one panel (e.g., UTE). When such a method is extended to multiple panels, the proposal method described in the present disclosure may be applied based on multiple SRS resource sets because multiple panel IDs are assigned.

For example, in relation to an antenna switching operation, in particular, in the case of a 1T/4R configuration and if numerology-related subcarrier spacing is large (e.g., 120 kHz), up to two guard symbols need to be configured. For this reason, there may be a case where all SRS resources for 1T/4R usage cannot be allocated within one slot. In order to prevent such a case, a case where two SRS resource sets need to be configured may occur. In the latter case, from a proposal operation viewpoint based on one SRS resource set (for antenna switching usage) corresponding to one panel, this may be treated as an exceptional case where corresponding two SRS resource sets are mapped to one panel. In this case, the two SRS resource sets may be for covering large subcarrier spacing and a large guard period (e.g., two symbols) from an antenna switching viewpoint.

The two SRS resource sets may be denoted as an SRS resource set group. For example, one panel ID may be configured for each SRS resource set group for antenna switching. Multiple SRS resource set groups may be configured. In this case, each of the SRS resource set groups may include one or more SRS resource sets. In this case, in the case of 1T/4R configured as large subcarrier spacing and/or a large guard period, the number of SRS resource sets constituting an SRS resource set group is set to 2. If not, the number of SRS resource sets constituting an SRS resource set group may be set to 1.

Furthermore, in at least one of Methods 1 to 4, a panel ID may be explicitly indicated through specific DCI or may be implicitly indicated (using higher layer signaling information, etc.) based on some information included in DCI.

First, methods of explicitly indicating a panel indicator related to uplink transmission are described.

For example, a specific field is defined separately from (or independently of an SRS resource indicator (SRI) field which may be present in DCI related to uplink transmission (hereinafter UL DCI). A panel ID may be configured and/or indicated using a corresponding specific field. For example, the specific field may be denoted as a panel-related field, a UTE field, etc., and may be used to indicate one or more panel IDs.

As a detailed example, if the specific field consists of two bits, the specific field may be configured and/or defined so that a "00" value (or state) indicates (or represents) a first panel (UTE #1), a "01" value indicates a second panel (UTE #2), a "10" value indicates the first panel and the second panel, and a "11" value indicates a third panel (UTE #3). Like the "10" value, a field value (or state) indicating multiple panel IDs may be present. A base station, etc. may configure and/or indicate the definition of such values (or states) through higher layer signaling (e.g., RRC signaling and/or MAC-CE signaling). Furthermore, if a value of a maximum number of panel IDs supported by a corresponding UE is reported in the form of UE capability information, codepoints of the specific field may be configured and/or generated in a specific combinatorial form based on corresponding reporting. For example, if a maximum number of panels supportable by a UE is X, the codepoints may be configured and/or defined so that a "00" value (or state) indicates a first panel (UTE #1), a "01" value indicates a second panel (UTE #2), . . . , a "11" value indicates an X-th panel (UTE #X). Even in this case, a field value (or state) indicating multiple panel IDs may be present.

As in the aforementioned example, if a separate field (e.g., a panel-related field or a UTE field) for indicating a panel ID is configured and/or indicated, a specific panel (e.g., UTE) of a UE may be indicated through the corresponding field. And/or a beam for PUSCH transmission usage may be indicated through an SRI field (or a UL-transmit configuration index (TCI) field), etc. along with the separate field. The corresponding beam may indicate a corresponding beam within the specific panel. For example, if a PUSCH transmission beam is indicated by an SRI field along with the aforementioned panel indication, a corresponding PUSCH transmission beam may be indicated in an SRS resource level or an UL-TCI state level indicating a specific reference signal (e.g., an uplink reference signal or a downlink reference signal). In this case, the corresponding PUSCH transmission beam may be indicated by (along with) an SRS resource(s) and/or an UL-TCI state(s) within a indicated panel.

Furthermore, the example has been described based on a case where the separate field consists of two bits, but the method may also be extended and applied to a case where a corresponding field consists of multiple bits.

For another example, a new field may be configured in an extension form in which an SRI field, etc. which may be present in DCI related to uplink transmission (hereinafter UL DCI) is interpreted again and deformed. The corresponding field maintains its name as an SRI field, but may be denoted as a new name (e.g., an UL TCI field). One or more panel IDs are indicated using the corresponding field, and simultaneously, a transmission beam(s) for (or associated) PUSCH transmission usage may be (together) indicated within a corresponding panel(s). For such panel indication and beam indication, the field may be defined, configured and/or indicated.

As a detailed example, if the field (i.e., a modified or re-interpreted SRI field or an UL TCI field) consists of 3 bits, the field may be configured and/or defined so that a "000" value (or state) indicates {first panel, third SRI}, a "001" value indicates {first panel, fifth SRI}, a "010" value indicates {first panel, fourth SRI}, a "011" value indicates {second panel, sixth SRI}, a "100" value indicates {first panel, third SRI} and {second panel, fourth SRI}, a "101" value indicates {first panel, fifth SRI} and {second panel, sixth SRI}, a "110" value indicates {first panel, second CSI-RS resource indicator (CRI)}, and a "111" value indicates {second panel, eighth synchronization signal block resource indicator (SSBRI)}. In this case, in the case of the "110" and "111" values, the UL TCI field, etc. may have been considered. A base station, etc. may configure and/or indicate the definition of such values (or states) through higher layer signaling (e.g., RRC signaling and/or MAC-CE signaling). Even in this case, a field value (or state) indicating multiple panel IDs may also be present.

Furthermore, if a value of a maximum number of panel IDs supported by a corresponding UE is reported in the form of UE capability information, codepoints of the specific field may be configured and/or generated in a specific combinatorial form based on the corresponding reporting. And/or if the number of SRS resources configured so that a transmission beam(s) for PUSCH usage is indicated like an SRI field, etc. is J, codepoints having a combination form may be configured and/or generated by being (additionally) interlocked with the J (e.g., J=2) value. Even in this case, a field value (or state) indicating multiple panel IDs may also be present. For example, if a maximum number of panels supportable by a UE is X, the field value (or state) may be configured and/or defined so that an "xx000" value (or state) indicates {first panel, first SRI}, an "xx001" value indicates {first panel, second SRI}, an "xx010" value indicates {second panel, first SRI}, . . . , an "xxxxx" value indicates an {(X−1)-th panel, first SRI}, an "xxxxx" value indicates an {(X−1)-th panel, second SRI}, an "xxxxx" value indicates an {X-th panel, first SRI}, and an "xxxxx" value indicates {X-th panel, the second SRI}.

As in the aforementioned example, if a field (e.g., a panel-related field, a UTE field, or an UL-TCI field) for indicating a panel ID is configured and/or indicated, a specific panel (e.g., UTE) of a UE may be indicated through the corresponding field. And/or a beam for PUSCH transmission usage may be indicated along with the field. The corresponding beam may indicate a corresponding beam within the specific panel. For example, if a PUSCH transmission beam is indicated along with the aforementioned panel indication, the corresponding PUSCH transmission beam may be indicated in an SRS resource level or an UL-TCI state level indicating a specific reference signal (e.g., an uplink reference signal, a downlink reference signal). In this case, the corresponding PUSCH transmission beam may be indicated by (along with) an SRS resource(s) and/or an UL-TCI state(s) within the indicated panel.

Furthermore, some of the examples have been described based on a case where the field consists of 3 bits, but the method may be extended and applied to a case where the corresponding field consists of multiple bits.

Next, a method of implicitly indicating a panel indicator related to uplink transmission is described. As described above, unlike a method of indicating a panel by using a method of a separate field or integrated field, a method of enabling a panel ID associated with uplink transmission to be recognized based on implicit indication may also be considered.

For example, upon scheduling of a PUSCH, a specific field (e.g., an SRI field or an UL-TCI field) may be indicated, and an SRS resource(s) to be applied to a beam determination for PUSCH transmission may be determined, configured and/or indicated. In this case, an operation of enabling a UE to interpret that a panel ID associated (or configured or indicated) with higher information including a corresponding SRS resource(s) has been implicitly indicated and uses (or applies) a panel according to the corresponding panel ID for PUSCH transmission may be defined (or configured or indicated). For example, the higher information may be an SRS resource set including one or more SRS resources.

And/or for example, in the case of a target SRS resource, a panel ID(s) (e.g., a UTE ID) may be additionally configured in spatial-related information (e.g., higher layer parameter spatialRelationInfo). For example, if a panel ID is configured as an index (e.g., ssb-Index) of a synchronization signal block (SSB) within spatial-related information, a UE may perform uplink transmission based on a target SRS resource by using the same as a spatial domain transmission filter (or beam) used to receive a reference SS/PBCH block indicated by the index of the SSB in a panel indicated by the corresponding panel ID. For example, if a panel ID is configured an index (e.g., csi-RS-Index) of a CSI-RS within spatial-related information, a UE may perform uplink transmission based on a target SRS resource by using the same as a spatial domain transmission filter (or beam) used to receive a reference CSI-RS indicated by the index of the CSI-RS in a panel indicated by the corresponding panel ID. For example, if a panel ID is configured an index of an SRS resource within spatial-related information, a UE may perform uplink transmission based on a target SRS resource by using the same as a spatial domain transmission filter (or beam) used to transmit a reference SRS indicated by the index of the SRS resource in a panel indicated by the corresponding panel ID.

Through the aforementioned proposal method, reference beam indication corresponding to each target SRS resource may be performed using reference RSs transmitted and received through a specific panel based on spatial-related information (e.g., spatial relation info) to which a panel ID may be additionally assigned (or configured). Accordingly, a panel- and/or beam-specific beam indication operation may be applied. There is an advantage in that a base station can control reference beam indication for each specific panel (e.g., UTE) of a UE through the corresponding operation. For example, if an indicated reference RS is a CSI-RS and/or SSB, a UE may receive indication for a reference beam to be applied to the uplink through a target SRS resource by using a specific panel ID (e.g., UTE ID) indicated together. In this case, the uplink through the target SRS resource may be performed through a transmission beam (Tx beam) corresponding to a reception beam (Rx beam) applied to the reception of a corresponding DL RS (e.g., a CSI-RS and/or an SSB). Alternatively, for example, if an indicated reference RS is an SRS, a UE may receive indication for a reference beam to be applied to the uplink through a target SRS resource by using a specific panel ID (e.g., UTE ID) indicated together. In this case, the uplink through the target SRS resource may be performed using a transmission beam applied to the transmission of the corresponding SRS.

In the aforementioned methods, the "operation based on a configuration of a panel ID for each SRS resource set for specific usage" may be a configuration/indication operation indicating that a UE should perform actual transmission through a corresponding interlocked panel (e.g., UTE) when performing uplink transmission through SRS resources within a corresponding SRS resource set. In contrast, an operation of configuring and/or indicating a panel ID associated with the aforementioned spatial-related information (e.g., spatialRelationInfo configuration parameter) may be an operation of configuring and/or indicating that a UE should obtain information on a reference beam from reference RSs transmitted and received using a corresponding interlocked panel when obtaining information related to a reference beam and apply the obtained information to determine a transmission beam of a target SRS resource as spatial relation beam indication information. That is, a mechanism by which a panel ID(s) (e.g., UTE ID(s)) is interlocked (and/or configured) for different purposes "transmission panel indication" and "panel indication to be applied when information on a reference beam is obtained" may be configured and/or indicated. Accordingly, there are effects in that the flexibility of a configuration related to a UE panel and beam indication can be increased, uplink (UL) transmission performance can be improved, and unintended uplink interference can be reduced.

Furthermore, the aforementioned proposal method based on the spatial-related information (e.g., higher layer parameter spatialRelationInfo) may also be extended and applied to an uplink data channel (e.g., PUSCH) and an uplink control channel (e.g., PUCCH). That is, a specific panel ID (e.g., UTE ID) may be configured (and/or interlocked or associated) with respect to spatial-related information (e.g., PUCCH-SpatialRelationInfo) for the transmission of a PUCCH. Table 9 illustrates an example of the aforementioned spatial-related information for the transmission of a PUCCH.

TABLE 9

PUCCH-SpatialRelationInfo information element

ASN1START
TAG-PUCCH-SPATIALRELATIONINFO-START
PUCCH-SpatialRelationInfo ::= SEQUENCE {
pucch-SpatialRelationInfoId PUCCH-SpatialRelationInfoId,
servingCellId ServCellIndex OPTIONAL, -- Need S
referenceSignal CHOICE {
ssb-Index SSB-Index,
csi-RS-Index NZP-CSI-RS-ResourceId,
srs SEQUENCE {
resource SRS-ResourceId,
uplinkBWP BWP-Id
}
},
pucch-PathlossReferenceRS-Id PUCCH-PathlossReferenceRS-Id,
p0-PUCCH-Id PO-PUCCH-Id,
closedLoopIndex ENUMERATED { i0, i1 }
}
PUCCH-SpatialRelationInfoId ::= INTEGER
(1..maxNrofSpatialRelationInfos)

Referring to Table 9, similar to the spatial-related information for SRS usage, a parameter of spatial-related information for the transmission of a PUCCH may be configured as any one of {ssb-Index, csi-RS-Index, srs}.

If the aforementioned proposal methods are extended with respect to a PUCCH, the following may be obtained.

For example, in the case of a target PUCCH resource, a panel ID(s) (e.g., UTE ID) may be additionally configured in spatial-related information (e.g., higher layer parameter PUCCH-SpatialRelationInfo). For example, if a panel ID is configured as an index (e.g., ssb-Index) of a synchronization signal block (SSB) within spatial-related information, a UE may perform uplink transmission based on a target PUCCH resource by using the same as a spatial domain transmission filter (or beam) used to receive a reference SS/PBCH block indicated by the index of the SSB in a panel indicated by the corresponding panel ID. For example, if a panel ID is configured as an index of a CSI-RS (e.g., csi-RS-Index) within spatial-related information, a UE may perform uplink transmission based on a target PUCCH resource by using the same as a spatial domain transmission filter (or beam) used to receive a reference CSI-RS indicated by the index of the CSI-RS in a panel indicated by the corresponding panel ID. For example, if a panel ID is configured as an index of an SRS resource within spatial-related information, a UE may perform uplink transmission based on a target PUCCH resource by using the same as a spatial domain transmission filter (or beam) used to transmit a reference SRS indicated by the index of the SRS resource in a panel indicated by the corresponding panel ID.

And/or signaling that configures a panel ID(s) (e.g., UTE ID(s)) may be configured for each individual PUCCH resource as described above, but may be configured for each specific PUCCH resource group unit (e.g., for each PUCCH resource set, all PUCCH resources configured in a specific BWP, or all PUCCH resources configured in a specific CC). That is, there is an advantage in that signaling overhead can be reduced by configuring and/or signaling a panel (e.g., UTE) in a form in which the panel is applied to multiple PUCCH resources in common. In particular, in the case of a specific type of PUCCH transmission (e.g., PUCCH transmission for (dynamic) HARQ ACK/NACK transmission usage), an exception (or separate) configuration operation for whether to perform corresponding transmission through which panel may also be defined. For example, in the case of a PUCCH for (dynamic) HARQ ACK/NACK transmission usage, an operation of enabling a UE to perform corresponding PUCCH transmission through a panel used to receive downlink data that has generated ACK/NACK may be separately (or independently) applied. Accordingly, there is an effect in that a downlink reception panel is applied to an uplink ACK/NACK transmission panel without any change.

Furthermore, in the aforementioned proposal methods, it may be seen that a method of applying a specific panel (e.g., UTE to downlink reception is based on the assumption that a corresponding panel is implicitly a panel which may be used for both uplink transmission and downlink reception. For example, a UE having a panel capable of performing transmission and reception simultaneously (or together) may perform the aforementioned proposal methods. In contrast, if a specific panel has been implemented for only downlink reception or only uplink transmission, a downlink reception entity (DRE) (and/or DRE ID) may need to be defined or configured in the aforementioned proposal methods. In this case, a spatial domain transmission filter (or beam) to be applied to uplink transmission may be the same as a spatial domain transmission filter used to receive a reference RS in a DRE indicated by a DRE ID. Accordingly, there is an effect in that an entity capable of reception can be configured and/or indicated for each downlink reception panel (e.g., DRE).

And/or for example, a linkage (or association relation) configuration between a DRE ID and a UTE ID may be separately provided. In the aforementioned proposal methods, a linkage configuration may also be applied. In the case of a UE capable of performing both transmission and reception using the same (physical) panel, the linkage configuration may mean the same panel.

And/or if specific "linkage between a UTE ID and a DRE ID" that is not precisely calibrated is configured (or indicated or applied), this corresponds to a case where the same transmission and reception panel is not used like a non-beam correspondence UE. In this case, there is an effect in that transmission and reception form a pair and can be controlled, configured or indicated. For example, a transmission panel(s) and a reception panel(s) are separated and implemented, but a specific reception panel closest to a specific transmission panel or having high correlation is interlocked in the above form, etc. Accordingly, an operation, such as that a specific downlink RS received through a corresponding interlocked reception panel is received, a reference beam is derived, and the derived reference beam is applied upon uplink transmission based on a corresponding interlocked transmission panel, may be applied. In contrast, when a base station determines a corresponding downlink beam based on specific uplink transmission (e.g., SRS) based on a corresponding interlocked transmission panel, a panel of a UE that receives the corresponding downlink beam may be indicated as an interlocked specific reception panel (e.g., a DRE ID).

And/or in order to support the aforementioned operation(s), a method of reporting, by a UE, a value measured using a reception panel (e.g., DRE ID) upon specific CSI reporting and/or beam reporting may be applied. In this case, an operation of transmitting an uplink channel, reported by the UE, through a corresponding transmission panel (e.g., a UTE ID) interlocked with the reception panel through the aforementioned linkage configuration (or interlocking relation) may be defined, configured and/or indicated.

UE capability information related to the aforementioned proposal method(s) may be configured and defined. Signaling for transmitting the UE capability information may be configured along with the aforementioned proposal method(s). For example, the UE capability information may include information on whether a transmission and reception panel(s) capable of performing both transmission and reception operation by using a single panel have been implemented in a UE, information on whether a UE is a UE in which a transmission panel and a reception panel are separated and/or information (e.g., number) related to a transmission panel and/or a reception panel, that is, candidates capable of being configured as a pair, etc.

For example, a UE may report the UE capability information to a base station. The UE may receive, from the base station, configuration and/or scheduling information for an uplink transmission-related operation based on at least one of the aforementioned proposal methods. In this case, the corresponding configuration and/or scheduling information may include information on a UE transmission and reception panel and/or a beam-related configuration, a panel ID (e.g., a UTE ID(s) or a DRE ID(s)). The UE may perform uplink transmission using a specific panel and/or beam based on the corresponding configuration and/or scheduling information. Likewise, the base station may receive the UE capability information from the UE. The base station may transmit, to the UE, configuration and/or scheduling information for an uplink transmission-related operation based on at least one of the aforementioned proposal methods. In this case, the corresponding configuration and/or scheduling information may include information on the UE transmission and reception panel and/or beam-related configuration, panel ID (e.g., a UTE ID(s) or a DRE ID(s)). The base station may receive an uplink channel and/or signal transmitted using a specific panel and/or beam based on the corresponding configuration and/or scheduling information.

FIG. 20 illustrates an example of an operating flowchart of a UE which transmits a physical uplink shared channel (PUSCH) in a wireless communication system to which a method proposed in the present disclosure may be applied. FIG. 20 is merely for convenience of description and does not limit the scope of the present disclosure.

Referring to FIG. 20, as in the aforementioned embodiment, a case where the transmission and reception of uplink data channels based on multiple panels between a UE and a base station are performed is assumed. In FIG. 13, a step(s) of transmitting and receiving SRSs for the transmission and reception of uplink data channels between the UE and the base station may be additionally performed. A transmission unit (e.g., a panel or a UTE) and a beam (or a spatial domain transmission filter) to be applied to the transmission and reception of uplink data channels based on corresponding transmitted and received SRSs may be configured and/or applied.

The UE may receive configuration information related to a PUSCH (S2005). The configuration information may be received through higher layer signaling (e.g., RRC signaling). For example, the configuration information may include one or more configurations (e.g., UL TCI states) including at least one of a transmission unit (e.g., the aforementioned panel, an SRS resource set configured for BM usage) or beam (e.g., an SRS resource configured for BM usage) related to the transmission of an uplink data channel.

For example, the operation of receiving, by the UE (e.g., 2210 and/or 2220 in FIGS. 22 to 26), the configuration information in step S2005 may be implemented by the apparatuses of FIGS. 22 to 26 to be described hereinafter. For example, referring to FIG. 22, the one or more processors 102 may control the one or more transceivers 106 and/or the one or more memories 104, etc. to receive the configuration information. The one or more transceivers 106 may receive the configuration information.

The UE may receive downlink control information (e.g., the aforementioned DCI, DCI format 0_1) that schedules the transmission of a PUSCH (S2010). For example, as described above, the downlink control information may include information representing the SRS resource associated with a beam (e.g., an SRI field). Furthermore, the transmission unit may be determined based on transmission unit identification information configured in an SRS resource set including the SRS resource. Furthermore, the beam may be determined based on spatial-related information configured in the SRS resource. For example, the spatial-related information may include information representing i) an SRS resource, ii) a channel state information-reference signal (CSI-RS), or iii) a synchronization signal block (SSB). In this case, the transmission unit for the transmission of the PUSCH may be determined based on a transmission unit used to transmit and receive i) SRS resources, ii) CSI-RSs, or iii) SSBs.

Furthermore, the corresponding UE may transmit, to the base station, information on whether correspondence is established between its uplink transmission unit and downlink transmission unit. In this case, the transmission unit for the transmission of the PUSCH based on the information may be determined.

Furthermore, the corresponding UE may receive configuration information related to SRS transmission for the transmission of the PUSCH through higher layer signaling, and may transmit one or more SRSs to the base station based on the configuration information. In this case, an SRS resource related to the transmission of the PUSCH may be a resource in which any one of one or more SRSs has been transmitted.

For example, the operation of receiving, by the UE (e.g., 2210 and/or 2220 in FIGS. 22 to 26), the control information in step S2010 may be implemented by the apparatuses of FIGS. 22 to 26 to be described hereinafter. For example, referring to FIG. 22, the one or more processors 102 may control the one or more transceivers 106 and/or the one or more memories 104, etc., to receive the control information. The one or more transceivers 106 may receive the control information.

The UE may transmit the PUSCH based on the downlink control information (through a specific transmission unit and beam) (S2015).

For example, the operation of transmitting, by the UE (e.g., 2210 and/or 2220 in FIGS. 22 to 26), the PUSCH in step S2015 may be implemented by the apparatuses of FIGS. 22 to 26 to be described hereinafter. For example, referring to FIG. 22, the one or more processors 102 may control the one or more transceivers 106 and/or the one or more memories 104, etc., to transmit the PUSCH. The one or more transceivers 106 may transmit the PUSCH.

FIG. 21 illustrates an example of an operating flowchart of a base station which receives a physical uplink shared channel (PUSCH) in a wireless communication system to which a method proposed in the present disclosure may be applied. FIG. 21 is merely for convenience of description and does not limit the scope of the present disclosure.

Referring to FIG. 21, as in the aforementioned embodiment, a case where the transmission and reception of uplink data channels based on multiple panels are performed between a UE and a base station is assumed. In FIG. 13, a step(s) of transmitting and receiving SRSs for the transmission and reception of uplink data channels between the UE and the base station may be additionally performed. A transmission unit (e.g., a panel or a UTE) and a beam (or a spatial domain transmission filter) to be applied to the transmission and reception of uplink data channels based on corresponding transmitted and received SRSs may be configured and/or applied.

The base station may transmit configuration information related to a PUSCH (S2105). The configuration information may be received through higher layer signaling (e.g., RRC signaling). For example, the configuration information may include one or more configurations (e.g., UL TCI states) including at least one of a transmission unit (e.g., the aforementioned panel, an SRS resource configured for BM usage set) or a beam (e.g., an SRS resource configured for BM usage) related to the transmission of an uplink data channel.

For example, the operation of transmitting, by the base station (e.g., 2210 and/or 2220 in FIGS. 22 to 26), the configuration information in step S2105 may be implemented by the apparatuses of FIGS. 22 to 26 to be described hereinafter. For example, referring to FIG. 22, the one or more processors 102 may control the one or more transceivers 106 and/or the one or more memories 104, etc., to transmit the configuration information. The one or more transceivers 106 may transmit the configuration information.

The base station may transmit downlink control information (e.g., the aforementioned DCI, DCI format 0_1) that schedules the transmission of the PUSCH (S2110). For example, as described above, the downlink control information may include information (e.g., an SRI field) indicating an SRS resource associated with the beam. Furthermore, the transmission unit may be determined based on transmission unit identification information configured in an SRS resource set including the SRS resource. Furthermore, the beam may be determined based on spatial-related information configured in the SRS resource. For example, the spatial-related information may include information representing i) an SRS resource, ii) a channel state information-reference signal (CSI-RS), or iii) a synchronization signal block (SSB). In this case, the transmission unit for the transmission of the PUSCH may be determined based on a transmission unit used to transmit and receive i) SRS resources, ii) CSI-RSs, or iii) SSBs.

Furthermore, the corresponding base station may receive, from the UE, information on whether correspondence is established between the uplink transmission unit and downlink transmission unit of the UE. In this case, the transmission unit for the transmission of the PUSCH may be determined based on the information.

Furthermore, the corresponding base station may transmit configuration information related to SRS transmission for the transmission of the PUSCH through higher layer signaling, and may receive, from the UJE, one or more SRSs transmitted based on the configuration information. In this case, the SRS resource related to the transmission of the PUSCH may be a resource in which any one of the one or more SRSs have been transmitted.

For example, the operation of transmitting, by the base station (e.g., 2210 and/or 2220 in FIGS. 22 to 26), the control information in step S2110 may be implemented by the apparatuses of FIGS. 22 to 26 to be described hereinafter. For example, referring to FIG. 22, the one or more processors 102 may control the one or more transceivers 106 and/or the one or more memories 104, etc., to transmit the control information. The one or more transceivers 106 may transmit the control information.

The base station may receive the PUSCH transmitted based on the downlink control information (through a specific transmission unit and beam) (S2115).

For example, the operation of receiving, by the base station (e.g., 2210 and/or 2220 in FIGS. 22 to 26), the PUSCH in step S2115 may be implemented by the apparatuses of FIGS. 22 to 26 to be described hereinafter. For example, referring to FIG. 22, the one or more processors 102 may control the one or more transceivers 106 and/or the one or more memories 104, etc., to receive the PUSCH. The one or more transceivers 106 may receive the PUSCH.

Fifth Embodiment: Panel and/or a Beam Configuration Method in which Panel Switching is Considered In the application of the method(s) proposed in the aforementioned embodiments, some operations related to panel switching may be defined or considered. In the present embodiment, a method(s) of limiting or restricting an operation of a UE in relation to the panel switching is described. The method(s) described in the present embodiment may be applied to the method(s) of the first embodiment and/or the second embodiment.

In relation to multi-panel transmission, UE category information may be defined in order for a UE to report its capability information related to multi-panel transmission. For example, three types of multi-panel UE (MPUE) categories may be defined. The MPUE categories may be divided depending on whether multiple panels may be activated and/or whether transmission using multiple panels is possible. In the case of a first MPUE category (MPUE category 1), in a UE in which multiple panels have been implemented, only one panel may be activated at a time, and the latency of panel switching and/or activation may be set as [X] ms. For example, the latency may be set to be longer than the latency of beam switching/activation, and may be set in a symbol unit or slot unit. In the case of a second MPUE category (MPUE category 2), in a UE in which multiple panels have been implemented, multiple panels may be activated at a time, and one or more panels may be used for transmission. That is, in the second MPUE category, simultaneous transmission using panels may be possible. In the case of a third MPUE category (MPUE category 3), in a UE in which multiple panels have been implemented, multiple panels may be activated at a time, but only one panel may be used for transmission.

Hereinafter, in relation to uplink beam management (UL BM), operations of a UE and/or a base station considering panel switching are described.

For example, in the case of the first MPUE category such as that in the example, a UE needs to identify one active panel. The UE may transmit a single configurable SRS resource set configured for BM usage through one specific active panel among multiple panels implemented in the corresponding UE. If multiple SRS resource sets are configured for the corresponding UE, approximately 2 ms to 3 ms may be necessary for the UE to switch a panel to be used for transmission.

In this case, in the case of a single SRS resource set configured for BM usage in the first MPUE category, a method (hereinafter Option 1) of indicating, by a base station, a UE transmission panel to be used for each SRS transmission may be considered. In the case of Option 1, a panel ID, etc. may be used for the corresponding indication. And/or a method (hereinafter Option 2) of not indicating, by a base station, a UE transmission panel to be used for each SRS transmission may be considered. In the case of Option 2, a UE may determine a transmission panel to be used for each SRS transmission. The selection of a panel on the UE side may not be related to the base station. And/or a method (hereinafter Option 3) of reporting, by a UE, information on a UE transmission panel to be used for each SRS transmission to a base station may be considered. In Option 3, a case where panel indication by a base station is not performed may be a prerequisite. And/or a method (hereinafter Option 4) of not reporting, by a UE, information on a UE transmission panel to be used for each SRS transmission to a base station may be considered.

Among Options 1 to 4, if both Options 1 and 3 are supported, the smoothest panel indication and identification between a base station and a UE may be supported. For example, in the case of a single SRS resource set configured for BM usage in the first MPUE category, a base station may indicate a UE transmission panel to be used for each SRS transmission. A UE may report, to the base station, information on a UE transmission panel to be used for each SRS transmission. In this case, an operation of reporting, by the UE, the information may mean an operation of autonomously determining and/or reporting, by the UE, panel switching.

In this case, the UE may be configured to basically perform uplink transmission (e.g., SRS transmission) based on the UE transmission panel according to the corresponding indication when receiving the indication from the base station. Specifically, the indication may be performed through signaling in the form of higher layer signaling (e.g., RRC signaling, MAC-CE signaling) and/or lower layer signaling (e.g., DCI). Restriction by which an operation of reporting, by a UE, information on a UE transmission panel to be used for each SRS transmission is not performed within a given time interval (e.g., X symbol or X ms) from indication timing may be configured or defined. Furthermore, timing (or interval) during which the reporting of the UE is possible after the given time interval may be defined, configured and/or indicated.

Furthermore, among Options 1 to 4, an operation of supporting both Options 1 and 4 may be efficient. For example, in the case of a single SRS resource set configured for BM usage in the first MPUE category, a base station may indicate a UE transmission panel to be used for each SRS transmission. A UE may be configured to not report, to the base station, information on a UE transmission panel to be used for each SRS transmission. In this case, an operation of reporting, by the UE, the information may mean an operation of autonomously determining and/or reporting, by the UE, panel switching.

In this case, the UE may be configured to basically perform uplink transmission (e.g., SRS transmission) based on the UE transmission panel according to the indication when receiving the corresponding indication from the base station. Specifically, the indication may be performed through signaling in the form of higher layer signaling (e.g., RRC signaling or MAC-CE signaling) and/or lower layer signaling (e.g., DCI). Restriction by which an operation of reporting, by a UE, information on a UE transmission panel to be used for each SRS transmission is not performed within a given time interval (e.g., X symbol or X ms) from indication timing may be configured or defined. Furthermore, timing (or interval) during which the reporting of the UE is possible after the given time interval may be defined, configured and/or indicated.

Furthermore, a combination of other options except the aforementioned combinations may be possible. Furthermore, if an SRS resource set(s) for BM usage is configured in the second MPUE category, an ID for a panel (i.e., a panel ID) may be configured for each SRS resource set and/or each SRS resource.

Operations of a UE and/or a base station are described in relation to panel switching in the case of PUSCH transmission based on the selection of a single panel.

For example, in the case of PUSCH transmission based on a codebook (CB) or a non-codebook (NCB) for the first MPUE category, a base station may indicate a specific UE transmission panel for PUSCH transmission along with a required offset for panel switching. Alternatively, in this case, the base station may be configured to not support the corresponding indication.

In this case, as an addition (or association) operation for a case where the base station is configured to not support corresponding indication, a method of implicitly indicating, by the base station, the selection of a specific UE transmission panel for specific uplink transmission (e.g., PUSCH transmission) (in a UE of the first MPUE category series) may be possible. For example, a specific downlink RS(s) and/or channel(s) for PUSCH beam indication may be indicated by signaling (e.g., an SRI field within UL DCI or an UL-TCI field within DCI) which may indicate a beam upon PUSCH scheduling. In this case, upon previous specific downlink (beam) reporting related to a corresponding indicated specific downlink RS(s) and/or channel(s) (e.g., a CRI(s) or an SSBRI(s)), there may be information on downlink reporting measured by which reception panel, such as a specific UE (reception) channel indicator. In this case, an operation of performing, by the UE, PUSCH transmission based on a UE (transmission) panel corresponding to a UE (reception) panel in which the UE has applied, to the measurement, a specific downlink RS(s) and/or channel(s) indicated upon PUSCH scheduling through the operation while operating in conjunction with the corresponding information may be defined, configured and/or indicated. In this case, the operation may be defined, configured and/or indicated in conjunction with results reported through downlink reporting, etc. within the specific time interval. And/or an operation of performing uplink transmission (e.g., PUSCH transmission) at timing delayed by a corresponding required offset in association with a required offset value for panel sweeping may be defined, configured and/or indicated.

In the aforementioned (implicit) interlocking method, although a specific downlink (beam) reporting-related operation is not essentially performed, an operation of applying implicit panel indication from a panel-association viewpoint may be defined, configured and/or indicated. That is, if a UE has applied a corresponding "preferred" panel based on a specific measurement operation even in a situation in which specific downlink (beam) reporting has been omitted (or dropped or deprioritized) for a reason, such as a specific condition, a method of performing, by the corresponding UE, uplink transmission using a selected panel by applying the operation as an implicit panel selection/indication operation in subsequent specific uplink transmission (e.g., a PUSCH, a PUCCH, or an SRS) may be defined, configured and/or indicated.

Operations of a UE and/or a base station are described in relation to panel switching in the case of PUCCH transmission based on the selection of a single panel.

For example, in the case of PUCCH transmission based on single panel selection for both the first MPUE category and the second MPUE category, the ID of a panel (i.e., panel ID) may be configured for a reference RS(s) configured in PUCCH-spatialRelationInfo. That is, the panel ID may be configured in a form associated with an individually configured reference RS(s). Alternatively, in the case of PUCCH transmission based on single panel selection for both the first MPUE category and the second MPUE category, an ID for a panel (i.e., panel ID) may be directly configured fora PUCCH resource(s). That is, a panel ID may be configured and/or indicated for each PUCCH resource, for each specific PUCCH resource group, for each specific PUCCH resource set, or in all PUCCH resources belonging to a specific BWP (and/or a serving cell). Through such methods, the flexibility of a configuration can be increased.

Furthermore, in order to reduce overhead for the update of a PUCCH spatial relation, methods of simultaneously updating spatial relation information with respect to all PUCCH resources or updating spatial relation information for each PUCCH resource set may be considered. That is, a method of simultaneously updating spatial relation-related information for each PUCCH resource set or with respect to all PUCCH resources belonging to a specific BWP (and/or a serving cell) may be defined, configured and/or indicated.

Furthermore, the UE and/or the base station operating based on the aforementioned methods and embodiments and the steps of FIGS. 18 to 21 may be specifically implemented by the apparatuses of FIGS. 22 to 26 to be described later. For example, the base station may correspond to a first wireless apparatus, and the UE may correspond to a second wireless apparatus, and an opposite case thereof may be considered according to circumstances.

For example, the aforementioned base station/UE signaling and operations (e.g., FIGS. 18 to 21) may be processed by the one or more processors (e.g., 102, 202) of FIGS. 22 to 26. The aforementioned base station/UE signaling and operations (e.g., FIGS. 18 to 21) may be stored in the one or more memories (e.g., 104, 204) of the memory (e.g., FIGS. 22 to 26) in the form of instructions/program (e.g., instruction, executable code) for driving at least one processor (e.g., 102, 202) of FIGS. 22 to 26.

Communication System Applied to the Present Disclosure

The various descriptions, functions, procedures, proposals, methods, and/or operational flowcharts of the present disclosure described in this document may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

FIG. 22 illustrates a communication system 2200 applied to the present disclosure.

Referring to FIG. 22, a communication system 2200 applied to the present disclosure includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 2210a, vehicles 2210b-1 and 2210b-2, an extended reality (XR) device 2210c, a hand-held device 2210d, a home appliance 2210e, an Internet of Things (IoT) device 2210f, and an Artificial Intelligence (AI) device/server 400. For example, the vehicles may include a vehicle having a wireless communication function, an autonomous driving vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 2220a may operate as a BS/network node with respect to other wireless devices.

The wireless devices 2210a to 2210f may be connected to the network 300 via the BSs 2220. An AI technology may be applied to the wireless devices 2210a to 2210f and the wireless devices 2210a to 2210f may be connected to the AI server 400 via the network 300. The network 300 may be configured using a 3G network, a 4G (e.g., LTE) network, or a 5G (e.g., NR) network. Although the wireless devices 2210a to 2210f may communicate with each other through the BSs 2220/network 300, the wireless devices 2210a to 2210f may perform direct communication (e.g., sidelink communication) with each other without passing through the BSs/network. For example, the vehicles 2210b-1 and 2210b-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 2210a to 2210f.

Wireless communication/connections 150a, 150b, or 150c may be established between the wireless devices 2210a to 2210f/BS 2220, or BS 2220/BS 2220. Herein, the wireless communication/connections may be established through various RATs (e.g., 5G NR) such as uplink/downlink communication 150a, sidelink communication 150b (or, D2D communication), or inter BS communication (e.g. relay, Integrated Access Backhaul (IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Wireless Devices Applicable to the Present Disclosure

FIG. 23 illustrates wireless devices applicable to the present disclosure.

Referring to FIG. 23, a first wireless device 2210 and a second wireless device 2220 may transmit radio signals through a variety of RATs (e.g., LTE and NR). Herein, {the first wireless device 2210 and the second wireless device 2220} may correspond to {the wireless device 2210x and the BS 2220} and/or {the wireless device 2210x and the wireless device 2210x} of FIG. 22.

The first wireless device 2210 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

The second wireless device 2220 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 206 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

Hereinafter, hardware elements of the wireless devices 2210 and 2220 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Signal Processing Circuit Example to which Present Disclosure is Applied

FIG. 24 illustrates a signal processing circuit for a transmit signal.

Referring to FIG. 24, a signal processing circuit 2000 may include a scrambler 2110, a modulator 2120, a layer mapper 2130, a precoder 2140, a resource mapper 2150, and a signal generator 2160. Although not limited thereto, an operation/function of FIG. 24 may be performed by the processors 102 and 202 and/or the transceivers 106 and 206 of FIG. 23. Hardware elements of FIG. 24 may be implemented in the processors 102 and 202 and/or the transceivers 106 and 206 of FIG. 23. For example, blocks 2110 to 2160 may be implemented in the processors 102 and 202 of FIG. 23. Further, blocks 2110 to 2150 may be implemented in the processors 102 and 202 of FIG. 23 and the block 2160 of FIG. 23 may be implemented in the transceivers 106 and 206 of FIG. 23.

A codeword may be transformed into a radio signal via the signal processing circuit 2000 of FIG. 24. Here, the codeword is an encoded bit sequence of an information block. The information block may include transport blocks (e.g., a UL-SCH transport block and a DL-SCH transport block). The radio signal may be transmitted through various physical channels (e.g., PUSCH and PDSCH).

Specifically, the codeword may be transformed into a bit sequence scrambled by the scrambler 2110. A scramble sequence used for scrambling may be generated based on an initialization value and the initialization value may include ID information of a wireless device. The scrambled bit sequence may be modulated into a modulated symbol sequence by the modulator 2120. A modulation scheme may include pi/2-BPSK (pi/2-Binary Phase Shift Keying), m-PSK (m-Phase Shift Keying), m-QAM (m-Quadrature Amplitude Modulation), etc. A complex modulated symbol sequence may be mapped to one or more transport layers by the layer mapper 2130. Modulated symbols of each transport layer may be mapped to a corresponding antenna port(s) by the precoder 2140 (precoding). Output z of the precoder 2140 may be obtained by multiplying output y of the layer mapper 2130 by precoding matrix W of N*M. Here, N represents the number of antenna ports and M represents the number of transport layers. Here, the precoder 2140 may perform precoding after performing transform precoding (e.g., DFT transform) for complex modulated symbols. Further, the precoder 2140 may perform the precoding without performing the transform precoding.

The resource mapper 2150 may map the modulated symbols of each antenna port to a time-frequency resource. The time-frequency resource may include a plurality of symbols (e.g., CP-OFDMA symbol and DFT-s-OFDMA symbol) in a time domain and include a plurality of subcarriers in a frequency domain. The signal generator 2160 may generate the radio signal from the mapped modulated symbols and the generated radio signal may be transmitted to another device through each antenna. To this end, the signal generator 2160 may include an Inverse Fast Fourier Transform (IFFT) module, a Cyclic Prefix (CP) inserter, a Digital-to-Analog Converter (DAC), a frequency uplink converter, and the like.

A signal processing process for a receive signal in the wireless device may be configured in the reverse of the signal processing process (2110 to 2160) of FIG. 24. For example, the wireless device (e.g., 100 or 200 of FIG. 23) may receive the radio signal from the outside through the antenna port/transceiver. The received radio signal may be transformed into a baseband signal through a signal reconstructer. To this end, the signal reconstructer may include a frequency downlink converter, an analog-to-digital converter (ADC), a CP remover, and a Fast Fourier Transform (FFT) module. Thereafter, the baseband signal may be reconstructed into the codeword through a resource demapper process, a postcoding process, a demodulation process, and a de-scrambling process. The codeword may be reconstructed into an original information block via decoding. Accordingly, a signal processing circuit (not illustrated) for the receive signal may include a signal reconstructer, a resource demapper, a postcoder, a demodulator, a descrambler, and a decoder.

Wireless Device Example to which Present Disclosure is Applied

FIG. 25 illustrates another example of a wireless device applied to the present disclosure. The wireless device may be implemented in various forms according to a use-case/service (refer to FIG. 22).

Referring to FIG. 25, wireless devices 2210 and 2220 may correspond to the wireless devices 2210 and 2220 of FIG. 23 and may be configured by various elements, components, units/portions, and/or modules. For example, each of the wireless devices 2210 and 2220 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 104 of FIG. 23. For example, the transceiver(s) 114 may include the one or more transceivers 106 and 106 and/or the one or more antennas 108 and 108 of FIG. 23. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (2210a of FIG. 22), the vehicles (2210b-1 and 2210b-2 of FIG. 22), the XR device (2210c of FIG. 22), the hand-held device (2210d of FIG. 22), the home appliance (2210e of FIG. 22), the IoT device (2210f of FIG. 22), a digital broadcast terminal, a hologram device, a public safety device, an MTC device, a medicine device, a fintech device (or a finance device), a security device, a climate/environment device, the AI server/device (400 of FIG. 22), the BSs (2220 of FIG. 22), a network node, etc. The wireless device may be used in a mobile or fixed place according to a use-example/service.

In FIG. 25, all of the various elements, components, units/portions, and/or modules in the wireless devices 2210 and 2220 may be connected to each other through a wired interface or at least a part thereof may be wirelessly connected through the communication unit 110. For example, in each of the wireless devices 2210 and 2220, the control unit 120 and the communication unit 110 may be connected by wire and the control unit 120 and first units (e.g., 130 and 140) may be wirelessly connected through the communication unit 110. Each element, component, unit/portion, and/or module within the wireless devices 2210 and 2220 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Portable Device Example to which Present Disclosure is Applied

FIG. 26 illustrates a portable device applied to the present disclosure. The portable device may include a smart phone, a smart pad, a wearable device (e.g., a smart watch, a smart glass), and a portable computer (e.g., a notebook, etc.). The portable device may be referred to as a Mobile Station (MS), a user terminal (UT), a Mobile Subscriber Station (MSS), a Subscriber Station (SS), an Advanced Mobile Station (AMS), or a Wireless terminal (WT).

Referring to FIG. 26, a portable device 2210 may include an antenna unit 108, a communication unit 110, a control unit 120, a memory unit 130, a power supply unit 140*a*, an interface unit 140*b*, and an input/output unit 140*c*. The antenna unit 108 may be configured as a part of the communication unit 110. The blocks 110 to 130/140*a* to 140*c* correspond to the blocks 110 to 130/140 of FIG. 25, respectively.

The communication unit 110 may transmit/receive a signal (e.g., data, a control signal, etc.) to/from another wireless device and eNBs. The control unit 120 may perform various operations by controlling components of the portable device 2210. The control unit 120 may include an Application Processor (AP). The memory unit 130 may store data/parameters/programs/codes/instructions required for driving the portable device 2210. Further, the memory unit 130 may store input/output data/information, etc. The power supply unit 140*a* may supply power to the portable device 2210 and include a wired/wireless charging circuit, a battery, and the like. The interface unit 140*b* may support a connection between the portable device 2210 and another external device. The interface unit 140*b* may include various ports (e.g., an audio input/output port, a video input/output port) for the connection with the external device. The input/output unit 140*c* may receive or output a video information/signal, an audio information/signal, data, and/or information input from a user. The input/output unit 140*c* may include a camera, a microphone, a user input unit, a display unit 140*d*, a speaker, and/or a haptic module.

As one example, in the case of data communication, the input/output unit 140*c* may acquire information/signal (e.g., touch, text, voice, image, and video) input from the user and the acquired information/signal may be stored in the memory unit 130. The communication unit 110 may transform the information/signal stored in the memory into the radio signal and directly transmit the radio signal to another wireless device or transmit the radio signal to the eNB. Further, the communication unit 110 may receive the radio signal from another wireless device or eNB and then reconstruct the received radio signal into original information/signal. The reconstructed information/signal may be stored in the memory unit 130 and then output in various forms (e.g., text, voice, image, video, haptic) through the input/output unit 140*c*.

The embodiments described above are implemented by combinations of components and features of the present disclosure in predetermined forms. Each component or feature should be considered selectively unless specified separately. Each component or feature may be carried out without being combined with another component or feature. Moreover, some components and/or features are combined with each other and can implement embodiments of the present disclosure. The order of operations described in embodiments of the present disclosure may be changed. Some components or features of one embodiment may be included in another embodiment, or may be replaced by corresponding components or features of another embodiment. It is apparent that some claims referring to specific claims may be combined with another claims referring to the claims other than the specific claims to constitute the embodiment or add new claims by means of amendment after the application is filed.

Embodiments of the present disclosure can be implemented by various means, for example, hardware, firmware, software, or combinations thereof. When embodiments are implemented by hardware, one embodiment of the present disclosure can be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, and the like.

When embodiments are implemented by firmware or software, one embodiment of the present disclosure can be implemented by modules, procedures, functions, etc. performing functions or operations described above. Software code can be stored in a memory and can be driven by a processor. The memory is provided inside or outside the processor and can exchange data with the processor by various well-known means.

It is apparent to those skilled in the art that the present disclosure can be embodied in other specific forms without departing from essential features of the present disclosure. Accordingly, the aforementioned detailed description should not be construed as limiting in all aspects and should be considered as illustrative. The scope of the present disclosure should be determined by rational construing of the appended claims, and all modifications within an equivalent scope of the present disclosure are included in the scope of the present disclosure.

INDUSTRIAL APPLICABILITY

Although a scheme of transmitting and receiving data in a wireless communication system of the present disclosure has been described with reference to an example applied to a 3GPP LTE/LTE-A system or a 5G system (New RAT system), the scheme may be applied to various wireless communication systems in addition to the 3GPP LTE/LTE-A system or 5G system.

The invention claimed is:

1. A method of transmitting, by a user equipment (UE), a physical uplink shared channel (PUSCH) in a wireless communication system, the method comprising:
   receiving configuration information related to the PUSCH;
   receiving downlink control information scheduling transmission of the PUSCH; and
   transmitting the PUSCH through a transmission unit and a transmission beam determined based on the downlink control information,
   wherein the downlink control information includes information representing an SRS resource associated with the transmission beam, and wherein the transmission unit is determined based on transmission unit identification information configured in an SRS resource set including the SRS resource, wherein the PUSCH is transmitted during a configured time period from a reception time point of the downlink control information based on a first beam indicated by the downlink control information as the transmission beam, wherein the PUSCH is transmitted after the configured time period from the reception time point based on a second beam determined by the UE as the transmission beam.

2. The method of claim 1, wherein the transmission beam is determined based on spatial-related information configured in the SRS resource.

3. The method of claim 2, wherein the spatial-related information includes information representing i) the SRS resource, ii) a channel state information-reference signal (CSI-RS), or iii) a synchronization signal block (SSB).

4. The method of claim 3, wherein the transmission unit for the transmission of the PUSCH is determined based on i) the SRS resource, ii) the CSI-RS, or iii) a transmission unit used to transmit and receive SSBs.

5. The method of claim 1, further comprising transmitting, to a base station, information on whether correspondence is established between an uplink transmission unit and downlink transmission unit of the UE, wherein the transmission unit for the transmission of the PUSCH is determined based on the information.

6. The method of claim 1, further comprising:

receiving configuration information related to SRS transmission for transmission of the PUSCH through higher layer signaling; and transmitting one or more SRSs to a base station based on the configuration information related to SRS transmission, wherein the SRS resource is a resource in which any one of the one or more SRSs has been transmitted.

7. A user equipment (UE) transmitting a physical uplink shared channel (PUSCH) in a wireless communication system, the UE comprising:

one or more transceivers;

one or more processors; and one or more memories storing instructions for operations executed by the one or more processors and connected to the one or more processors, wherein the operations include:

receiving configuration information related to the PUSCH;

receiving downlink control information scheduling a transmission of the PUSCH; and transmitting the PUSCH through a transmission unit and a transmission beam determined based on the downlink control information, wherein the downlink control information includes information representing an SRS resource associated with the transmission beam, and wherein the transmission unit is determined based on transmission unit identification information configured in an SRS resource set including the SRS resource, wherein the PUSCH is transmitted during a configured time period from a reception time point of the downlink control information based on a first beam indicated by the downlink control information as the transmission beam, wherein the PUSCH is transmitted after the configured time period from the reception time point based on a second beam determined by the UE as the transmission beam.

8. The UE of claim 7, wherein the transmission beam is determined based on spatial-related information configured in the SRS resource.

9. The UE of claim 8, wherein the spatial-related information includes information representing i) the SRS resource, ii) a channel state information-reference signal (CSI-RS), or iii) a synchronization signal block (SSB).

10. The UE of claim 9, wherein the transmission unit for the transmission of the PUSCH is determined based on i) the SRS resource, ii) the CSI-RS, or iii) a transmission unit used to transmit and receive SSBs.

11. The UE of claim 7, wherein the operations further comprise transmitting, to a base station, information on whether correspondence is established between an uplink transmission unit and downlink transmission unit of the UE, and wherein the transmission unit for the transmission of the PUSCH is determined based on the information.

12. The UE of claim 7, further comprising:

receiving configuration information related to SRS transmission for transmission of the PUSCH through higher layer signaling; and transmitting one or more SRSs to a base station based on the configuration information related to SRS transmission, wherein the SRS resource is a resource in which any one of the one or more SRSs has been transmitted.

13. A method of receiving, by a base station (BS), a physical uplink shared channel (PUSCH) in a wireless communication system, the method comprising:

transmitting configuration information related to the PUSCH;

transmitting downlink control information scheduling transmission of the PUSCH; and receiving the PUSCH transmitted through a transmission unit and a transmission beam based on the downlink control information, wherein the downlink control information includes information representing an SRS resource associated with the transmission beam, and wherein the transmission unit is determined based on transmission unit identification information configured in an SRS resource set including the SRS resource, wherein the PUSCH is received during a configured time period from a reception time point of the downlink control information based on a first beam indicated by the downlink control information as the transmission beam, wherein the PUSCH is received after the configured time period from the reception time point based on a second beam determined by a user-equipment (UE) as the transmission beam.

14. The method of claim 13, wherein the transmission beam is determined based on spatial-related information configured in the SRS resource.

15. The method of claim 14, wherein the spatial-related information includes information representing i) the SRS resource, ii) a channel state information-reference signal (CSI-RS), or iii) a synchronization signal block (SSB).

16. The method of claim 15, wherein the transmission unit for the transmission of the PUSCH is determined based on i) the SRS resource, ii) the CSI-RS, or iii) a transmission unit used to transmit and receive SSBs.

17. The method of claim 13, further comprising receiving, from a UE, information on whether correspondence is established between an uplink transmission unit and downlink transmission unit of the UE,
- wherein the transmission unit for the transmission of the PUSCH is determined based on the information.

18. The method of claim 13, further comprising:
transmitting, to a UE, configuration information related to SRS transmission for transmission of the PUSCH through higher layer signaling; and
receiving one or more SRSs, by the UE from the base station, based on the configuration information,
wherein the SRS resource is a resource in which any one of the one or more SRSs has been transmitted.

* * * * *